(12) United States Patent
Kandula et al.

(10) Patent No.: US 10,496,643 B2
(45) Date of Patent: Dec. 3, 2019

(54) CONTROLLING APPROXIMATIONS OF QUERIES

(71) Applicant: Microsoft Technology Licensing, LLC, Redmond, WA (US)

(72) Inventors: Srikanth Kandula, Redmond, WA (US); Surajit Chaudhuri, Redmond, WA (US); Bolin Ding, Redmond, WA (US); Anil Atmanand Shanbhag, Cambridge, MA (US); Aleksandar Vitorović, Chavannes-près-Renens (CH); Matthaios Olma, Lausanne (CH); Robert Grandl, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 493 days.

(21) Appl. No.: 15/018,843

(22) Filed: Feb. 8, 2016

(65) Prior Publication Data

US 2017/0228425 A1    Aug. 10, 2017

(51) Int. Cl.

| G06F 7/00 | (2006.01) |
|---|---|
| G06F 17/30 | (2006.01) |
| G06F 16/2453 | (2019.01) |
| G06N 7/00 | (2006.01) |
| G06F 16/22 | (2019.01) |
| G06F 16/2458 | (2019.01) |

(52) U.S. Cl.
CPC .... *G06F 16/24542* (2019.01); *G06F 16/2246* (2019.01); *G06F 16/2453* (2019.01); *G06F 16/2462* (2019.01); *G06N 7/005* (2013.01)

(58) Field of Classification Search
None
See application file for complete search history.

(56) References Cited

U.S. PATENT DOCUMENTS

| 6,542,886 B1 * | 4/2003 | Chaudhuri | G06F 16/2462 |
|---|---|---|---|
| 7,805,447 B2 | 9/2010 | Olston et al. | |
| 8,335,767 B2 * | 12/2012 | Das | G06F 16/24542 |
| | | | 707/661 |
| 8,874,548 B2 | 10/2014 | Wu et al. | |
| 2004/0128287 A1 * | 7/2004 | Keller | G06F 16/24545 |

(Continued)

FOREIGN PATENT DOCUMENTS

| CA | 2266990 A1 | 11/1999 |
|---|---|---|
| CN | 103793467 A | 5/2014 |

OTHER PUBLICATIONS

Yan, et al., "Error-bounded Sampling for Analytics on Big Sparse Data", In Proceedings of the Very Large Data Bases Endowment, vol. 7, Issue 13, Sep. 1, 2014, pp. 1508-1519.

(Continued)

*Primary Examiner* — Tuan A Pham
(74) *Attorney, Agent, or Firm* — Rainier Patents, P.S.

(57) ABSTRACT

One or more approximations of query output in a data analytics platform are controlled. The one or more approximations are controlled by generating values of error metrics associated with placements of samplers in one or more query execution plans associated with the query, and injecting a plurality of samplers into the query execution plans, using the determined values of the error metrics, in lieu of storing samples of input to the query prior to execution of the query.

20 Claims, 25 Drawing Sheets

(56) References Cited

U.S. PATENT DOCUMENTS

| | | | | |
|---|---|---|---|---|
| 2005/0097078 | A1* | 5/2005 | Lohman | G06F 16/90335 |
| 2010/0312776 | A1* | 12/2010 | Burrichter | G06F 16/2425 707/759 |
| 2011/0208703 | A1* | 8/2011 | Fisher | G06F 16/88 707/692 |
| 2013/0318069 | A1* | 11/2013 | Alu | G06F 16/24542 707/718 |
| 2013/0332481 | A1* | 12/2013 | Lau | G06F 17/30979 707/769 |
| 2014/0372438 | A1* | 12/2014 | Chandramouli | G06F 17/30598 707/737 |
| 2014/0379693 | A1* | 12/2014 | May | G06F 16/24545 707/718 |

OTHER PUBLICATIONS

Zeng, et al., "G-OLA: Generalized On-Line Aggregation for Interactive Analysis on Big Data", In Proceedings of the ACM SIGMOD International Conference on Management of Data, May 31, 2015, pp. 913-918.

Zeng et al., "The Analytical Bootstrap: a New Method for Fast Error Estimation in Approximate Query Processing," In Proceedings of the 2014 ACM SIGMOD International Conference on Management of Data (SIGMOD'14), Jun. 18, 2014, pp. 277-288.

Gryz, et al., "Query Sampling in DB2 Universal Database", In Proceedings of the ACM SIGMOD International Conference on Management of Data, Jun. 13, 2004, 5 pages.

Gibbons, et al., "New Sampling-Based Summary Statistics for Improving Approximate Query Answers", In Proceedings of the ACM SIGMOD International Conference on Management of data, Jun. 2, 1998, 12 pages.

Chaudhuri, et al., "Optimized Stratified Sampling for Approximate Query Processing", In Proceedings of ACM Transactions on Database Systems, vol. 32, Issue 2, Jun. 2007, 50 pages.

Das, Gautam, "Sampling Methods in Approximate Query Answering Systems", In Publication of Encyclopedia of Data Warehousing and Mining, Jun. 2005, 16 pages.

Ioannidis, et al., "Histogram-Based Approximation of Set-Valued Query Answers", In Proceedings of the 25th International Conference on Very Large Data Bases, Sep. 7, 1999, pp. 174-185.

Babcock, et al., "Dynamic Sample Selection for Approximate Query Processing", In Proceedings of the ACM SIGMOD International Conference on Management of Data, Jun. 9, 2003, 12 pages.

Chakrabarti, et al., "Approximate Query Processing Using Wavelets", In Proceedings of the 27th International Conference on Very Large Data Bases, Sep. 11, 2001, 25 pages.

Chaudhuri et al., "On Random Sampling over Joins", In Proceedings of the ACM SIGMOD International Conference on Management of data, Jun. 6, 1999, 12 pages.

"Big Data Benchmark", Retrieved on: Aug. 13, 2015 Available at: http://bit.ly/1uyuBE8.

"Apache Tez", Retrieved on: Aug. 13, 2015 Available at: http://tez.apache.org/.

"Intel-hadoop/Big-Data-Benchmark-for-Big-Bench", Retrieved on: Aug. 13, 2015 Available at: http://bit.ly/1HIFRH0.

Shanklin, Carter, "hive-testbench/sample-queries-tpcds/-", Published on: Aug. 8, 2014 Available at: http://bit.ly/1J6uDap.

Shanklin, Carter., "hive-testbench/sample-queries-tpch/-", Published on: Aug. 12, 2014 Available at: http://bit.ly/1KRK5gl.

Acharya, et al., "The aqua approximate query answering system", In Proceedings of the ACM SIGMOD international conference on Management of data, Jun. 1, 1999, pp. 574-576.

Acharya, et al., "Congressional samples for approximate answering of group-by queries", In Proceedings of the ACM SIGMOD international conference on Management of data, May 16, 2000, pp. 487-498.

Agarwal, et al., "Re-optimizing data-parallel computing", In Proceedings of the 9th USENIX conference on Networked Systems Design and Implementation, Apr. 25, 2012, pp. 1-14.

Agarwal, et al., "BlinkDB: queries with bounded errors and bounded response times on very large data", In Proceedings of the 8th ACM European Conference on Computer System, Apr. 15, 2013, pp. 29-42.

Agarwal, et al., "Knowing when you're wrong: building fast and reliable approximate query processing systems", In Proceedings of the ACM SIGMOD international conference on Management of data, Jun. 22, 2014, pp. 481-492.

Ananthanarayanan, et al., "Reining in the Outliers in MapReduce Clusters Using Mantri", In Proceedings of 9th USENIX Symposium on Operating Systems Design and Implementation, Oct. 4, 2010, 14 pages.

Armbrust, et al., "Spark SQL: Relational Data Processing in Spark", In Proceedings of the ACM SIGMOD International Conference on Management of Data, May 31, 2015, pp. 1383-1394.

Babcock, et al., "Models and Issues in Data Stream Systems", In Proceedings of the twenty-first ACM SIGMOD-SIGACT-SIGART symposium on Principles of database systems, Jun. 3, 2002, pp. 1-16.

Babcock, et al., "Dynamic sample selection for approximate query processing", In Proceedings of the ACM SIGMOD international conference on Management of data, Jun. 9, 2003, pp. 539-550.

Beyer, et al., "On synopses for distinct-value estimation under multiset operations", In Proceedings of the ACM SIGMOD international conference on Management of data, Jun. 12, 2007, pp. 199-210.

Brutlag, Jake, "Speed Matters", Published on: Jun. 23, 2009 Availabale at: http://googleresearch.blogspot.in/2009/06/speed-matters.html.

Chaiken, et al., "SCOPE: easy and efficient parallel processing of massive data sets", In Proceedings of the VLDB Endowment, vol. 1, Issue 2, Aug. 23, 2008, pp. 1265-1276.

Chatterji, "On the complexity of approximate query optimization", In Proceedings of the twenty-first ACM SIGMOD-SIGACT-SIGART symposium on Principles of database systems, Jun. 3, 2002, pp. 282-292.

Chaudhuri, et al., "Overcoming limitations of sampling for aggregation queries", In Proceedings of 17th International Conference on Data Engineering, Apr. 2, 2001, pp. 534-542.

Chaudhuri, et al., "A robust, optimization-based approach for approximate answering of aggregate queries", In Proceedings of the ACM SIGMOD international conference on Management of data, May 21, 2001, pp. 295-306.

Chaudhuri, et al., "On Random Sampling over Joins", In Proceedings of the ACM SIGMOD international conference on Management of data, vol. 28, Issue 2, Jun. 6, 1999, pp. 263-274.

Condie, et al., "MapReduce Online", In Proceedings of the 7th USENIX conference on Networked systems design and implementation, Apr. 28, 2010, 15 pages.

Cormode, et al., "Synopses for Massive Data: Samples, Histograms, Wavelets, Sketches", In Journal of Foundations and Trends in Databases, vol. 4, Issue 1-3, Jan. 1, 2012, 296 pages.

Dabrowski, et al., "Is 100 Milliseconds Too Fast?", In Proceedings of Extended Abstracts on Human Factors in Computing Systems, Mar. 31, 2001, pp. 317-318.

Efron, et al., "An Introduction to the Bootstrap", In Publication of Springer, Jan. 1, 1993, 5 pages.

Bar-Yossef, et al., "Counting Distinct Elements in a Data Stream", In Proceedings of 6th International Workshop on Randomization and Approximation Techniques in Computer Science, vol. 2483, Sep. 13, 2002, 10 pages.

Graefe, Goetz, "The Cascades Framework for Query Optimization", In Journal of IEEE Data(base) Engineering Bulletin, vol. 18, No. 18, Sep. 1995, pp. 19-28.

Hellerstein, et al., "Online Aggregation", In Proceedings of the ACM SIGMOD international conference on Management of data, vol. 26, Issue 2, Jun. 1, 1997, pp. 171-182.

Jermaine, et al., "Scalable Approximate Query Processing with the Dbo Engin", In Journal of ACM Transactions on Database Systems, vol. 33, Issue 4, Nov. 2008, 54 pages.

Johnson, et al., "Sampling Algorithms in a Stream Operator", In Proceedings of the ACM SIGMOD international conference on Management of data, Jun. 14, 2005, 12 pages.

(56) References Cited

OTHER PUBLICATIONS

Macqueen, J., "Some methods for Classification and Analysis of Multivariate Observations", In Proceedings of the Fifth Berkeley Symposium on Mathematical Statistics and Probability, vol. 1, Retrieved on: Aug. 13, 2015, pp. 281-297.
Manku, et al., "Approximate Frequency Counts Over Data Streams", In Proceedings of the 28th international conference on Very Large Data Bases, Aug. 20, 2002, 12 pages.
Melnik, et al., "Dremel: Interactive Analysis of Web-Scale Datasets", In Proceedings of the Very Large Data Bases Endowment, vol. 3, Issue 1-2, Sep. 2010, pp. 330-339.
Motwani, et al., "Query Processing, Resource Management, and Approximation in a Data Stream Management System", In Proceedings of Conference on Innovative Data Systems Research, Jan. 5, 2003, 10 pages.
Nirkhiwale, et al., "A Sampling Algebra for Aggregate Estimation", In Proceedings of the 39th International Conference on Very Large Data Bases Endowment, vol. 6, Issue 14, Aug. 26, 2013, pp. 1798-1809.
Olston, et al., "Pig Latin: A Not-So-Foreign Language for Data Processing ", In Proceedings of the ACM SIGMOD International conference on Management of data, Jun. 9, 2008, pp. 1099-1110.
Olston, et al., "Interactive Analysis of Web-Scale Data", In Proceedings of fourth biennial Conference on Innovative Data Systems Research, Jan. 4, 2009, 7 pages.
Pansare, et al., "Online Aggregation for Large Mapreduce Jobs", In Proceedings of the 37th International Conference on Very Large Data Bases Endowment vol. 4, No. 11, Aug. 29, 2011, pp. 1135-1145.
Potti, et al., "DAQ: A New Paradigm for Approximate Query Processing", In Proceedings of the Very Large Data Bases Endowment, vol. 8, No. 9, May 1, 2015, pp. 898-909.
Sidirourgos, et al., "Sciborq: Scientific Data Management with Bounds on Runtime and Quality", In Proceedings of 5th biennial Conference on Innovative Data Systems Research, Jan. 9, 2011, pp. 296-301.
Thusoo, et al., "Hive—A Warehousing Solution over a Map-Reduce Framework", In Proceedings of the Very Large Data Bases Endowment, vol. 2, Issue 2, Aug. 24, 2009, pp. 1626-1629.
Kwon, et al., "Skew-Resistant Parallel Processing of Feature-Extracting Scientific User-Defined Functions", In Proceedings of ACM Symposium on Cloud Computing, Jun. 10, 2010, 12 pages.
Bar-Yossef et al., "Counting distinct elements in a data stream", Proceedings of Randomization and Approximation Techniques in Computer Science, 2002, Lecture Notes in Computer Science, vol. 2483, Springer, Berlin, Heidelberg, 10 pages.
Chaudhuri et al., "Random Sampling for Histogram Construction: How much is enough?", Proceedings of the 1998 ACM SIGMOD International Conference on Management of Data, vol. 27, Issue 2, Jun. 1-4, 1998, pp. 436-447, 12 pages.
Ferguson et al., "Jockey: Guaranteed Job Latency in Data Parallel Clusters", Proceedings of the 7th ACM European Conference on Computer Systems, Apr. 10-13, 2012, pp. 99-112, 14 pages.
Halevy, A.Y., "Answering queries using views: A survey", The VLDB Journal, vol. 10, Issue 4, Dec. 2001, pp. 270-294, 25 pages.
Kandula et al., "Quickr" Lazily Approximating Complex AdHoc Queries in BigData Clusters, White Paper, Proceedings of the 2016 International Conference on Management of Data, Jun. 26-Jul. 1, 2016, pp. 631-646, 16 pages.
Olken, Frank, "Random Sampling from Databases", PhD Thesis, University of California at Berkeley, 1993, 172 pages.

\* cited by examiner

400

402
SELECT A, SUM(C+E), (D%2+E) AS F
FROM T$_1$ JOIN T$_2$
WHERE T$_1$.A=T$_2$.A ∧ T$_1$.B=T$_2$.B ∧ D%3=0
HAVING ...

404
SELECT A, C, E, (D%2+E) AS F
FROM T$_1$ JOIN T$_2$
WHERE T$_1$.A = T$_2$.A ∧ T$_1$.B = T$_2$.B ∧ D%3 =0

406
SAMPLER in: {A, C, E, F} out: {A, C, E, F, w}
Strat col. = {A, {C, E} optional}
ds = sfm = 1

408
SELECT A, SUM(w (C+E)), F, sum$^σ$
HAVING ...

FIG. 4

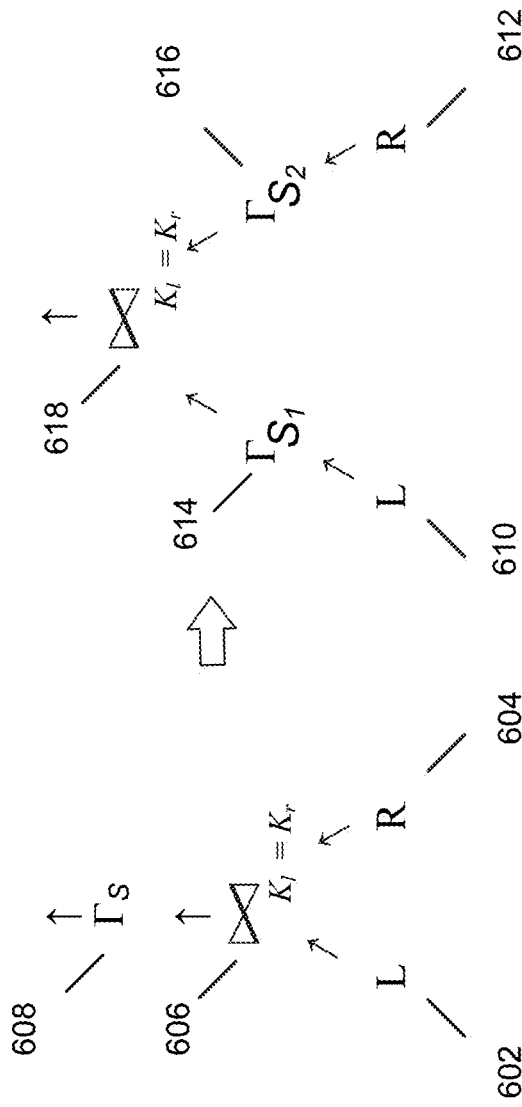

700A

702 — 
Inputs:
  $S$: Sampler state = $\{S, U, sfm, ds\}$
  $L, R$: relational inputs of join with columns $L^C, R^C$ respectively
  $K_l, K_r$: Columns used as join keys // assume equi-join
Output: Vector of alternate samplers on one or both inputs of join.

704 — Func: NumDV($R, C$): // num. distinct values of cols $C$ in relation $R$

706 — Func: ProjectColSet($S, \pi_{C_1 \to C_2}$): // $S, C_1, C_2$ are all column sets
// Clones $S$. Then, replaces cols in $S \cap C_1$ with corr. col in $C_2$.

708 — Func: OneSideHelper($\mathcal{S}, L, R, K_l, K_r, U_l$):

$\vec{A} \leftarrow \{\}$ // vector of state of alternative samplers on left relation $S' \leftarrow$ ProjectColSet($\mathcal{S}.S, \pi_{C_1 \to C_2}$) // Normalize strat cols

710 — $S_l \leftarrow S' \cap L^C$ // strat cols defined on left $sfm_l \leftarrow \mathcal{S}.sfm$ if $|S' - S_l| > 0$ and $|K_l - S_l| > 0$ then
  // missing some strat cols and all join keys not in strat cols

712 — $sfm_l \leftarrow sfm_l * \dfrac{\min\left(\text{NumDV}(L, \mathcal{X}_l - S_l),\ \text{NumDV}(R, S' - S_l)\right)}{\text{NumDV}(R, \text{ProjectColSet}(E_l - S_l, \pi_{\mathcal{X}_l \to \mathcal{X}_r}))}$ $S_l \leftarrow S_l \cup K_l$ // append join keys to strat cols

714 — $K_{rem} \leftarrow K_l - S_l$ foreach *subset* $S''$ *of* $K_{rem}$ do
  $S_{skip} \leftarrow K_{rem} - S''$ // will strat on $S''$, these join keys remain.
  $ds_l \leftarrow \mathcal{S}.ds *$ // penalize by increasing ds

716 — $\dfrac{\min\left(\text{NumDV}(L, S_{skip}),\ \text{NumDV}(R, \text{ProjectColSet}(S_{skip}, \pi_{\mathcal{X}_l \to \mathcal{X}_r}))\right)}{\text{NumDV}(L, S_{skip})}$ // check for dissonance
  $\vec{A} \leftarrow \{S_l \cup S'', U_l, sfm_l, ds_l\}$
return $\vec{A}$

718 — Func: PrepareUnivCol $(U, K)$:
if $|U| == 0$ or $U == K$ then return $K$;
else return { }  // cascading univ not poss.;

720 — Func: PushSamplerOnOneSide($S, L, R, K_l, K_r$):

722 — $U_l \leftarrow$ ProjectColSet($S.U, \pi_{K_r \to K_l}$)

if $|U_l - L^C| == 0$ then

724 — // can push to one side iff other side has no univ col.
return OneSideHelper($S, L, R, K_l, K_r, U_l$)

return { }  // no alternatives

726 — Func: PushSamplerOntoBothSides($S, L, R, K_l, K_r$):

728 — $U_l \leftarrow$ PrepareUnivCol (ProjectColSet($S.U, \pi_{K_r \to K_l}$), $K_l$)
$U_r \leftarrow$ PrepareUnivCol (ProjectColSet($S.U, \pi_{K_l \to K_r}$), $K_r$)

if $|U_l| == 0$ or $|U_r| == 0$ then return { }  // cannot use univ.

730 — $\vec{A}_l \leftarrow$ OneSideHelper($S, L, R, K_l, K_r, U_l$)
$\vec{A}_r \leftarrow$ OneSideHelper($S, L, R, K_l, K_r, U_r$)
return $\vec{A}_l \times \vec{A}_r$  // cross product, output is vector of state-pairs

FIG. 7B

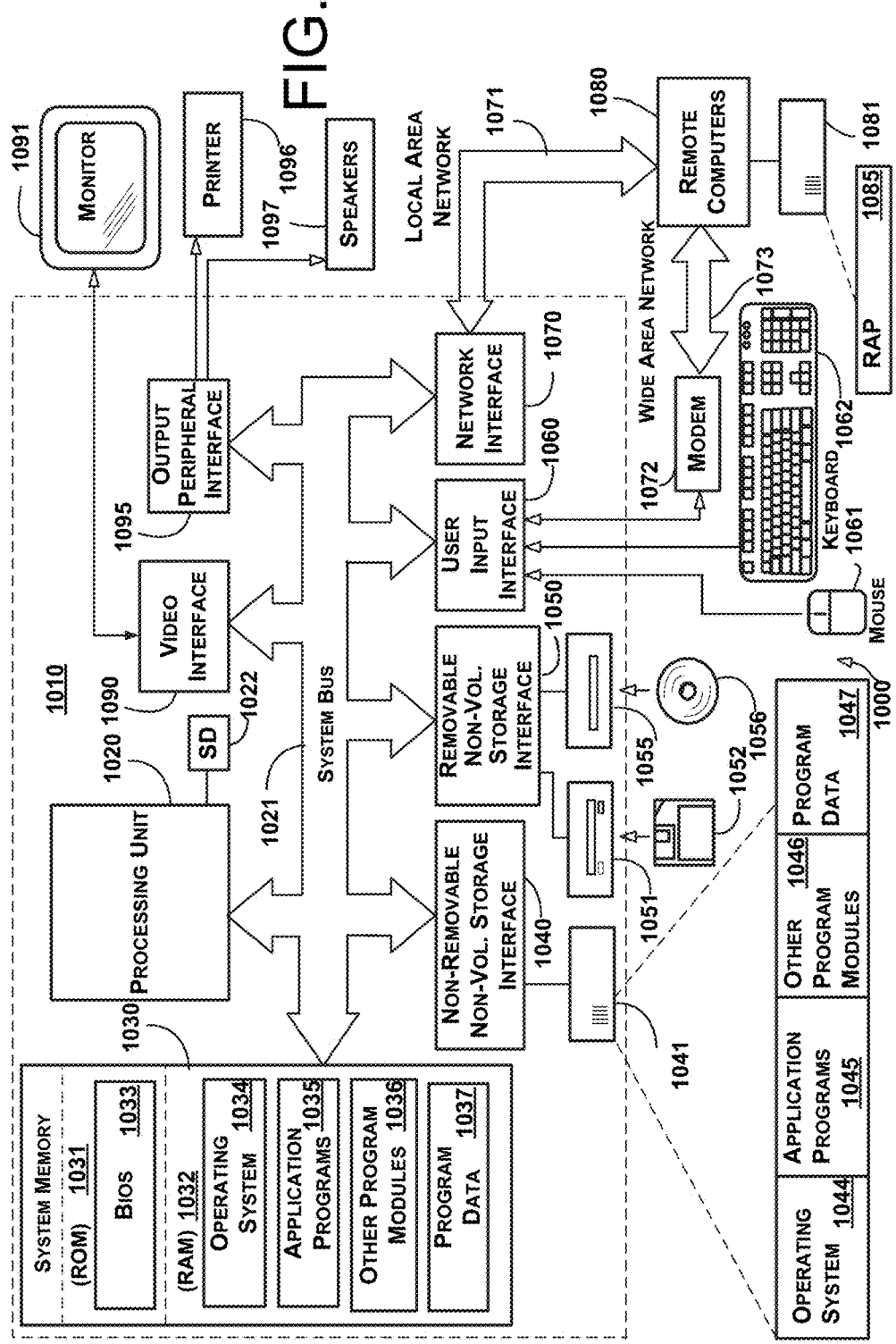

1100B

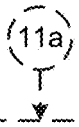

1108 — Determine whether the query is approximatable, and injecting the samplers based on one or more results of the determining whether the query is approximatable

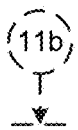

1110 — Inject at least one of the samplers by pushing the at least one of the samplers past a Structured Query Language (SQL) operator in a query execution tree, based on one or more transformation rules that are each respectively based on a respective dominance relationship between query expressions

1112 — Inject at least one of the samplers by pushing the at least one of the samplers past a SQL operator in a query execution tree 1114 — The at least one of the samplers has characteristics that include using no more than a predetermined, sub-linear amount of memory for execution, performs no more than a single pass over data during execution, and uses parallel processing of input data for execution

1116 — Inject at least one of the samplers by pushing the at least one of the samplers past a Structured Query Language (SQL) operator in a query execution tree, to a plurality of direct inputs to the SQL operator

FIG. 11B

CONTROLLING APPROXIMATIONS OF QUERIES

BACKGROUND

Users of data analytics platforms (e.g., database systems) may need to process complex ad-hoc queries written in a mix of Structured Query Language (SQL)-like relational algebra and user defined operations. However, fully processing such queries may involve substantial time and resources.

SUMMARY

According to one general aspect, a system may include at least one hardware device processor, and a computer-readable storage medium storing executable instructions that, when executed, cause one or more of the at least one hardware device processor to control one or more approximations of query output in a data analytics platform. The one or more approximations are controlled by generating values of error metrics associated with placements of samplers in one or more query execution plans associated with the query, and injecting a plurality of the samplers into the one or more query execution plans, using the determined values of the error metrics, in lieu of storing samples of input to the query prior to execution of the query.

According to another aspect, a plurality of attributes for an input data set for a query in a data analytics platform is obtained. A plurality of attributes for a query sub-expression that includes a plurality of database operations that are associated with a plurality of samplers and a plurality of input datasets is obtained. Each respective sampler is associated with a plurality of sampler characteristics. For the query sub-expression, an estimate of performance and an estimate of accuracy is determined, for the query subexpression with at least one of the samplers associated with the query sub-expression. An approximatability of the query sub-expression is determined based on a comparison of the determined estimate of performance and estimate of accuracy, compared with predetermined trade-off curves for performance and accuracy. A plurality of sampler operators is injected into the query execution plan, the plurality of sampler operators having an arbitrary cardinality, each of the plurality of sampler operators having an arbitrary sampler type, each of the plurality of sampler operators having a respective pair of associated characteristics, the each respective pair of associated characteristics including a first probability of emitting a tuple, and a second probability of emitting two tuples. An optimized query execution plan is generated by determining an estimate of performance attributes and accuracy attributes of a plurality of versions of the query execution plan with injected sampler operators, and optimized execution of the query is controlled using the generated optimized query execution plan.

According to another aspect, an amount of join processing in a query of a data analytics platform is controlled by generating a predetermined percentage of sample structured query language (SQL) join output by joining no more than the predetermined percentage amount of each of a plurality of SQL join direct inputs, the percentage representing a predetermined fractional measure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 4 illustrates example instructions for seeding samplers into a query plan.

FIGS. 6A-6B illustrate an example generation of a query plan transformed by pushing samplers past JOIN statements.

FIGS. 7A-7B illustrate example instructions for pushing samplers past joins.

FIG. 10 is a block diagram is a block diagram of an example architecture for an example system for generating a query plan for approximation using samplers in lieu of apriori samples.

FIGS. 11A-11C are a flowchart illustrating example operations of the system of FIG. 10.

DETAILED DESCRIPTION

I. Introduction

Figure 1:
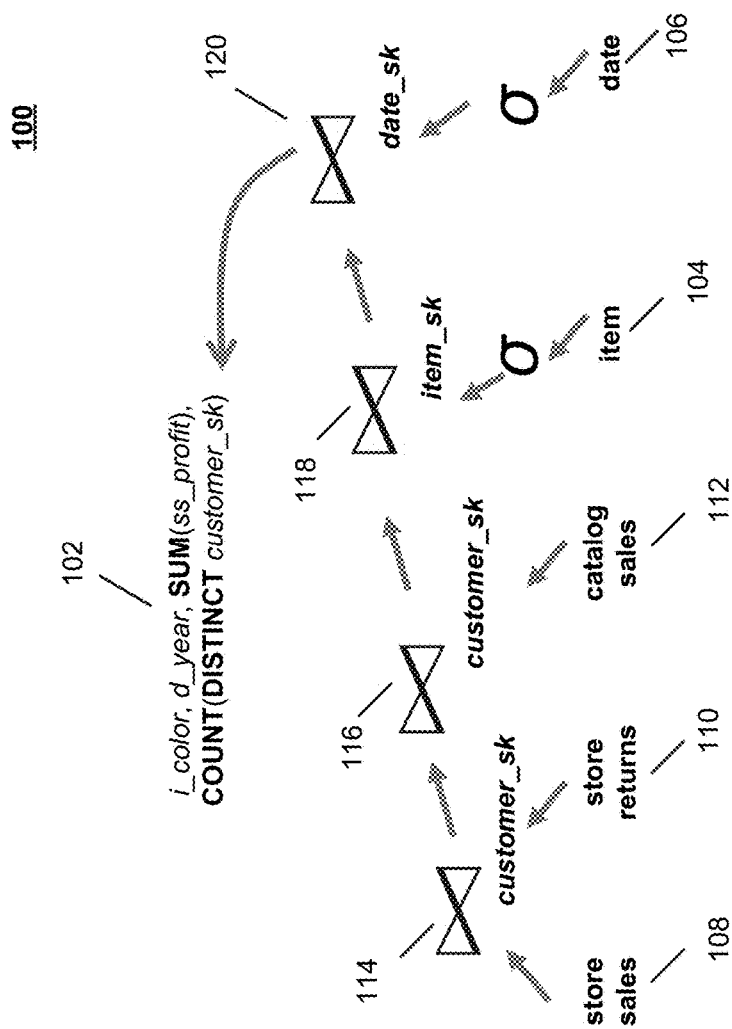
FIG. 1 is a block diagram of an example query.

Example techniques discussed herein may be used to approximate complex ad-hoc queries in big data clusters without requiring pre-existing samples. For example, the queries may be used in data analytics platforms (e.g., database management systems, and other systems that perform data analytics). For example, samplers may be injected at appropriate locations in a query plan. Performance speedup can be substantial when big-data queries take multiple passes over data and samplers execute early in the query plan.

As discussed further herein, a universe sampler may effectively sample both inputs to a join operation. By incorporating samplers natively into a cost-based query optimizer (QO), plans may be automatically generated with appropriate sampler types at appropriate locations. For example, desired error guarantees may be of the form: with high probability, do not miss groups and keep aggregates within a small ratio of their true value (e.g., ±10%).

Given a complex ad-hoc query written in a mix of SQL-like relational algebra and user defined operations, example techniques discussed herein may automatically decide whether or not the query can be approximatable and output an execution plan using injection of appropriate sampler operators at appropriate locations. Further, example techniques discussed herein may provide samplers that can be used to sample both inputs of a join. Further, example techniques discussed herein may analyze the "error" in a query answer with arbitrarily many samplers (e.g., likelihood of missing groups in the answer, likelihood of misestimating aggregation operations, etc.).

Conventionally, inputs were sampled and a query was matched to an available input sample if any. Such conventional techniques may fail to work when queries are substantially diverse, spread across many datasets and are apriori unpredictable. Further, conventional techniques fail to "effectively" sample both inputs of a join.

Further, conventional error analysis techniques have been limited to specific types of samplers ("generalized uniform"), have required self-joins to compute the variance and have not accounted for the likelihood of missing groups.

In accordance with example techniques discussed herein, queries may be approximated by automatically injecting samplers into execution plans as opposed to storing samples of input. In accordance with example techniques discussed herein, a universe sampler may be used for join inputs. Example techniques discussed herein may automatically decide whether a query is approximatable and place appropriate samplers at appropriate locations. Example techniques discussed herein may provide one or more error analysis techniques.

Example techniques discussed herein may be used, for example, for approximating jobs in big-data clusters. Jobs that are specified as a mash-up of relational expressions and user-defined code increasingly dominate the big-data ecosystem, due in large part to the growth of frameworks such as HIVE (see, e.g., Thusoo, et al., "Hive—A Warehousing Solution over a Map-Reduce Framework," In *Proceedings of the Very Large Data Bases Endowment*, Vol. 2, Issue 2, Aug. 24, 2009, pp. 1626-1629), PIG (see, e.g., Olston, et al., "Pig Latin: A Not-So-Foreign Language for Data Processing," In *Proceedings of the ACM SIGMOD International Conference on Management of Data,* 2008, pp. 1099-1110), SCOPE (see, e.g., Chaiken, et al., "SCOPE: easy and efficient parallel processing of massive data sets," In *Proceedings of the VLDB Endowment*, Vol. 1, Issue 2, Aug. 23, 2008, pp. 1265-1276), SPARK-SQL (see, e.g., Armbrust, et al., "Spark SQL: Relational Data Processing in Spark," In *Proceedings of the ACM SIGMOD International Conference on Management of Data*, May 31, 2015, pp. 1383-1394) and DREMEL (see, e.g., Melnik, et al., "Dremel: Interactive Analysis of Web-Scale Datasets," In *Proceedings of the Very Large Data Bases Endowment*, Vol. 3, Issue 1-2, September, 2010, pp. 330-339).

Big-data queries may be approximatable but may tend to be more complex and may be spread across more datasets. Example findings from a large production cluster with $O(10^4)$ machines that supports millions of queries per day have indicated the following: (1) Distribution of queries over inputs is heavy-tailed. For example, the smallest subset of inputs that supports half of the queries is 20 PB in size. The next 30% queries touch another 40 PB of inputs. (2) Queries are complex. They may have many joins ({50th, 90th} percentile values are 3, 11 respectively), deep and rich execution graphs (median graph may have 192 operators with depth of 28) and may touch many columns from each dataset (e.g., the median query may use 8 columns per dataset and 49 at the 90th percentile). However, queries may also have many aggregations and output<<(substantially less than) input, indicating a potential for speed-up from approximation.

As discussed further herein, experimental results, based on an implementation on a cluster with $O(10^4)$ machines, have indicated that example queries in the TRANSACTION PROCESSING COUNCIL BENCHMARK DECISION SUPPORT (i.e., TPC-DS) use a median of 2× fewer resources, for example techniques discussed herein. In contrast, approaches that construct input samples even when given 10×the size of the input to store samples may improve only 22% of the queries, i.e., a median speed up of 0×.

Approximating big-data queries, i.e., trading off degradation in answer quality for performance improvements, has many use-cases. Since queries process large volumes of data on expensive clusters, even a 2× lower resource requirement may translate to a 2× smaller bill (e.g., from AMAZON ELASTIC COMPUTE CLOUD (AMAZON EC2)). Production clusters that are capacity limited may run 2× more queries. Data scientists can tolerate imprecise answers for exploratory analysis and the snappier response time may increase productivity.

Example use cases that may be common in a cluster include: (a) queries that analyze logs to generate aggregated dashboard reports if sped up may increase the refresh rate of dashboards at no extra cost and (b) machine learning queries that build models by iterating over datasets (e.g., k-means) can tolerate approximations in early iterations.

Unfortunately, state-of-art techniques may not be able to approximate complex queries. Many production big-data systems offer the uniform sample operator. The user can sample as desired; however, the systems do not reason about how the answer will change. Some existing work has built samples over input datasets. Such example systems may provide benefit to predictable queries that touch only one large dataset. Joins with small dimension tables may be acceptable. However, they may not benefit queries that join more than one large table, queries that touch less frequently used datasets or query sets that use a diverse set of columns. As discussed above, such queries and datasets may dominate in big-data clusters. On the TPC-DS BENCHMARK, experimental results have indicated that when given 1×(4×) the size of the input dataset to store samples, BLINKDB (see, e.g., Agarwal, et al., "BlinkDB: queries with bounded errors and bounded response times on very large data," In *Proceedings of the 8th ACM European Conference on Computer System*, Apr. 15, 2013, pp. 29-42) offers benefit for 11% (17%) of the queries.

An example system discussed herein (e.g., QUICKR) may have four goals. First, offer turn-key support for approximations: that is, given a query, decide whether or not it can be sampled and output the appropriate sampled query plan. Second, support complex queries, i.e., support the large portion of SQL* shown in Table 1 (shown below).

Table 1 below summarizes example types of parallel SQL queries that may be handled by an example system such as QUICKR. For example, QUICKR can deal with arbitrary depth queries.

TABLE 1

| SQL Query Types | Description |
|---|---|
| Selection | Arbitrary (user-defined) expressions specified as f ($col_1$, $col_2$, . . . ) <=> Constant. Also, composing several such literals with ∨ or ∧. |

TABLE 1-continued

| SQL Query Types | Description |
|---|---|
| Aggregates | DISTINCT, COUNT, SUM, AVG and their *IF equivalents. At least partial support for user-defined aggregates (with annotations) |
| Join | All but full-outer join. Includes joins over multiple tables, outer joins and star queries with foreign key joins |
| Project | Arbitrary. Including columns created by UDFs |
| Others | Order By, Windowed aggregates, . . . |

Third, to also help ad-hoc queries over infrequently used datasets, do not rely on input samples being available and assume no knowledge of future queries. Finally, offer error goals of the form: with high probability (whp), none of the groups in the answer will be missed and the returned value of aggregations is within a bounded ratio of the true answer (e.g., this may be set to ±10%).

With an example system such as QUICKR, big-data queries may perform multiple passes over data, due in part to the complexity of the query and in part to the nature of parallel plans. For example, a pair join may involve two passes over data and one shuffle across the network. If data were to be sampled in the first pass, all subsequent computation may be sped up. With this paradigm, the gains from sampling may advantageously involve zero apriori overhead. However, best case gains may potentially be smaller. Whereas apriori sampling may involve gains tending to ∞ by executing the query on a very small sample, an example technique such as QUICKR may read all data at least once. In an example cluster, in spite of data volume reduced due to predicates in the first pass, the median query may involve 2.4 effective passes over data and the 90th percentile value may be 6.5 (e.g., with "effective passes" computed as $(\Sigma_{taskt} \text{input}_t + \text{output}_t)/(\text{job input} + \text{job output}))$. Further, the first pass may be parallel allowing for comparable runtime speed-up.

In accordance with example techniques discussed herein, inline sampling within a query (e.g., as done by QUICKR) may be complementary to building apriori samples. The latter is suited for simple predictable queries on popular datasets whereas example techniques discussed herein may approximate the more complex queries over infrequently used datasets with zero apriori overhead.

In accordance with example techniques discussed herein, a universe sampling operator can sample join inputs. For example, joining ap probability sample of inputs may be akin to a $p^2$ probability sample of the join output (see, e.g., Chaudhuri, et al., "On Random Sampling over Joins," In *Proceedings of the ACM SIGMOD International Conference on Management of Data*, Vol. 28, Issue 2, Jun. 6, 1999, pp. 263-274; Cormode, et al., "Synopses for Massive Data: Samples, Histograms, Wavelets, Sketches," In *Journal of Foundations and Trends in Databases*, Vol. 4, Issue 1-3, 2012). Hence, while sampling the join inputs may provide more advantageous performance, either one may tolerate substantial degradation in answer quality or substantially increase the sampling probability which in turn may affect performance. Some difficulties may arise due to the ambiguity in joining rows chosen independently-at-random from the two sides.

Instead, suppose both inputs project the value of the join keys into some high dimensional universe (e.g., using a hash function)—and, both inputs pick the same random portion of this universe. That is, both join inputs pick all rows whose value of the join keys falls in the chosen subspace. This may ensure that a complete and unambiguous join will occur on the restricted subspace of the value keys. As discussed further herein, joining ap probability universe sample of inputs may be statistically equivalent to ap probability universe sample of the join output. The universe sampler is applicable for equi-joins and involves the stratification columns (e.g., groups in the final answer) and those used in aggregations being uncorrelated with the join keys. Many such cases may exist in TPC-DS and production queries.

In accordance with example techniques discussed herein, samplers may be injected into the query plan. Such example techniques may use statistics such as cardinality and distinct values per input dataset which may be computed in one pass over data by the first query that touches the dataset. Example techniques discussed herein may use (at least) three different samplers. For example, universe is discussed above. As another example, uniform sampler may mimic a Poisson process. As another example, distinct sampler may enforce stratification requirements. All samplers may function in one pass over data, with bounded memory and may be run in parallel over partitions of data. With these minimal attributes, example techniques discussed herein may place samplers at arbitrary locations in the query plan.

Remaining questions may include which sampler to pick and where to place the samplers in the query plan. For example, sampling the raw inputs may provide the most advantageous performance but may also violate the error guarantee (e.g., with high probability no groups are missed and small error for aggregates). Example techniques discussed herein may provide an ASALQA technique (e.g., short form for place Appropriate Samplers at Appropriate Locations in the Query plan Automatically). ASALQA is an example cost-based query optimizer that may be based on the CASCADES framework (see, e.g., Goetz Graefe, "The Cascades Framework for Query Optimization," In *Journal of IEEE Data(base) Engineering Bulletin*, Vol. 18, No. 18, 1995, pp. 19-28) that supports samplers natively and reasons about both performance and cost. Example techniques discussed herein may deal more extensively with query optimization over samplers for (at least) three reasons. First, the space of possible plans may be substantially larger since any operator can be followed by a sampler. Second, the choice of sampler type and where samplers appear in the plan may involve a complex trade-off between performance and error. Third, adding samplers may involve substantially different query plans. Since a sampler reduces cardinality, joins may be implementable more cheaply and parallel plans may be replaced with sequential plans. Hence inserting samplers in an ad-hoc fashion, for example, after query optimization, may lead to less useful plans.

An example system such as ASALQA may optimistically place a sampler before every aggregation. Then, several transformation rules may generate plan alternatives wherein samplers are moved closer to the input past other database operators such as join, select, and project. Rules may edit the requirements on that sampler to encode the trade-offs between various sampled plans. For example, when pushing a sampler to before a select, stratifying on predicate columns may guarantee that error will be no worse. However, performance may be unacceptable if there are many columns to stratify having many distinct values. If the input relation has many rows and the select is not too selective, it is possible to probabilistically guarantee that no groups will be missed even without stratifying on the predicate columns. For example, ASALQA has several such rules. After generating the various alternatives, ASALQA may select the most advantageously performing plan among those that meet the error guarantee.

The plans output by an example system such as ASALQA may have multiple samplers. For example, plans may have samplers deep in the query plan. Further, ASALQA may declare a query to be unapproximatable (e.g., this may occur for roughly 25% of the TPC-DS queries and for various reasons such as the answer lacking enough support).

An example system such as ASALQA can reason about the error of a sampled expression. For example, a query expression may be transformed with arbitrarily many samplers to an equivalent one that has one sampler at the root. In particular, an example technique may be generalized to the case where answers can have groups (see, e.g., Nirkhiwale, et al., "A Sampling Algebra for Aggregate Estimation," In Ω*Proceedings of the* 39*th International Conference on Very Large Data Bases Endowment*, Vol. 6, Issue 14, Aug. 26, 2013, pp. 1798-1809—that considers SUM-like aggregates). The result may also be generalized to a broader class of samplers that are not generalized-uniform-samplers; for example, a universe and distinct sampler may not be uniformly random. Further, the error metrics for ASALQA plans may be computed in one pass over data, whereas in general error bounds may involve a self-join (see, e.g., Nirkhiwale, et al., id) or bootstrap (see, e.g., Zeng et al., "The Analytical Bootstrap: a New Method for Fast Error Estimation in Approximate Query Processing," In *Proceedings of the* 2014 *ACM SIGMOD International Conference on Management of Data* (SIGMOD'14), Jun. 18, 2014, pp. 277-288; Agarwal, et al., "Knowing when you're wrong: building fast and reliable approximate query processing systems," In *Proceedings of the ACM SIGMOD International Conference on Management of Data*, Jun. 22, 2014, pp. 481-492).

Experimental results over queries in the TPC-DS BENCHMARK (and implementing example techniques discussed herein in a query optimizer) have indicated a median reduction of 2× in resources used. Such an example improvement in job runtime may depend on the available degree of parallelism, and may be larger. In experimental results, for over 90% of queries, QUICKR does not miss groups. For example, many of the misses are due to LIMIT100 on the aggregation column. When considering the full answer, experimental results have indicated that example techniques discussed herein may not miss groups for 99% of queries. For example, aggregations may be within ±10% of their true value in 80% of the queries; 92% of queries may be within ±20%. In contrast, BLINKDB may provide a median gain of 0% even when given 10× the input size to store samples. That is, at least half the queries may receive no benefit.

Thus, example techniques discussed herein may provide a way to lazily approximate complex ad-hoc queries with zero apriori overhead. Through analysis over queries in a big-data cluster, results have indicated that apriori samples may be untenable because query sets make diverse use of columns and queries are spread across many datasets. At the same time, the large number of passes over data per query may make lazy approximations advantageous. As discussed further herein, a universe sampler operator may effectively sample join inputs.

Example techniques discussed herein may automatically output sampled query plans only when appropriate.

As a further example, queries may be sped up more by reusing sampled expressions across queries (aka view matching) and by executing sampled plans in an online manner (see, e.g., Hellerstein, et al., "Online Aggregation," In *Proceedings of the ACM SIGMOD International Conference on Management of Data*, Vol. 26, Issue 2, 1997, pp. 171-182). The discussion below is organized as follows: analysis of queries from an example production cluster; description of samplers; an example ASALQA algorithm; error analysis; and experimental results.

FIG. 1 is a block diagram 100 of an example query 102. Per item color and year, the query 102 computes a total profit from store sales 108 and the number of unique customers who have purchased and returned from stores and purchased from catalog. Item 104 and date 106 are dimension tables joined (118, 120) on a foreign key. The other three (store sales 108, store returns 110, catalog sales 112) are large fact tables joined (114, 116) on shared keys. Since joining two fact tables involves two reads and one shuffle, the query 102 incurs many passes over data.

An example input sample may stratify store sales on {item_sk, date_sk, customer_sk} because store sales is the largest table and all three columns appear in the answer. However, the stratified sample on distinct combinations of the three columns may be as large as the input, which may lead to zero performance gains.

Example techniques discussed herein may yield a substantially different sampled query plan: for example, at extraction on all fact tables, universe sample on customer_sk. This example technique may succeed because such an example technique reasons that (a) the universe sample on customer_sk leads to a substantially perfect join (on some subspace) for both of the fact-fact joins and (b) the group {i_color, d_year} has only a few distinct values and each fact table has over $10^9$ rows. Hence, there may be many rows per {i_color, d_year} group. Further, the group columns are independent with the join keys since different random subsets of customers may have similar likelihood of purchasing different colored items over years.

The universe sampler can also estimate the number of unique customers, which is the same column whose value it sub-samples on, because the number of unique customers in the chosen subspace can be projected up by the fraction of subspace that is chosen. Example techniques discussed herein may substantially speed up this query, as the data in-flight after the first pass reduces by the sampled probability and there may be up to 4 subsequent passes over this data.

It may be observed that small changes in the query can lead to substantially different sampled plans. If some user-defined operator (UDO) applies on store_sales, example techniques discussed herein could place the universe sampler after that UDO. Experimental results have indicated that many queries may have samplers in the middle of the query plan. Considering a more substantial change, if the query only had store_sales, i.e. no joins with the other fact tables, example techniques discussed herein may prefer a uniform sampler on store_sales. As discussed further below, the uniform sampler may involve smaller variance than the universe sampler. If the answer were in addition grouped on i_category and i_name from item, the group may include many distinct values, and example techniques discussed herein may distinct sample the store_sales table on ss_item_sk. That is, example techniques discussed herein may stratify on join keys to mimic stratification on group-by columns from item. Further, if the group has d_date instead of d_year, that is, the answer has one group per day, then example techniques discussed herein may declare the query unapproximatable since stratifying store_sales on both {ss_item_sk, ss_date_sk} may not reduce rowcount.

In accordance with example techniques discussed herein, sampling operators may be injected into the query tree. In this context, "query tree" may refer to a tree that corresponds to a relational algebra expression, where leaf nodes of the tree include input relations and internal nodes include relational algebra operations. For example, a query parser may input a query and generate an initial query tree (without optimization). For example, in generating the initial tree, Cartesian cross may be applied for relations in FROM clauses, then the conditions (join and selections) from WHERE clauses, and projections from SELECT clauses may be added. As used herein, reference to injecting entities (e.g., samplers) into a query plan refer to injections into the query tree.

Suppose query Q over input I has answer Q(I). Apriori sampling techniques may search for the most advantageous sample of input I' such that Q(I')≈Q(I). Instead, example techniques discussed herein may search over the space of sampled query plans for the most advantageous query plan Q' such that Q'(I)≈Q(I). In both cases, "most advantageous" may imply most advantageous performance subject to the answer meeting error guarantees or vice-versa. The approaches are complementary. As discussed further below, example techniques discussed herein may be advantageous for approximating queries in big-data clusters.

In experimental analysis, production queries at an example large Internet services company were analyzed over a two month period. The example cluster included tens of thousands of servers. Overall, $O(10^8)$ example queries were submitted by $O(10^4)$ example unique developers. The example query language included a mash-up of relational (~SQL) and user-defined operations. The example query set included: (a) ad-hoc queries written by developers and (b) production jobs which cook new data (e.g., ETL (Extract, Transform and Load)) or mine logs to construct dashboard-style reports.

Figure 2:
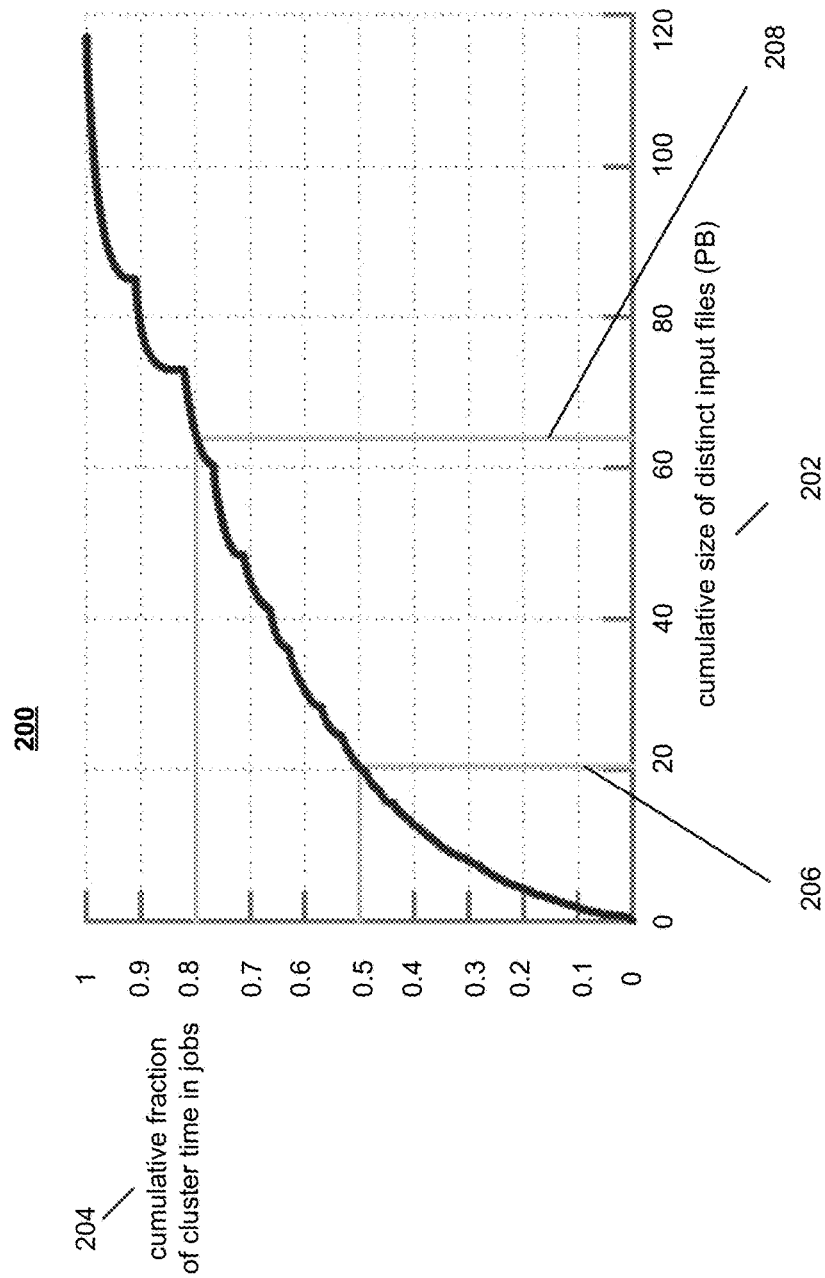
FIG. 2 is a graph summarizing example experimental findings for example queries.

If most queries touch a small number of inputs, then it may be worthwhile to store apriori samples for those inputs. FIG. 2 summarizes example experimental findings for the $O(10^8)$ example queries, with a graph 200 having a y-axis indicating a cumulative fraction of cluster time in jobs (202) and an x-axis indicating a cumulative size of distinct input files, in petabytes (PB) (204). As shown in the example of FIG. 2, the example queries accessed many different example inputs. The example of FIG. 2 was generated as follows for a two week period: (1) Compute per input the total cluster hours used by queries that read the input; (2) When a query has multiple inputs, apportion its cluster hours among the inputs proportional to input size; (3) Sort inputs in decreasing order of their cluster hours; (4) Traversing in that order, compute the cumulative size of the input and the cumulative cluster hours. As shown in the example of FIG. 2, jobs that accounted for half the cluster-hours touched 20 PBs of distinct files (206). The last 25% of queries, the tail, accessed another 60 PBs of files (208).

To store differently stratified samples, apriori storage techniques may use sample storage of 1× to 10× the size of the input (e.g., BLINKDB). The example results shown in FIG. 2 indicate that the smallest input set used by 20% of queries was approximately 3 PB. Hence, if input popularity could be predicted perfectly, covering 20% of queries would involve between 3 PB and 30 PBs of apriori samples. Such a large sample set is already a substantial fraction of the total example input size (120 PB). Example techniques discussed herein may target the substantial majority of other queries and need no apriori samples.

As discussed above, no stored samples implies that example techniques discussed herein may read all input data once. As shown in Table 2 below, the median query in the cluster takes 2.25 effective passes over data (e.g., with "effective passes" computed as $(\Sigma_{task_t} \text{input}_t + \text{output}_t)/(\text{job input} + \text{job output}))$.

TABLE 2

| Metric | Percentile Value | | | | |
|---|---|---|---|---|---|
| | 25th | 50th | 75th | 90th | 95th |
| # of Passes over Data | 1.83 | 2.45 | 3.63 | 6.49 | 9.78 |
| 1/firstpass duration fract. | 1.37 | 1.61 | 2.09 | 6.38 | 17.34 |
| # operators | 143 | 192 | 581 | 1103 | 1283 |
| depth of operators | 21 | 28 | 40 | 51 | 75 |
| # Aggregation Ops. | 2 | 3 | 9 | 37 | 112 |
| # Joins | 2 | 3 | 5 | 11 | 27 |
| # user-defined aggs. | 0 | 0 | 1 | 3 | 5 |
| # user-defined functions | 7 | 27 | 45 | 127 | 260 |
| Size of QCS + QVS | 4 | 8 | 24 | 49 | 104 |

By sampling on the first pass, it may be estimated that example techniques discussed herein may speed-up an example median job by 2.25×. By this example, 10% of queries may be sped up by over 6×. However, the practical gains may be less, because not all queries are approximatable (as discussed further below), or substantially more because the samplers can also speed up the computation on the first pass (e.g., less data to partition and write out).

Query answers can be aggregates such as a SUM, COUNT, AVG or aggregations over groups such as SELECT X, SUM(Y). An example goal of approximation is to not process all the data, yet obtain (a) an unbiased estimate of the answer per group (e.g., true sum≈20*sum for a 5% sample) that is within a small ratio of the true answer with high probability (whp), (b) ensure that no groups are missed whp, and (c) offer an estimate of the expected error per aggregation. Queries for which this is possible may be referred to herein as being "approximatable."

An example intuition behind the approximatability of a query is the "support" per group of the answer. In this context, "support" may refer to the number of data rows in the input that contribute to each group. Simple aggregations may have support equal to the number of rows in the input. The support may vary across groups. In general, queries with large support may receive high performance gains from approximation since even a small probability sample can produce an answer that is close to the true answer. If the underlying data value has high variance, more support may be needed. For example, typical big data queries may have large support due at least in part to their large inputs.

As shown in the example of Table 2, queries may also have joins, selects, projects and user-defined code, all of which may further complicate approximatability. Row-local operations that take one or more columns and yield a column such as DayOf (X: date) may be distinguished from aggregation operations that take a collection of rows having a common value of the group-by columns and yield zero or more rows such as X, MODE(Y). For example, the former may be referred to herein as user-defined functions (UDFs) and the latter as user-defined aggregates (UDAs). An example median query has tens of UDFs and a few UDAs. Also, the example median query has a few joins, some of which are not foreign-key joins.

To quantify the complexity of these operations, the phrase Query Column Set (QCS) (e.g., terminology from BLINKDB) may refer to the subset of the input columns that appear in the answer or impact which rows belong in the answer. For example, the QCS of SELECT X, SUM(Y) WHERE Z>30 is {X, Z}. The corresponding query value set (QVS) is {Y}, i.e., the columns that appear in aggregates. Newly generated columns that appear in the QCS or QVS may be recursively replaced with the columns that were used to generate that (newly generated) column. For example, the size of QCS∪QVS may exceed 8 for 50% of queries, as shown in Table 2. Further, the size of the median QCS may also be 8.

BLINKDB constructs stratified samples on the QCS sets. Observing that the value of columns in the QVS can have high skew, STRATIFIEDSAMPLING (see, e.g., Chaudhuri et al., "A robust, optimization-based approach for approximate answering of aggregate queries," In *Proceedings of the ACM SIGMOD International Conference on Management of Data*, 2001, pp. 295-306) stratifies on QCS∪QVS.

In light of the above background, one may posit that apriori sampling may provide unacceptable query coverage even when given storage space that is many times the size of the dataset. First, the QCSets may have many columns. Since a goal of stratification is to store some rows for every distinct value of the columns in QCS, the more columns in the QCS, the more the distinct values and larger the stratified sample for that QCS. Second, cumulatively queries may have very diverse QCSets. Queries with different QCS will not benefit from the same stratified sample. Roughly, the less the intersection between the two QCSets the less useful the sample may be. In an extreme case, when the QCSets have no overlap, sharing the sample may have the same error profile as a random sample (e.g., uniform sample=strat sampler with empty QCS) or worse if the QCSets have correlated values. As a result, given a storage budget, apriori sampling techniques may choose carefully which QCSets to stratify on so as to help the largest set of queries. By injecting samplers into the query graph, example techniques discussed herein may completely avoid this issue.

Further, many queries that appear unapproximatable for input samples may be sped up by example techniques discussed herein. Consider a query with a large QCS. Stratified sample on that QCS may be as large as the input. However, example techniques discussed herein may place a sampler after selections or joins whose (complex) predicates contributed many of the columns in the QCS. If the selects are pushed down to the first parallel pass on data, the gains from example techniques discussed herein may be substantial.

With regard to handling joins, it may be observed that join between a fact and a dimension table is effectively a select since the foreign key relationship ensures that exactly one row will match out of the dimension table. The above issues with select may apply here. Many conventional techniques sample just one of the join inputs. Doing so may not speed up queries where both input relations may involve a substantial amount of work. As explanation of an issue with sampling both inputs, consider a two table join where $T_1$ has 80 rows with X=1 and $T_2$ has 1 row with X=1. The join is on column X To ensure that each tuple appears in the output with the same probability, a 25% sample on the join output may involve 50% samples of both inputs (since a tuple will appear in output only if both its constituent tuples in the inputs are sampled and 0.25=0.5*0.5). That is, the join inputs may be sampled with a quadratically higher probability. Even so, sample-and-join has a higher variance. For example, the probability that rows with X=1 disappear after join-then-sample is $10^{-10}$ and with sample-then-join, it is 0.5. As explanation, $T_1$, $T_2$, and $T_1 \bowtie T_2$ have 80, 1, 80 rows with X=1 respectively. Hence, the probability of missing X=1 is $(1-0.25)^{80}=10^{-10}$ for join-then-sample and is $1-((1-(1-0.5)^{80})*0.5)=0.5$ for sample-then-join.

The issue arises because the join output depends on the joint distribution over the two inputs but such joint distribution may not exist apriori. Further, it may be expensive to compute when these relations are intermediate content generated in the midst of executing a deep query. A more advantageous sampler may have over-sampled the rows with X=1 in $T_2$ since that value occurs more often in $T_1$. Such correlation-aware samplers may exist but they may be cumbersome to implement in parallel (since they build statistics and indices on one join input and use that to sample the other input) and may be somewhat ineffective because the sampler may not be pushed down further on the inputs. In contrast, the example universe sampler discussed herein may sample both join inputs without any data exchange between the inputs at runtime, thereby providing a speed-up of many more queries.

In summary, an analysis indicates the following: Distribution of queries over input datasets may be heavy-tailed. Individual queries may use many columns and cumulatively they may use a diverse set of columns such that the additional storage space for storing may be unacceptably large. Queries may have aggregation operators, large support and output<<input, so they may be approximatable. However, several factors may hinder approximatability: queries may use a diverse set of columns involving extensive stratification. Many join multiple large input relations. Queries may be deep involving multiple effective passes over data including network shuffles.

Figures 3A, 3B:
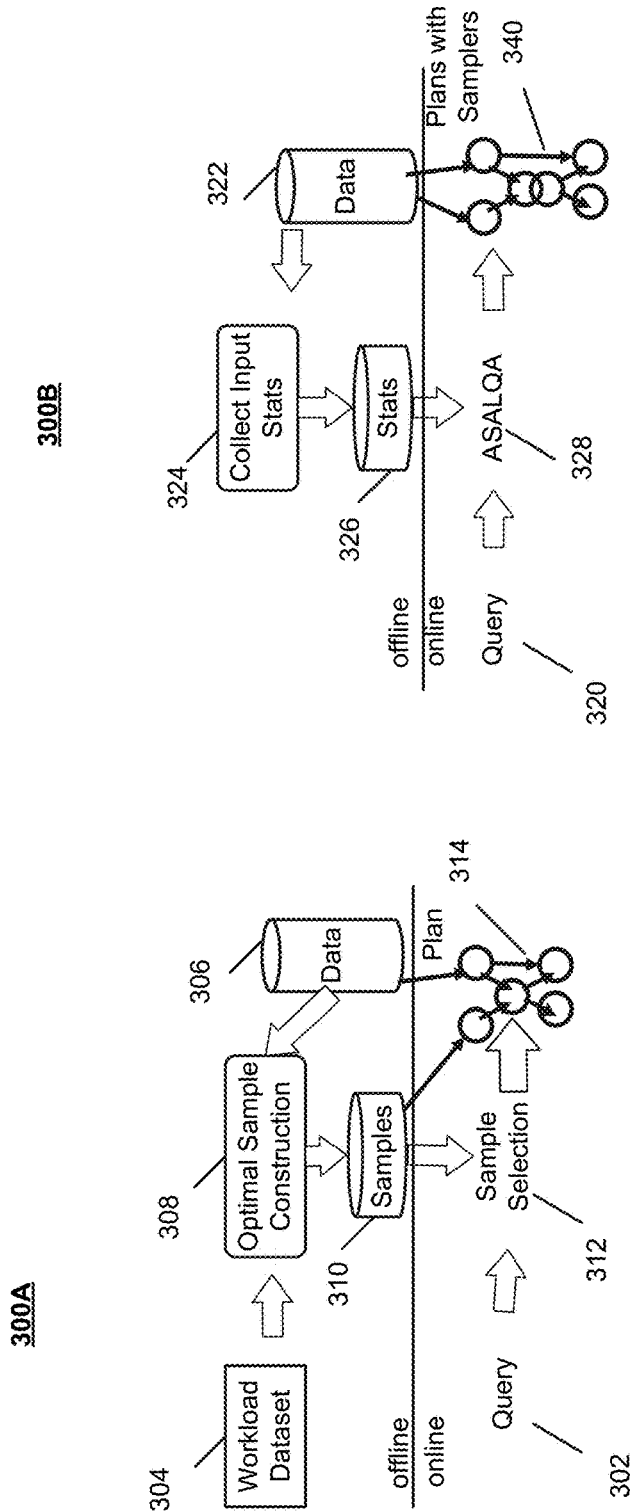
FIG. 3A is a block diagram illustrating an example workflow for generating a query plan for approximation using apriori sampling.
FIG. 3B is a block diagram illustrating an example workflow for generating a query plan for approximation using samplers in lieu of apriori samples.

FIG. 3A is a block diagram 300A illustrating an example workflow for generating a query plan for approximation using apriori sampling. As shown in FIG. 3A, a query 302 is input to an apriori sample system. A workload dataset 304 and data 306 are used as input for an optimal sample construction 308 that determines samples 310. A sample selection 312 is then used by a query plan 314 for approximations of the query 302. As shown in FIG. 3A, the sample processing may be performed offline, while the query processing may be performed when the query arrives.

FIG. 3B is a block diagram 300B illustrating an example workflow for generating a query plan for query approximation using samplers in lieu of apriori samples. As shown in FIG. 3B, a query 320 is input to a system using samplers in query plans. Data 322 may be used to collect input statistics (324) as statistics input 326 for use by ASALQA 328 to determine plans with samplers 340. As shown in FIG. 3B, the input statistics processing may be performed offline, while the query processing may be performed online.

For example, a system such as QUICKR may use statistics 326 of the input datasets 322 to generate at query optimization time an execution plan 340 with samplers placed at appropriate locations, as discussed further below.

Example goals of such a system may include:
1) Laissez-faire: minimal overhead to administrator, support ad-hoc queries over any datasets and use no additional storage.
2) Support large fraction of SQL+big-data workload including general joins and UDFs.
3) Performance gains: At least 2×. Possibly more from reusing samples and better matching with physical data layout.
4) Useful error models: with high probability (whp) miss no groups and keep aggregates within a small ratio off their true values and offer confidence intervals.

Example techniques discussed herein may use at least three example types of sampling operators ("samplers"). Each sampler passes a subset of the input rows. The subset may be chosen based on policies as discussed below. In addition, each operator appends one metadata column representing the weight to be associated with the row. For example, the weight may be used to estimate the true value of aggregates and the confidence intervals. For example, samplers may run in a streaming and partitionable mode. That is, they may execute in one pass over data, quickly, and with negligible or bounded memory footprint. Further, when many instances of a sampler run in parallel on different partitions of the input, the union of their output mimics that of one sampler instance examining all of the input. These assumptions may enable placing the samplers at arbitrary locations in a parallel query plan.

The mathematical derivation of the unbiased estimator and variance of each sampler is discussed below. For notational convenience, $\Gamma$ may denote a sampler. For example, each sampler allows (at least) a subset of input rows to pass through.

Given probability p, an example uniform sampler $\Gamma_p^U$ lets a row pass through with probability p uniformly-at-random. The weight column is set to $$\frac{1}{p}.$$

For example, this may be contrasted with an alternative operator that picks a desired number of input rows uniformly-at-random with or without replacement. Such samplers do not meet the requirements above: even if implemented with reservoir sampling so as to finish in one pass over data the memory footprint grows up to the desired output size and they may be difficult to partition. The number of rows output by $\Gamma_p^U$ may be governed by a binomial distribution and each row may be picked at most once. For example, a system such as QUICKR may determine the probability value p so as to trade-off approximation error with estimated job latency.

The uniform sampler is simple but has some issues that may limit it being used widely. Group-by queries such as SELECT X, SUM(Y) GROUP BY X can lose groups in the answer especially those corresponding to values of X that have low support. For such queries, example techniques discussed herein may use the distinct sampler below. The distinct sampler may also be used advantageously when aggregates have high skew. Consider SUM(Y) where column Y has values 1, 1, 100. The projected answer may change substantially whether or not the value 100 is sampled. Even at 50% sampling, the most likely values of the answer are 2 and 202, each of which happens with likelihood ¼ while the true answer is 102.

An example distinct sampler is an operator that stratifies in a streaming and partitionable manner (discussed further herein) and supports stratification over functions of columns. For example, the latter may allow for just enough stratification. For example, stratifying on column sets having many distinct values may not improve performance since almost every row of the input may pass through.

Given a set of functions over a column C, a number δ, and probability p, the distinct sampler $\Gamma_{p,c,\delta}^D$ may ensure that at least δ rows pass through for every distinct value of the columns in C. Subsequent rows with the same value are let through with probability p uniformly-at-random. The weight of each passed row is set correspondingly; i.e., 1 if the row passes because of the frequency check and $$\frac{1}{p}$$

if it passes due to the probability check. Example techniques discussed herein may pick the parameters {C, δ, p} as a byproduct of query optimization plus sampling.

As explanation of how the distinct sampler may improve over uniform, consider the following. Columns that form the group in the answer, those used in predicates and those with high value skew can be added to the column set C. Since the sampler involves passing some rows for every distinct value of columns in C, none of the groups will be missed, some rows will pass the predicate and rows with high value will be picked respectively. Example techniques discussed herein may also allow functions over columns to be added to C. For example, this may help when some stratification is needed but not all. For the {1, 1, 100} example above, stratifying on [Y/100] may suffice since then some rows with Y=100 will pass.

The example techniques discussed herein may employ the distinct sampler on any intermediate relation that is generated in the middle of a query execution tree. This sampler is single pass, has a bounded resource footprint and is partitionable. A naive implementation would maintain the observed frequency count per distinct value of column set C. If the frequency seen thus far is below δ, it passes a row with weight 1, else decides whether to pass the row with probability p and, if picked, give it a weight of $$\frac{1}{p}.$$

This naive approach may have at least three issues. The first issue is bias. The first few rows always pass through and are more likely to impact the answer. Further, the first few rows picked in the probabilistic mode have a relatively disproportionate impact on the answer since their weight $$\frac{1}{p}$$

is substantially larger than all the previous rows whose weight is 1. Only the more frequently occurring values of C are free from bias since enough rows will be picked for those values in the probabilistic mode. Second, the memory footprint can be as much as the number of distinct values in C. Finally, when running in a partitioned mode, it may not be possible to track how many rows with a particular value of C have been passed by the other (parallel) instances of the sampler. Hence, it may be difficult to ensure that all instances cumulatively pass at least δ rows and p probability henceforth.

Example techniques discussed herein may solve these issues of the naive approach. To be partitionable, if the degree-of-parallelism is D, each instance of the distinct sampler takes a modified parameter set $$\left\{C, \left\lceil\frac{\delta}{D}\right\rceil + \epsilon, p\right\}.$$

Here ∈ may be chosen to trade-off between passing too many rows and passing too few. Consider the two extreme cases—(1) all rows having a distinct value of C are seen by the same instance or (2) rows are uniformly spread across the instances. Case (1) may be less frequent but can happen, for example, if the input is ordered by the column set C. The total number of rows passed by all instances is $$\frac{\delta}{D} + \epsilon$$

for case (1) and $\delta + D\epsilon$ for case (2). Example techniques discussed herein may use $$\epsilon = \frac{\delta}{D}$$

since, in practice, the distribution of rows across sampler instances may more closely resemble case (2).

For small memory footprint, example techniques discussed herein may adapt a sketch that identifies heavy hitters in one pass over data (see, e.g., Manku et al., "Approximate Frequency Counts Over Data Streams," In *Proceedings of the 28th International Conference on Very Large Data Bases*, 2002). Using this sketch, example techniques discussed herein may maintain approximate frequency estimates for only the heavy hitter values in memory that is logarithmic in the number of rows. Thus, the distinct sampler's gains arise from probabilistically passing rows that have a frequently occurring value of C. To do so, it suffices to track the heavy hitters. In particular, for an input size N and constants s, τ, the sketch may identify all values that occur with frequency ≥sN+τN and estimate their frequency to within ±τN off their true frequency. The memory required may be $$\frac{1}{\tau}\log(\tau N).$$

Example techniques discussed herein may use $\tau=10^{-4}$, $s=10^{-2}$ for a memory footprint of 20 MB with $N=10^{10}$ input rows.

To reduce bias, example techniques discussed herein may hold in a reservoir rows that are early in the probabilistic mode and may pass them with the correct weight. In more detail: per distinct value, pass the first δ rows with weight 1. Subsequently, maintain a reservoir (e.g., storage) of size S. When more than $$\delta + \frac{s}{p}$$

rows are seen, flush rows held in the reservoir with weight $$\frac{1}{p}.$$

From then on, pick rows with probability p, i.e., no more reservoir. When the sampler has seen all rows, flush rows in all non-empty reservoirs with weight $$\frac{freq - \delta}{reservoir\ size}$$

where freq is the number of observed rows.

As an example: suppose δ=10, p=0.1, S=10. Distinct values of C with freq in [1, 10] will not use a reservoir. All their rows pass with weight 1. Those with freq in (δ, δ+S/p]=[11, 110] will use the reservoir. For a value with freq of 30, its first ten rows pass right away, the next twenty go into the reservoir and some random ten of them will be flushed at the end with a weight of $$\frac{freq - \delta}{reservoir\ size} = 2.$$

The probability of a row numbered in [11, 30] to be emitted is ½. Further, for values with freq above 110 their reservoir empties once the 111'st row is seen, at which time the ten rows from the reservoir are passed with weight of 10. This example technique may unbias because samples passed by the reservoir receive a correct weight. Further, only a small reservoir may be kept (no more than S) and only for distinct values that have observed frequency between δ and δ+S/p. Hence, the memory footprint may be substantially smaller than straightforward reservoir sampling.

In accordance with example techniques discussed herein, an example universe sampler is an operator that uniquely allows an example system such as QUICKR to sample the inputs of general joins. Consider the following example query:

SELECT COUNT(DISTINCT order),SUM(ws.profit)

FROM ws JOIN wr ON ws.order==wr.order    (1)

For this example, web-sales (ws) and web-returns (wr) are large fact tables being joined on a shared key. As discussed further herein, uniform sampling both inputs may not be useful. Distinct sampling both inputs may have limited gains if the join keys have many columns and hence, many distinct values. Correlation-aware samplers may be inefficient (since they construct histograms or indices on join inputs) and ineffective (since they may require samplers to immediately precede the join and prevent the sampler from being pushed down further). Generalizing the above example, similar cases happen with self-joins and set operations over multiple tables such as counting the number of orders that occur in either table, both tables, or exactly one table. All such cases are approximatable (aggregations and output size<<input) but conventional samplers may not help As insight behind universe sampler, some of the issues in sampling join inputs arise from the ambiguity between the rows chosen independently from the two sides. Instead, suppose the value of the join keys is projected into some high dimensional space (e.g., using a hash function). Both inputs pick the same random portion of this dimensional space. That is, both join inputs pick all rows whose value of join keys falls in some chosen subspace. For the above example, both join inputs can pick rows with Hash(order) &3=2. This yields a 25% sample. Further, an unambiguous join can be performed on this restricted subspace of key values.

The universe sampler takes as input a column set C and a fraction p. It chooses ap fraction of the value space of the columns in C. And, passes all rows whose value of columns in C belong to the chosen subspace. Related pairs of samplers will pick the same subspace.

The universe sampler, as discussed herein, is partitionable and may need only one-pass: whether or not a row passes may depend only on the values of the columns in C, so the sampler may keep no state across rows. As a corollary, different instances that process different subsets of the input would make the same decisions. An example implementation may use a cryptographically strong hash function. For example, hashing may be used because in general it may not be straightforward to randomly pick a value subspace without apriori knowledge of the domain; determining the possible values of C for an intermediately generated relation costs another pass over data. Hashing also allows configurable variation of the desired sample size by choosing a corresponding portion of the hash range.

Both the universe and distinct samplers are not uniformly random. In spite of this, error metrics may be estimated and commutativity of the samplers with other database operations may be ensured. This enables pushing samplers further down the query tree and closer to the raw input. As discussed below, when choosing samplers, example techniques discussed herein may employ the universe sampler only when the stratification requirements can be met (due to independence between columns, high support or due to enough non-overlapping columns). Otherwise, example techniques discussed herein may use the distinct sampler on only one of the join inputs. For some aggregations, such as COUNT and COUNT DISTINCT, column independence may not be needed for the answer to be unbiased (e.g., COUNT (order) above). The universe sampler is applicable for equi-joins over arbitrarily many columns. For the query of FIG. 1, the universe sampler can be used for multiple joins on a tree (there, the join key was the same). In short, universe sampling can be used for exactly one set of columns in any query sub-tree that has an aggregate at the root. From Rules-$V_{3a}$ and $V_{3b}$ discussed below, pre-existing universe columns can be pushed down to either or both sides of other joins (the universe columns may be available on those relations). For example, the universe sampler may be considered as a predicate that passes only the rows whose values of the universe columns belong to the chosen subspace. By integrating with the query optimizer example techniques discussed herein may consider various join orders and various choices of universe columns and pick the one with the most advantageous performance gain. Experimental results have indicated that many otherwise un-approximatable queries may benefit from the universe sampler.

Given an input query, a goal of an example system such as ASALQA is to output an execution plan with appropriate samplers inserted at appropriate locations. An example target may include the plan that achieves the most advantageous performance while supporting the error goal (whp no groups are missed in the answer and the value of an aggregation is no more than a small ratio off its true value).

Example techniques discussed herein may deal more extensively with query optimization over samplers for at least three reasons. First, since every operator can be followed by a sampler, the space of possible execution plans with samplers is substantially larger. Second, the choice and location of samplers affects query performance and accuracy in a nuanced manner. Sampling closer to the extraction stage (i.e., scan operator) may provide the most advantageous performance, as the work in every later stage will reduce. However, as discussed above, pushing samplers past other operators is non-trivial. Third, adding samplers may lead to substantially different parallel plans relative to the case without samplers. Since a sampler reduces cardinality, joins may become implementable more cheaply (e.g., by replacing parallel or pair join with a cross join). Inserting samplers after query optimization may thus be less useful than extending QO to support samplers natively.

Implementation of example techniques discussed herein may extend a CASCADES-style cost-based optimizer. For example, query optimization in CASCADES includes two main phases. In the logical plan exploration phase, a set of transformation rules generate alternative plans. The physical plan creation phase converts each logical operation to a physical implementation.

An example ASALQA technique as discussed herein may have four main parts. First, samplers are injected into the query execution tree before every aggregation. Intuitively, this represents a potential to approximate at that location. Second, example techniques discussed herein have a set of transformation rules that push samplers closer to the raw input. These rules encode dominance among sampled expressions. That is, the alternative expression generated by the rule has a no worse probability of missing groups and a no worse error for aggregates. Third, following the sampler, reductions may be triggered in degree-of-parallelism which can improve the overall plan. Finally, plan costing uses data statistics to identify superior plans, both in terms of performance and accuracy.

During the logical exploration phase, the sampler has internal state that encodes the requirements on the sampler. Denoted by $\{S, U, ds, sfm\}$, S and U are the columns that the sampler is to stratify or universe sample upon respectively (also referred to herein as strat cols and univ cols). The state also includes two doubles: ds, short for downstream selectivity, estimates the cumulative selectivity of operators between the sampler and the answer, and sfm, short for stratification frequency multiplier which is discussed further below. As discussed above, samplers have different physical state, e.g., the uniform sampler $\Gamma_p^U$ involves sample probability and the distinct sampler $\Gamma_{p,c,\delta}^D$ also involves strat col set and the minimum frequency. The needs in the logical state may be implementable by one or more physical samplers. The needs evolve when the samplers are moved by the transformation rules and so the possible implementations also change. After exploration, example techniques discussed herein pick the best sampler that meets the needs.

FIG. 4 illustrates example instructions 400 for seeding samplers into a query plan. The example logic 400 inserts samplers 406 into the query execution plan in front of every statement that has aggregations. This may be optimistic, i.e., ASALQA may replace the sampler with a pass-through operation if the error goal cannot be met.

As shown in FIG. 4, the example technique may replace each SQL select statement with three statements. A precursor 404 mimics the original statement 402 but for aggregations. In particular, the precursor 404 receives all of the JOIN clauses, WHERE clauses, UDOs and AS projections from the original statement 402. Aggregations in the precursor 404 are replaced with their corresponding input columns. A successor statement 408 performs these aggregations. Each aggregation is rewritten to (a) an unbiased estimator of the true value computed over the sampled rows and (b) is augmented with an (optional) column that offers a confidence interval over the estimator. Table 3 below illustrates some example aggregation operations that have been rewritten by the example technique.

TABLE 3

| True value | Estimate rewritten by QUICKR |
|---|---|
| SUM (X) \| COUNT (*) | SUM (w· X) \| SUM (w) |
| AVG (X) | SUM (w· X) / SUM (w) |
| SUM (IF(F(X) ? Y: Z)) | SUM (IF (F (X) ? w· Y: w· Z))‡ |
| COUNT (DISTINCT X) | COUNT (DISTINCT X) · (univ (X) ? w:1) |

‡COUNTIF and COUNT(X) are rewritten analogous to SUMIF

The successor 408 also receives the having and order-by clauses from the original statement 402. A sampler statement 406 is introduced between the precursor 404 and successor 408. Columns that appear in the answer, e.g., A in FIG. 4, are added to the stratification column requirement (S) in the sampler 406. Columns appearing in the *IF clauses (SUMIF, COUNTIF), in SUM and in COUNT(DISTINCT) (e.g., C, E in FIG. 4) are optionally added to the set S. As discussed above, stratification may ensure that the answer has all groups and corrects for value skew.

Figure 5:
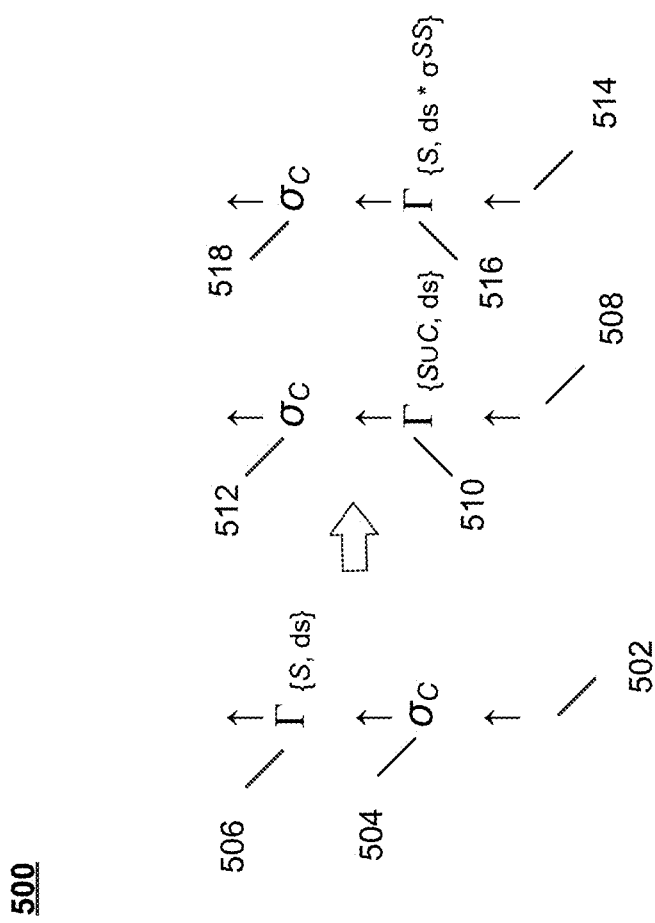
FIG. 5 illustrates an example generation of alternative query plans transformed by pushing samplers past SELECT statements.

FIG. 5 illustrates an example generation 500 of a query plan transformed by pushing samplers past SELECT statements. As shown in FIG. 5, an expression 502 may include a select 504 and a sampler 506. An alternative 508 includes sampler 510 and select 512, while alternative 514 includes sampler 516 and select 518. Starting with a simple non-trivial transformation rule that pushes samplers 506 past select 504, example techniques discussed herein generate the alternatives 508, 514 on the right in FIG. 5 whenever the expression 502 on the left appears. In this example, $\sigma_c$ 504 denotes a select that uses columns C in its predicate. Let $\sigma^{SS}$ be its selectivity (e.g., $\sigma^{SS}$=rows in output of σ/rows in input). Only the relevant fields for sampler state are shown. The following discussion is provided for an understanding of why this rule may help.

The first alternative 508 stratifies additionally on the predicate columns C. Doing so may ensure that error will be no worse since at least some rows pass the sampler 510 for every distinct value of C. However, it may have worse performance. Since the more columns in C, the greater the number of distinct values in the stratified column set S∪C, the sampler 510 may have to pass every incoming row. The second alternative 514 retains performance gain potential at the cost of additional error. If the sampler 516 were to not stratify on the columns in C, its performance gain potential is no worse than before. However, there may be fewer rows in the answer by a factor of $\sigma^{SS}$. Hence, it may be more likely to miss groups or have higher aggregate error since per-group support also decreases. It may be easily determined when each alternative is preferable: (a) if the select 504 has many predicate columns but is not very selective, the second alternative 514 may be more advantageous; (b) if the select 504 is highly selective, the first alternative 508 may be more advantageous; (c) otherwise, neither alternative may be more advantageous. Example techniques discussed herein explore all alternatives and find the most suitable.

Additionally, in both alternatives 508, 514 the sampler (510, 516) may reduce the work in the select (512, 518) since it operates on fewer rows now, which may lower the overall performance cost. The alternatives 508, 514 may also move the sampler (510, 516) closer to the raw input. If the select (512, 518) is a conjunctive predicate ("and"), the logic above may be applied per conjunction. When some predicate columns C are already in the strat cols S, the first alternative 508 may need no correction. For the second alternative 514, example techniques discussed herein may use a heuristic to determine a smoother degradation of ds.

FIGS. 6A-6B illustrate an example generation of a query plan transformed by pushing samplers past JOIN statements. The transformation rules to push sampler past an equi-join may have substantial implications on performance. As shown in FIGS. 6A-6B, a sampler can be pushed down to one or both inputs. As shown in FIG. 6A, L 602 and R 604 are two input relations and $K_l$, $K_r$ the corresponding join keys for a join 606. When pushing a sampler 608 past join 606, two considerations may arise: (i) continue to meet the stratification and universe requirements in the sampler's logical state S, and (ii) account for the additional changes to the answer due to the join 606 following the sampler 608. As shown in FIG. 6B, L 610 and R 612 are two input relations and $K_l$, $K_r$ the corresponding join keys for a join 618, with samplers 614, 616 pushed past join 618.

As shown in FIG. 6B, the samplers 614, 616 are pushed past joint 618 as "direct" inputs to the join 618 (i.e., no other inputs to the join 618 between either of the samplers 614, 616 and the join 618).

FIGS. 7A-7B illustrate example instructions for pushing samplers past joins. As shown in FIG. 7A, inputs 702 include sampler state, relational inputs of join with columns, and columns used as join keys, while output is indicated as a vector of alternate samplers on one or both inputs of a join.

As shown in FIG. 7A, an example function NumDV(C, R) 704 determines a number of distinct values of columns C in relation R. An example function ProjectColSet ( ) 706 projects column sets.

An example function OneSideHelper 708 considers (710-714) different subsets of $K_{rem}$ to add to strat cols (712) and adjusts ds accordingly (716).

An example PushSamplerOnOneSide function 720-724 in FIG. 7B considers pushing the sampler to the left input. For example, a goal is to find sampler $S_l$ such that $\Gamma_{S_l}$ (L) ⋈ R is an alternate for $\Gamma_S$ (L⋈R). The example technique first tries to satisfy the universe and stratification requirements in S. If any of the universe columns S.U appear only on the right relation, then pushing to the left is not possible; since some univ cols are unavailable on the left, picking rows in the chosen value subspace of S.U is not possible (e.g., see the check 724 for $|U_l-L^C|==0$ in PushSamplerOnOneSide). If some of the strat cols S.S are missing on the left, however, the example technique stratifies on the left join keys. For example, stratifying store_sales⋈date on d_year can be approximated by stratifying store_sales on the left join key sold_date_sk. Intuitively, stratifying on join key may ensure that some rows will appear on the sampled left to match every row from the right. Hence, the output will receive some rows for every distinct value of the stratified column. However, the join keys may be more or less discriminative than the columns that they replace. In the above example, the join key has 365× more distinct values than d_year; hence the support per group appears much smaller than it is. The example technique uses sfm (stratification frequency multiplier) to correct for this difference. When replacing a stratified column with a more (or less) discriminative join key, the value of sfm goes up (or down) (e.g., see the changes 712 to $sfm_l$ in OneSideHelper 708). Such an example technique may be an enabler in pushing samplers onto large relations while properly accounting for stratification needs. Finally, accounting for the additional changes to the answer may be similar to the case of select. Either the sampler stratifies on the join keys or gets a smaller downstream selectivity.

The example PushSamplerOntoBothSides function 726-730 in FIG. 7B considers pushing a sampler on to both join inputs. For example, a goal is to find samplers $S_l$, $S_r$ such that $\Gamma_{S_l}(L)⋈\Gamma_{S_r}(R)$ is an alternate for $\Gamma_S$ (L⋈R). As shown in 730, calls are made to OneSideHelper to push on to each side of the input. The only substantial change is adding join keys to the corresponding univ cols. As shown in PrepareUnivCol 718, new universe requirements are added if either they do not exist already (|U|==0) or the join keys are identical to the existing requirements (U==K) as in the example query 102 in FIG. 1. As before, the most advantageous option is selected from among these alternatives.

Example techniques discussed herein check for dissonance between the stratification and universe requirements. When a column appears in both sets S and U, picking rows that belong to a chosen subspace of the values of that column (universe) may not yield rows with all values of that column (stratification). Example techniques discussed herein may allow overlap only when |S∩U|«min(|S|, |U|). That is, if only a few columns overlap, the column sets may be considered effectively independent. Further, overlapping columns that appear in S only because of COUNT DISTINCT may be safely ignored in the above check since their value can be estimated correctly (e.g., Table 3).

In conclusion of the transformation rule discussion (above), example techniques discussed herein are noted as pushing samplers past many other operators including projections, union-all's and outer joins. In some cases, it may be more advantageous to push down the sampler. In other cases, costing may be used to decide whether or not pushing down is more advantageous, and to pick among the various choices.

For the universe sampling property to hold, both input relations of a join should have within their sub-trees a similar universe sampler (same column sets and probability). This and other such global requirements may be ensured to be satisfied on the bottom-up pass of the query optimization. Further, parallel plan performance may improve further if samplers are followed by exchanges since the cardinality reduction due to the sampler can translate into a degree-of-parallelism reduction leading to more efficient serial sub-plans or more advantageous implementation choices, as discussed further below.

Reducing the degree-of-parallelism (DOP) may be utilized to get more gains from samplers. To understand why, assume that a sampler reduces the number of rows in a relation by 10×, the work does become $$\frac{1}{10}th$$

now nut start-up costs and other overheads remain the same. For example, reducing the DOP may amortize this overhead and may also trigger improvements later in the plan. For example, pair joins may be replaced with cross joins and parallel plans may be replaced with a serial plan when data in flight is small, saving passes over data. An example system such as QUICKR may introduce exchange operators to reduce the DOP. However, the exchange shuffles data and may increase the cost (in terms of latency and resources to shuffle). Hence, QUICKR'S costing may place exchanges only when the cost is smaller than the gains in subsequent portions of the execution plan.

To ensure that both sides of a join are implemented with the same universe sampler parameters (if at all), on the bottom-up pass of the query optimization, an example implementation of ASALQA rejects plans that do not satisfy such global requirements. It then falls back to the next best choice. Further, the example implementation of QUICKR does not allow nested samplers, because the performance gains from sampling a relation that has been sampled already may not be worth the added potential for error. This too may be implemented during the bottom-up pass.

Costing sampled expressions may aid in picking between alternatives and in determining how to advantageously implement a sampler while meeting all of the requirements in its logical state.

An input to costing includes the estimates per relational expression of its cardinality (how many rows) and the number of distinct values in each column subset. Table 4 shows the statistics that example techniques discussed herein may measure for each input table.

TABLE 4

| Row count |
| --- |
| Average*, Variance*    Per "interesting"‡ column |
| Number of Distinct Values |
| Heavy-hitter Values and Freq. |

*for columns with numerical values
‡columns that appear in select filters, join clauses or contained in the eventual answer If not already available, the statistics may be computed by the first query that reads the table. Using these input statistics, example techniques discussed herein may derive the corresponding statistics for each query sub-expression. For example, the derivation may use heavy hitter identity and frequency.

Using the above statistics, it is possible to reason about how to advantageously implement a sampler so as to meet the requirements encoded in its logical state S={S, U, sfm, ds}. Two high level simplifications may be used, as discussed further herein. To keep performance gains high, sampling may be disallowed with probability >0.1. Second, a fixed error goal may be used: with high probability (e.g., with probability greater than a predetermined threshold probability), do not miss groups in answer and keep aggregate value within ±10% of the true value (e.g., within a predetermined true value threshold).

Meeting these goals may involve the following sequence of questions:

($q_1$): is stratified column requirement S empty or can some sample probability p∈[0, 0.1] ensure that with high probability each distinct value of the columns in S receives at least k rows?
and
($q_2$): is univ col requirement U empty?

An example implementation may use k=30. Answering $q_1$ may involve the cardinality and distinct value derivations discussed above for the input relation. Further, these numbers may be multiplied by ds·sfm. As discussed above, downstream selectivity ds is the probability that a row passed by this sampler will make its way to the answer (after downstream selections or joins), and sfm is a multiplier to correct the effect of replacing strat cols with join keys. If the answer to both $q_1$ and $q_2$ is true, the sampler may be implemented using the uniform sampler. If only $q_1$ is true, a universe sampler may be chosen. If only $q_2$ is true, a distinct sampler may be chosen. It may be checked whether there will be any data reduction, i.e., at least $k_f$ rows exist per distinct value of columns in S. For example, choose $k_f$=3. The default option is to not-sample i.e., implement sampler as a pass-through operator.

Intuitively, the reasoning is that if S and U are empty or if there is substantial support, a uniform sampler may suffice. Universe sampler has higher variance and may be chosen only when needed (U≠∅) and when stratification needs are met (enough support, or $|S \cap U| \ll \min(|S|, |U|)$). Finally, not sampling may be chosen and may be the desired option when (a) the support is small or (b) downstream selectivity ds is so small or stratification requirements are so restrictive that the number of rows per distinct value of S falls below $k_l$. Sampler parameters (sample probability p, δ for distinct) may be chosen as the smallest values that satisfy ($q_1$). As an example, k=30 may be used because anecdotally 30 samples may be needed by central-limit-theorem which may be used to estimate confidence intervals. A parameter sweep, in experimental evaluation, showed that the plans output by example techniques discussed herein may be similar fork k∈[5, 100].

In the discussion herein, it may be seen how an example system such as QUICKR may translate each logical sampler to a physical implementation. Next, the QO costs sampled subexpressions. To enable this, the following changes may be used: (1) Assign the correct cardinality for the samplers based on their sample probability p except for the distinct sampler which will leak more rows due to the requirement to pass at least S rows for each distinct value of strat cols; and (2) Assign the correct processing costs to the samplers per input and output row. The uniform sampler may be determined as the most efficient since it only tosses a coin per row. The universe sampler may be determined as the next most efficient since it uses a cryptographic hash. The distinct sampler may be determined as having the highest processing cost because it makes look-ups into the heavy-hitter sketch and uses more memory for both the sketch and the reservoirs. With this, the example QO is able to cost sampled sub expressions. Those that do not meet error goals may be pruned. Among the remaining plans, the QO picks the most advantageously (e.g., best) performing plan.

Given any query plan ε, with many samplers at arbitrary locations, example techniques discussed herein may offer unbiased estimators of query answers (aggregate values) and may estimate two error metrics: the probability of missing groups and the confidence intervals for aggregate values. First, suppose that a sampler immediately precedes the aggregation and group-by. For example, the Horvitz-Thompson (HT) estimator (see, e.g., Cormode, et al., supra) may be used to calculate unbiased estimators of the true aggregate values and the variance of these estimators. Then a central-limit-theorem may be used to compute confidence intervals. This may not suffice because the samplers in E can be arbitrarily far away from the aggregates. In fact, example techniques discussed herein may push samplers further away to improve performance.

Second, to analyze the case when samplers are at arbitrary locations, a notion of dominance between sampled query expressions is introduced: $\varepsilon_2$ is said to dominate $\varepsilon_1$, denoted as $\varepsilon_1 \overset{*}{\Rightarrow} \varepsilon_2$, iff the accuracy of $\varepsilon_2$ is no worse than that of $\varepsilon_1$ (i.e., accuracy measurement for $\varepsilon_2$≥accuracy measurement for $\varepsilon_1$). This definition mathematically distills the necessary and sufficient conditions to ensure that $\varepsilon_2$ has no worse variance of estimators and no higher probability of missing groups than $\varepsilon_1$.

It may be proved that the transformation rules used by example techniques discussed herein may follow dominance. That is, the generated alternatives have no worse accuracy. The proof rests on showing that dominance transitively holds across database operators:

Proposition 1 (Dominance Transitivity): For pairs of expressions $\varepsilon_1$, $\varepsilon_2$ and $\mathcal{F}_1$, $\mathcal{F}_2$ that are equivalent if all samplers were removed:

$$\varepsilon_1 \overset{*}{\Rightarrow} \varepsilon_2 \Rightarrow \pi(\varepsilon_1) \overset{*}{\Rightarrow} \pi(\varepsilon_2); \quad \text{i)}$$

$$\varepsilon_1 \overset{*}{\Rightarrow} \varepsilon_2 \Rightarrow \sigma(\varepsilon_1) \overset{*}{\Rightarrow} \sigma(\varepsilon_2); \quad \text{ii)}$$

$\varepsilon_1 \overset{*}{\Rightarrow} \varepsilon_2$ and $\mathcal{F}_1 \overset{*}{\Rightarrow} \mathcal{F}_2 \Rightarrow \varepsilon_1 \bowtie \mathcal{F}_1 \overset{*}{\Rightarrow} \varepsilon_2 \bowtie \mathcal{F}_2$, if samplers in $\varepsilon_i$ are independent on samplers in $\mathcal{F}_i$ or $\varepsilon_i$ and $\mathcal{F}_i$ share the same universe sampler. iii)

Here, π, σ, ⋈ denote a project, select and join, respectively.

Third, the dominance rules may be used to inductively unroll ASALQA. That is, just for purposes of analysis, an equivalent query expression ε' is found which has only one sampler just below the aggregation such that $\varepsilon' \overset{*}{\Rightarrow} \varepsilon$. The above HT estimators are used on ε' and by dominance the accuracy of ε is no worse. An example detailed illustration of this process for the query in FIG. 1 is shown in FIGS. 8A-8F.

Figure 8A:
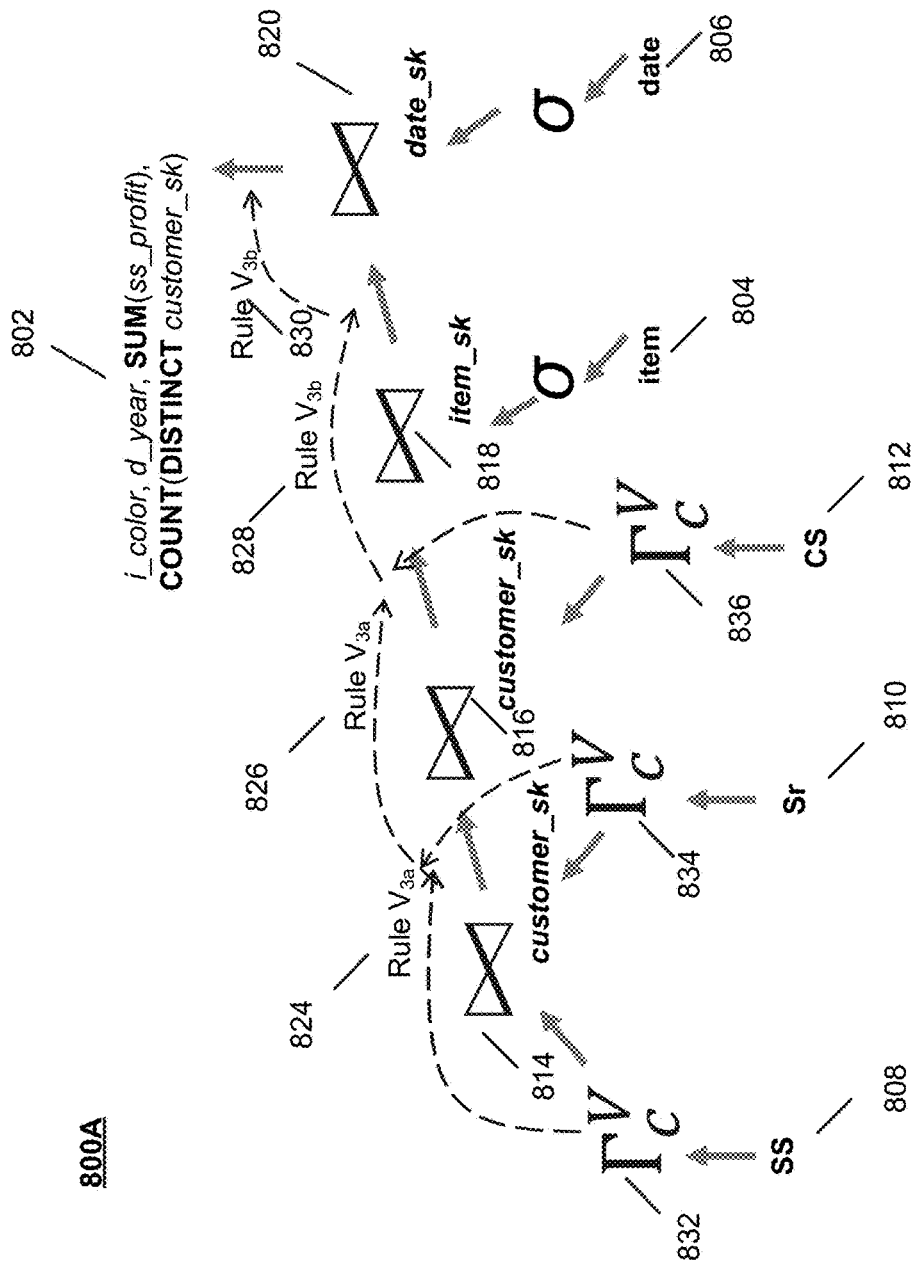
FIGS. 8A-8F illustrate an example workflow for generating a query plan for approximation using samplers in lieu of apriori samples.

FIGS. 8A-8F illustrate an example workflow for generating a query plan for approximation using samplers in lieu of apriori samples. FIG. 8A illustrates an example workflow for generation of the query plan computed by ASALQA, for the example query (802) shown above in FIG. 1. The dashed arrows show how an example error analysis unrolls ASALQA and the dominance rules (824, 826, 828, 830) used at each step. The result is an expression with a single sampler just below the aggregation.

As discussed above, per item color and year, the query 102 (802 in FIG. 8A) computes a total profit from store sales 908 and the number of unique customers who have purchased and returned from stores and purchased from catalog. Item 804 and date 806 are dimension tables joined (818, 820) on a foreign key. The other three (store sales 808, store returns 810, catalog sales 812) are large fact tables joined (814, 816) on shared keys. As discussed above with regard to FIG. 1, since joining two fact tables may involve two reads and one shuffle, the query 802 may incur many passes over data.

Universe samplers ($\Gamma_c^v$) 832, 834, 836 are shown (in FIG. 8A) before joins 814, 816. As shown in FIG. 8A, Rule $V_{3b}$ and Rule $V_{3a}$ (as discussed further herein) are used 824 in pushing samplers 832, 834 past join 814, and (826) in pushing sampler 836 past join 816.

As further discussed herein, the example transformation rules may move sample operators closer to the raw input, with a goal of generating alternative plans with improved performance and minimal error. For example, each sampler has a logical state {S, U, sfm, ds} where S indicates stratification columns, U indicates universe columns, sfm is the stratification frequency multiplier, and ds is the downstream selectivity. As further discussed herein, the rules are used to move the samplers down the query tree and edit the state accordingly.

Figure 8B:
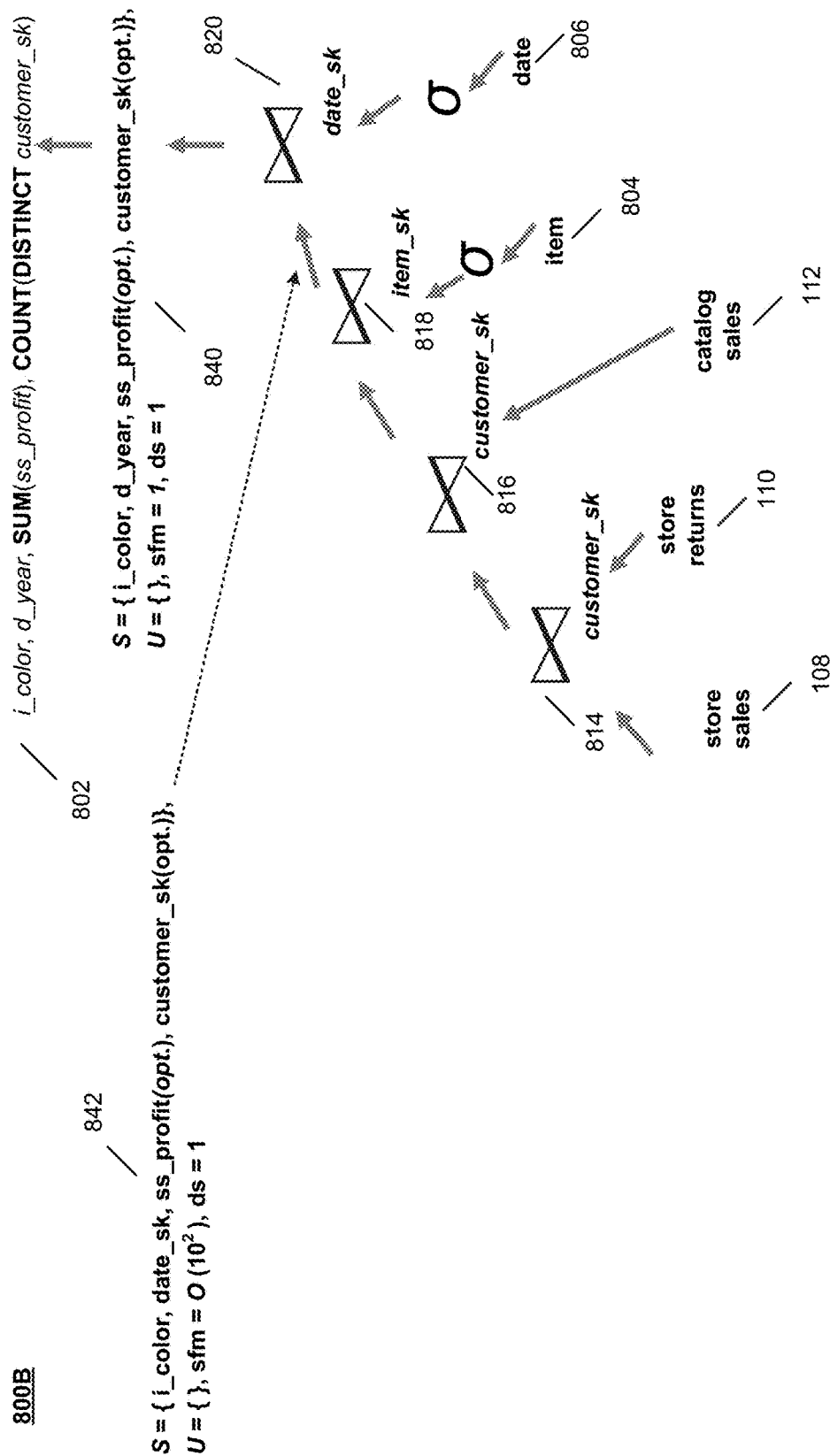
Figure 8C:
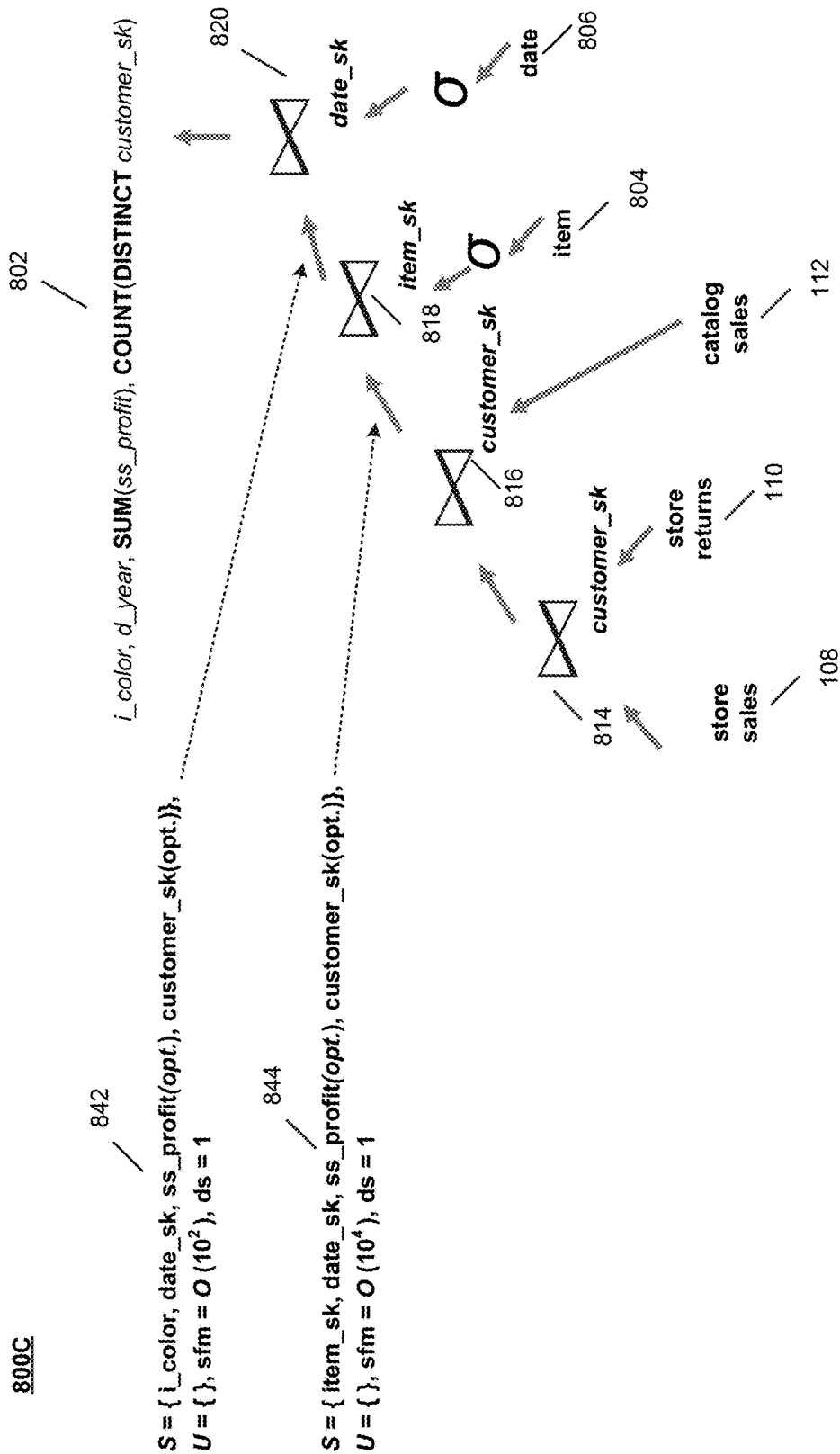
Figure 8D:
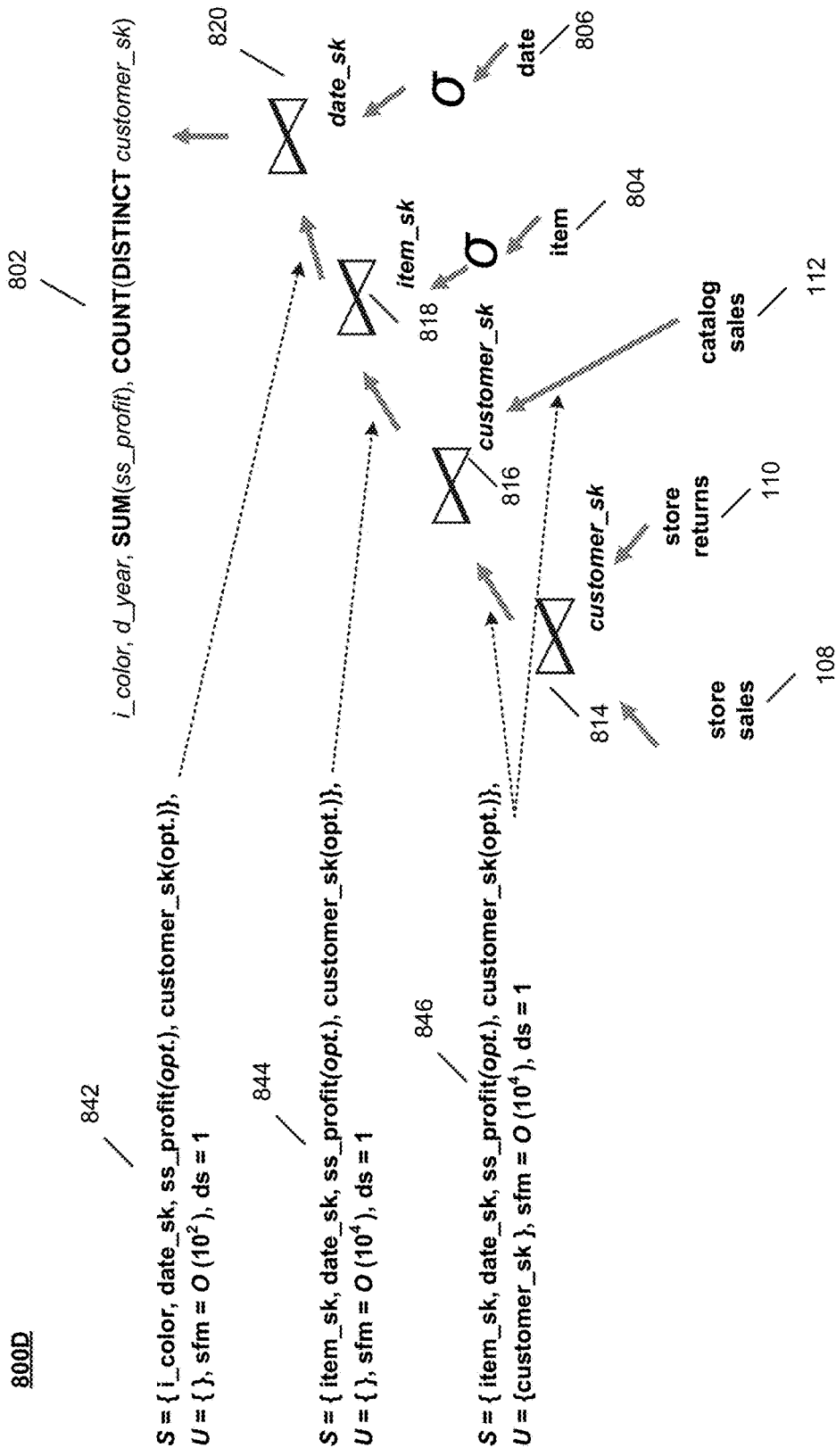
Figure 8E:
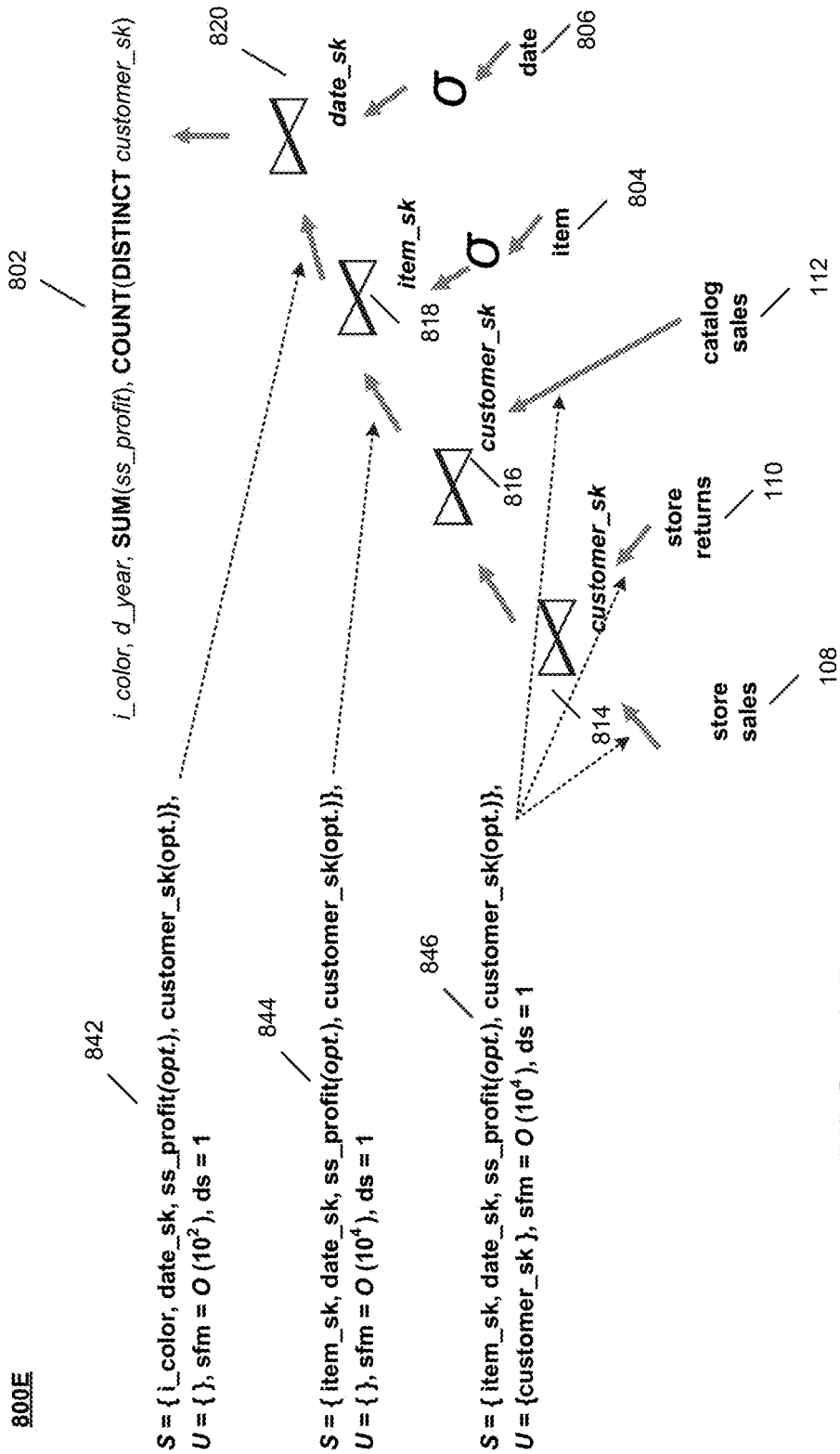
Figure 8F:
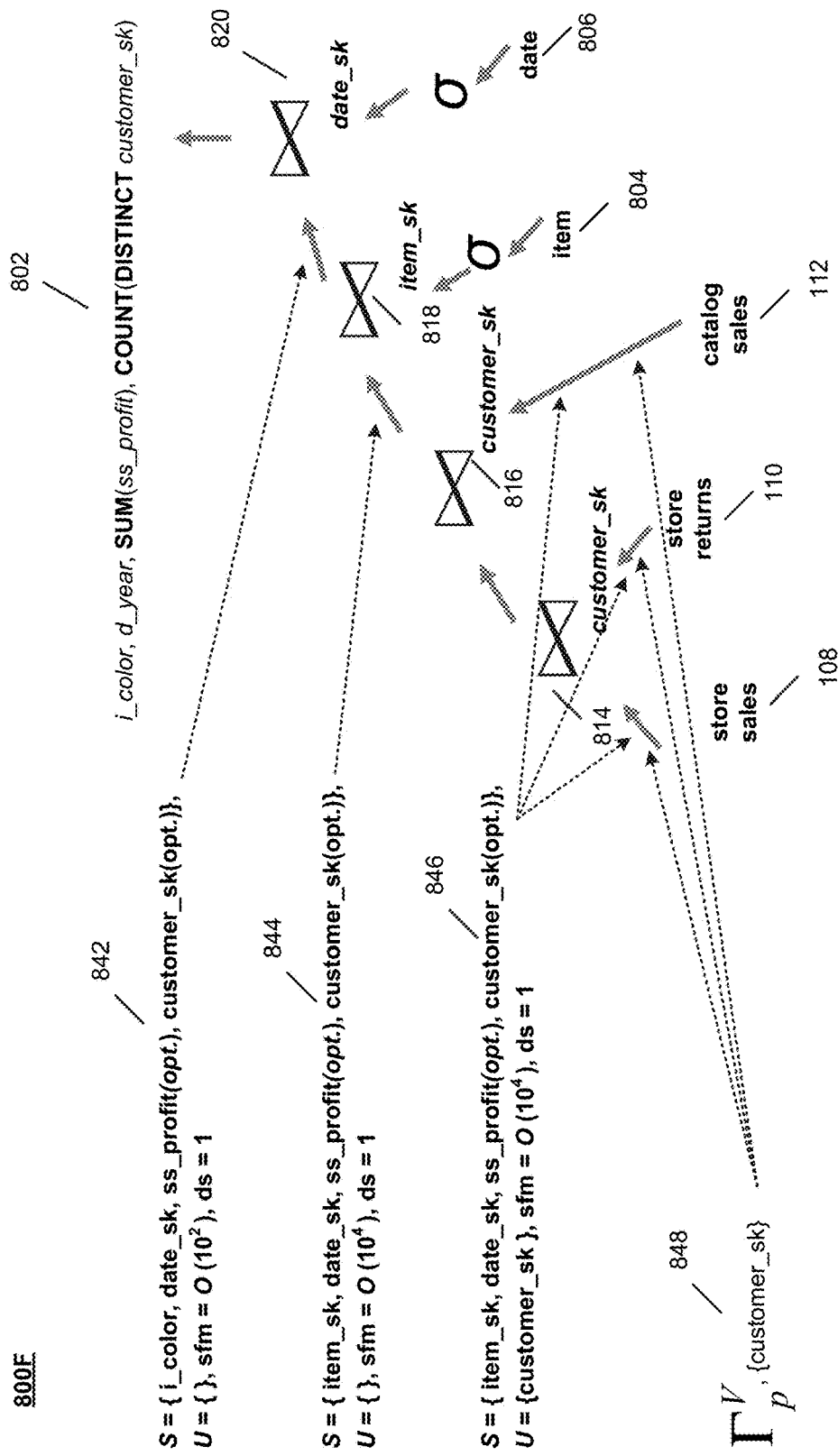

As shown in FIG. 8B, a state 840 is edited to a state 842 in pushing a sampler past join 920, whose right input is the output of a select on date 806. In FIG. 8C, the state 842 is edited to a state 844 in pushing the sampler past join 818, whose right input is the output of a select on item 804. In FIG. 8D, the state 844 is edited to a state 846 (with U now edited to "{customer_sk}") in pushing the sampler past join 816, for the left and right inputs to join 816, the left input being the output of join 914. In FIG. 8E, the state 846 is utilized for the left and right inputs to join 814, and the right input to join 816. In FIG. 8F, the universe sampler 848 is placed as a direct input for the left and right inputs to join 814, and the right input to join 816.

Finally, the computation above is shown to involve only one scan of the sample.

Proposition 2 (Complexity): For each group G in the query output, example techniques discussed herein may need $O(|\varepsilon(G)|)$ time to compute the unbiased estimator of all aggregations and their estimated variance where $|\varepsilon(G)|$ is the number of sample rows from G output by expression $\varepsilon$.

Example samplers and push-down rules discussed herein are formally analyzed below. The discussion below may cover queries that perform SUM-like aggregations over groups, as other aggregates are discussed elsewhere herein. Let group G denote all tuples that have the same value in group-by columns of the output. The answer includes for each group G the aggregate $w(G) = \Sigma_{t \in G} w(t)$, where $w(t)$ is the value associated with tuple t. Given a query E, QUICKR'S ASALQA may output a query plan $\varepsilon$ with samplers at various locations. A goal here may be to compare the answer of E (unsampled query) with that of $\varepsilon$ on two aspects: the expected squared error of group values (i.e., variance of $w(G)$) and the group coverage probability (i.e., likelihood of not missing a group from the answer).

For all three samplers used by an example system such as QUICKR, closed-form expressions may be provided upon immediate use; that is, when the samplers are placed near or at the root of the query plan just before group-by and aggregation. To compute similar expressions when samplers are at arbitrary locations in the query tree, intuitively, the following issue may be addressed: when pushing a sampler past another database operator, how do the error expressions change. The concept of sampling dominance between query expressions may be introduced, which may ensure that the error is no worse. Using this, a collection of sampler transformation rules is established herein. For example, the rules may guide choices (and exploration) over the alternative query plans.

An example system such as QUICKR may use the Horvitz-Thompson (HT) estimator to relate the answers on sampled query plans to their true values as well as to estimate the expected squared error.

For each group G in the answer of unsampled query E, the sampled plan E outputs a subset of the rows in G, $\varepsilon(G) \subseteq G$. For example, an estimate of $w(G)$ may be determined as:

$$\hat{w}_\varepsilon(G) = \sum_{t \in \varepsilon(G)} \frac{w(t)}{Pr[t \in \varepsilon(G)]}. \qquad (2)$$

It may be seen that the above (HT) estimator is unbiased, i.e., $E[\hat{w}_\varepsilon(G)] = w(G)$. Hence, its variance is expected squared error:

$$Var[\hat{w}_\varepsilon(G)] = \sum_{i,j \in G} \left( \frac{Pr[i, j \in \varepsilon(G)]}{Pr[i \in \varepsilon(G)] Pr[j \in \varepsilon(G)]} - 1 \right) \cdot w(i) w(j). \qquad (3)$$

From the sample $\varepsilon(G)$, $Var[\varepsilon \hat{w}_\varepsilon(G)]$ can be estimated as:

$$\widehat{Var}[\hat{w}_\varepsilon(G)] = \qquad (4)$$
$$\sum_{i,j \in \varepsilon(G)} \left( \frac{Pr[i, j \in \varepsilon(G)]}{Pr[i \in \varepsilon(G)] Pr[j \in \varepsilon(G)]} - 1 \right) \cdot \frac{w(i) w(j)}{Pr[i, j \in \varepsilon(G)]}.$$

Recalling the three example samplers:
uniform sampler $\Gamma_p^U$ (uniform sampling probability p),
distinct sampler $\Gamma_{p,c,\delta}^D$ (each value of column set C has support at least $\delta$ in the sample), and
universe sampler $\Gamma_{p,c}^V$ (sampling values of column set C with probability p).

The HT estimator may be applied to compute variance for all the three samplers used by example systems such as QUICKR. To do so, the terms $Pr[i \in \varepsilon(G)]$ and $Pr[i, j \in \varepsilon(G)]$ may be computed for each sampler. The following proposition includes an example explanation of how this may be done:

Proposition 3 (To Compute HT Estimator and the Variance):

For $\Gamma_p^U$, for any $i,j \in G$, one may have $Pr[i \in \varepsilon(G)] = p$, and, if $i \neq j$, $Pr[i, j \in \varepsilon(G)] = p^2$.

For $\alpha_{p,c,\delta}^D$, let g(i) be the set of tuples with the same values on C as i in the input relation. Formally, $$Pr[i \in \varepsilon(G)] = \begin{cases} = 1 & |g(i)| \leq \delta \\ \geq \max\left(\frac{\delta}{|g(i)|}, p\right) & |g(i)| > \delta \end{cases}; \qquad (5)$$

if $i \neq j$, $Pr[i, j \in \varepsilon(G)] = Pr[i \in \varepsilon(G)] Pr[j \in \varepsilon(G)]$.

For $\Gamma_{p,c}^V$, let g(i) be the set of tuples with the same values on C as i in the input relation. Formally, $Pr[i \in \varepsilon(G)] = p$, and $$Pr[i, j \in \varepsilon(G)] = \begin{cases} p & g(i) = g(j) \\ p^2 & g(i) \neq g(j) \end{cases}, \text{if } i \neq j. \qquad (6)$$

Proposition 2 posits that the computation involves only one scan of the sample. The proof follows from Proposition 3 and Equations (2)-(3). Since each tuple i in the sample $\varepsilon(G)$ also includes the probability $Pr[i \in \varepsilon(G)]$ in its weight column, $\hat{w}_e(G)$ may be computed in one scan using Equation (1). A naive way to compute $\widehat{Var}[\hat{w}_\varepsilon(G)]$ using (3) may involve a self-join and may take quadratic time since it checks all pairs of tuples in the sample. This may be improved by accounting for the cases where $Pr[i, j \in \varepsilon(G)] = Pr[i \in \varepsilon(G)] Pr[j \in \varepsilon(G)]$. For the uniform and distinct samplers, this directly translates to a linear time operation; the summation in (2) goes to zero for $i \neq j$. For the universe sampler, there are two types of pairs: i) (i,j) with g(i)=g(j) and ii) (i,j) with g(i)≠g(j). Per Proposition 3, the summation term is zero for pairs of the latter type. For the former type, per-group values are maintained in parallel and a shuffle may be used to put them back into (3). Since the number of groups may be no larger than the number of tuples, the computation remains linear.

A group G may miss from the answer if all the tuples in G are missed in the sample $\varepsilon(G)$. The discussion below indicates that an example system such as QUICKR may make this unlikely.

Proposition 4 (Group Coverage Probability): When samplers immediately precede the aggregate, the probability that a group G appears in the answer may be denoted as:

For $\Gamma_p^U$, $Pr[G] = 1 - (1-p)^{|G|}$. (7)

For $\Gamma_{p,c,\delta}^D$, let g(i) be the set of tuples with the same values on C as i in the input relation. Formally, $$Pr[G] = \begin{cases} = 1 & \text{if } C \text{ contains the group-by dimensions} \\ \geq 1 - (1-p)^{|G|}, & \text{otherwise} \end{cases} \qquad (8)$$

For $\Gamma_{p,c}^V$, $Pr[G] = 1 - (1-p)^{|G(C)|}$, where G(C) is the set of distinct values of tuples in G on dimensions C.

Using Proposition 4, it may be observed that both uniform and distinct samplers may rarely miss groups when $|G| \gg p$. As discussed above, an example system such as QUICKR may check before introducing samplers that there is enough support, i.e. $|G| > k/p$. For example, when $k=30$, $p=0.1$, the likelihood of missing G is about $10^{-14}$. For the universe sampler, note that $|G(C)| \in [1, |G|]$. However, as discussed above, an example system such as QUICKR may use the universe sampler only when the stratification requirements can be met. That is, the overlap between universe columns and those defining the group may be small. Hence, $|G(C)| \sim |G|$ and the likelihood of missing groups may remain small.

An example advantage of universe sampler $\Gamma_{p,c}^v$ may lie in sampling from join. To draw a p fraction of tuples from the join of two relations, the universe sampler only needs a $\sqrt{p}$ fraction from input relations. But, both the uniform and distinct samplers may need to draw a $\sqrt{p}$ fraction of tuples. Not only may the $\sqrt{p}$ sample be more expensive to compute (e.g., when $p=0.1$, $\sqrt{p}$ is roughly 0.3) but both the error and the group coverage probability may become substantially worse (e.g., when p is replaced with $\sqrt{p}$ in Propositions 3, 4 and a potentially smaller value for $|G(C)|$).

The example notion of sampling dominance between query expressions is further formalized below. Suppose $\varepsilon$ is an expression on database relations possibly with samplers. The core $\Lambda(\varepsilon)$ denotes the expression generated by removing all samplers from $\varepsilon$. An expression $\varepsilon_1$ is said to be dominated by another expression $\varepsilon_2$ if and only if the expressions have the same core and $\varepsilon_2$ has a no higher variance and a no higher probability of missing groups than $\varepsilon_1$. More formally, the following definition may be used.

Definition 1 (Sampling Dominance): In accordance with example techniques discussed herein, given two expressions $\varepsilon_1$ and $\varepsilon_2$ with $\Lambda(\varepsilon_1) = \Lambda(\varepsilon_2)$ and having $\mathcal{R}_1$ and $\mathcal{R}_2$ as the respective output relations, $\varepsilon_2$ may be said to dominate $\varepsilon_1$, or $\varepsilon_1 \stackrel{*}{\Rightarrow} \varepsilon_2$, iff $$(v\text{-dominance } \mathcal{E}_1 \stackrel{v}{\Rightarrow} \mathcal{E}_2) \forall i, j: \quad (9)$$

$$\frac{Pr[i \in \mathcal{R}_1, j \in \mathcal{R}_1]}{Pr[i \in \mathcal{R}_1] Pr[j \in \mathcal{R}_1]} \geq \frac{Pr[i \in \mathcal{R}_2, j \in \mathcal{R}_2]}{Pr[i \in \mathcal{R}_2] Pr[j \in \mathcal{R}_2]}, \text{ and} \quad (10)$$

$$(c\text{-dominance } \mathcal{E}_1 \stackrel{c}{\Rightarrow} \mathcal{E}_2) \forall t: Pr[t \in \mathcal{R}_1] \leq Pr[t \in \mathcal{R}_2]$$

It may be observed that sampler dominance subsumes a SOA-equivalence definition. Two expressions $\varepsilon_1$, $\varepsilon_2$ are SOA equivalent iff $\varepsilon_1 \stackrel{*}{\Rightarrow} \varepsilon_2$ and $\varepsilon_2 \stackrel{*}{\Rightarrow} \varepsilon_1$. Intuitively, c-dominance indicates that all tuples are strictly more likely to appear in the output and v-dominance helps relate the variance. By using (9) and (10) in (2) and the above propositions, it is not difficult to see that if $\varepsilon_2$ dominates $\varepsilon_1$, $\hat{w}_{\varepsilon_2}(G)$ is better than $\hat{w}_{\varepsilon_1}(G)$ in terms of variance and group coverage probability. This result is more formally shown below.

Proposition 5 (Dominance and Accuracy): For any group G in the output of a SUM-like aggregate query, consider two execution plans $\varepsilon_1$ and $\varepsilon_2$ with independent (uniform, distinct, universe) samplers, with the same core plan $\Lambda(\varepsilon_1) = \Lambda(\varepsilon_2)$. If $\varepsilon_1 \stackrel{v}{\Rightarrow} \varepsilon_2$, $$\text{Var}[\hat{w}_{\varepsilon_1}(G)] \geq \text{Var}[\hat{w}_{\varepsilon_2}(G)] \quad (11)$$

And if $\varepsilon_1 \stackrel{c}{\Rightarrow} \varepsilon_2$, $$Pr[G \text{ is missed in } \varepsilon_1] \geq Pr[G \text{ is missed in } \varepsilon_2]. \quad (12)$$

From the above proposition, if $\varepsilon_1 \stackrel{*}{\Rightarrow} \varepsilon_2$, the latter will have a strictly more advantageous answer.

It may be desirable for the dominance relationship to hold at the root of a plan so that the variance and the group-missing probability may be bounded in the final output according to Proposition 5. Below, it is shown that the dominance is transitive across database operators, from the root to leaves in the plan. The discussion below may include a focus on three database operators: $\pi_C$ (projection on a subset of columns C), $\sigma_C$ (selection on C), and $\bowtie_C$ (join on C).

This leads to Proposition 1 which states the conditions under which the dominance relationship is transitive. The proof follows.

Proof: Note that projection holds by definition. Focus is on ii) and iii) below.

Let $\mathcal{R}_i$ be the set of rows output by $\varepsilon_i$, and R be the set of rows output by $\Lambda(\varepsilon_i)$. For a row $i \in \sigma_C(R)$, $$Pr[i \in \sigma_C(\mathcal{R}_i)] = \begin{cases} Pr[i \in \mathcal{R}_i] & i \in \sigma_C(R) \\ 0 & i \notin \sigma_C(R) \end{cases}. \quad (13)$$

ii) can be proved by putting (13) into (9) and (10).

To show that $\varepsilon_1 \bowtie_C \mathcal{F}_1 \stackrel{*}{\Rightarrow} \varepsilon_2 \bowtie_C \mathcal{F}_2$ holds, it suffices to show $\varepsilon_1 \times \mathcal{F}_1 \stackrel{*}{\Rightarrow} \varepsilon_2 \times \mathcal{F}_2$ since $\bowtie_C$ is equivalent to composing $\times$ with selection $\sigma_C$ and ii) can be applied for the latter. Suppose $\mathcal{S}_i$ is the set of rows output by $\mathcal{F}_i$, and S is the set of rows output by $\Lambda(\mathcal{F}_i)$. For $\varepsilon_1 \times \mathcal{F}_1 \stackrel{*}{\Rightarrow} \varepsilon_2 \times \mathcal{F}_2$ to hold, it may be shown that $$\frac{Pr[(r,s) \in \mathcal{R}_1 \times \mathcal{S}_1, (r',s') \in \mathcal{R}_1 \times \mathcal{S}_1]}{Pr[(r,s) \in \mathcal{R}_1 \times \mathcal{S}_1], Pr[(r',s') \in \mathcal{R}_1 \times \mathcal{S}_1]} \geq \quad (14)$$

$$\frac{Pr[(r,s) \in \mathcal{R}_2 \times \mathcal{S}_2, (r',s') \in \mathcal{R}_2 \times \mathcal{S}_2]}{Pr[(r,s) \in \mathcal{R}_2 \times \mathcal{S}_2], Pr[(r',s') \in \mathcal{R}_2 \times \mathcal{S}_2]}.$$

To this end, two cases are considered below.

Case a): $\varepsilon_i$ and $\mathcal{F}_i$ share a universe sampler $\Gamma_{p,\mathcal{D}}^v$. Let $r_\mathcal{D}$ be the value of a row r on dimensions $\mathcal{D}$. In this case, the event "$(r, s) \in \mathcal{R}_i \times \mathcal{S}_i$" is equivalent to r and s having the same values on dimensions $\mathcal{D}$, i.e., $r_\mathcal{D} = s_\mathcal{D}$ and the value $r_\mathcal{D}$ is picked by the universe sampler. So when $r_\mathcal{D} \neq s_\mathcal{D}$ or $r'_\mathcal{D} \neq s'_\mathcal{D}$, both sides of (6) are equal to 0; when $r_\mathcal{D} = s_\mathcal{D}$ and $r'_\mathcal{D} = s'_\mathcal{D}$, $$Pr[(r,s) \in R_i \times \mathcal{S}_i, (r',s') \in R_i \times \mathcal{S}_i] = Pr[r \in R_i, r' \in R_i]$$

$$\text{and } Pr[(r,s) \in R_i \times \mathcal{S}_i] = Pr[r \in R_i]. \quad (15)$$

From (15) and $\varepsilon_1 \stackrel{v}{\Rightarrow} \varepsilon_2$, one has $\varepsilon_1 \times \mathcal{F}_1 \stackrel{v}{\Rightarrow} \varepsilon_2 \times \mathcal{F}$.

Case b): $\varepsilon_i$ and $\mathcal{F}_i$ do not share a universe sampler. In this case, samplers on the two sides of the join operator (or $\times$) are independent, i.e., rows from $R_i$ and the ones from $\mathcal{S}_i$ are drawn independently. So based on this Independence condition, $$Pr[(r,s) \in R_i \times \mathcal{S}_i, (r',s') \in R_i \times \mathcal{S}_i] = Pr[r \in R_i, r' \in R_i] \cdot Pr[s \in \mathcal{S}_i, s' \in \mathcal{S}_i] \quad (16)$$

$$\text{and } Pr[(r,s) \in R_i \times \mathcal{S}_i] = Pr[r \in R_i] \cdot Pr[s \in \mathcal{S}_i]. \quad (17)$$

Putting (16) and (17) into (14), it can be observed that $\varepsilon_1 \stackrel{v}{\Rightarrow} \varepsilon_2$ and $\mathcal{F}_1 \stackrel{v}{\Rightarrow} \mathcal{F}_2$ suffice for $\varepsilon_1 \times \mathcal{F}_1 \stackrel{v}{\Rightarrow} \varepsilon_2 \times \mathcal{F}_2$.

Proving c-dominance $\stackrel{c}{\Rightarrow}$ for both cases is similar.

For the same sampling rate p, the following ranking may be determined among samplers in the order of accuracy from lower to higher.

Proposition 6 (Switching Rule). For any relation R, $$\Gamma_{p,c}{}^{v}(R) \stackrel{*}{\Rightarrow} \Gamma_{p}{}^{U}(R) \stackrel{*}{\Rightarrow} \Gamma_{p,c,\delta}{}^{D}(R). \quad (18)$$

The proof follows from observing the terms for variance and group coverage of each sampler. Since the distinct sampler has lower performance gain, it may be used only when needed for accuracy.

Below are listed some example transformation rules based on the example dominance definition and transitivity proofs.

Proposition 7 (Pushing past Projection). For any relation R and a projection $\pi_C$ where C is a subset of columns of R, rules may include:

$$\Gamma_p{}^{U}(\pi_C(R)) \stackrel{*}{\Rightarrow} \pi_C(\Gamma_p{}^{U}(R)); \quad \text{Rule-}U_1:$$

$$\Gamma_{p,}\mathcal{D}_{\delta}{}^{D}(\pi_C(R)) \stackrel{*}{\Rightarrow} \pi_C(\Gamma_{p,}\mathcal{D}_{\delta}{}^{D}(R)), \text{ if } \mathcal{D} \subseteq C; \quad \text{Rule-}D_1:$$

$$\Gamma_{p,}\mathcal{D}^{v}(\pi_C(R)) \stackrel{*}{\Rightarrow} \pi_C(\Gamma_{p,}\mathcal{D}^{v}(R)), \text{ if } \mathcal{D} \subseteq C. \quad \text{Rule-}V_1:$$

The rules indicate that it may be strictly better to push samplers below projects. The sampler column set $\mathcal{D}$ is always a subset of the columns returned by the project C.

Pushing samplers past selections may be complicated by one aspect. If the columns used in the select are not explicitly stratified, the group sizes vary before and after pushing. Hence, the weak dominance relationship is introduced, denoted as $\tilde{\Rightarrow}$. With weak dominance, v- and c-dominance only hold for large groups in a probabilistic way.

Proposition 8 (Pushing past Selection): For any relation R and a selection ac with selection formula on a subset C of columns of R, $$\Gamma_p{}^{U}(\sigma_C(R)) \stackrel{*}{\Rightarrow} \sigma_C(\Gamma_p{}^{U}(R)); \quad \text{Rule-}U_2:$$

$$\Gamma_{p,}\mathcal{D}_{\delta}{}^{D}(\sigma_C(R)) \stackrel{*}{\Rightarrow} \sigma_C(\Gamma_{p,}\mathcal{D}_{\cup C,\delta}{}^{D}(R)), \text{ if } \mathcal{D} \subseteq C; \quad \text{Rule-}D_{2a}:$$

$$\Gamma_{p,}\mathcal{D}_{\delta}{}^{D}(\sigma_C(R)) \stackrel{*}{\Rightarrow} \sigma_C(\Gamma_{p,}\mathcal{D}_{\delta/\sigma}{}^{D}ss(R)); \quad \text{Rule-}D_{2b}:$$

$$\Gamma_{p,}\mathcal{D}_{\delta}{}^{D}(\sigma_C(R)) \stackrel{\sim}{\Rightarrow} \sigma_C(\Gamma_{p,}\mathcal{D}_{\delta}{}^{D}(R)); \quad \text{Rule-}D_{2c}:$$

$$\Gamma_{p,}\mathcal{D}^{v}(\sigma_C(R)) \stackrel{*}{\Rightarrow} \sigma_C(\Gamma_{p,}\mathcal{D}^{v}(R)), \text{ if } |\mathcal{D} \cap C| \ll \min(|\mathcal{D}|, |C|). \quad \text{Rule-}V_2:$$

The selectivity of σC on R, denoted as $\sigma^{ss}$, is $|\sigma_C(R)|/|R|$.

The example rules for pushing samplers past joins are discussed below.

Proposition 9 (Pushing past Join): For any two relations $R_1$ and $R_2$, with columns $C_i$ respectively and an equi-join $\bowtie_C$ on columns C of $R_i$, rules may include:

$$\Gamma_p{}^{U}(R_1 \bowtie_C R_2) \stackrel{*}{\Rightarrow} \Gamma_p{}^{U}(R_1) \bowtie_C \Gamma_p{}^{U}(R_2), \text{ if } p=p_1 \cdot p_2; \quad \text{Rule-}U_3:$$

$$\Gamma_{p,}\mathcal{D}_{\delta}{}^{D}(R_1 \bowtie_C R_2) \stackrel{*}{\Rightarrow} \Gamma_{p,}\mathcal{D}_{\cup C,\delta}{}^{D}(R_1) \bowtie_C R_2; \quad \text{Rule-}D_{3a}:$$

$$\Gamma_{p,}\mathcal{D}_{\delta}{}^{D}(R_1 \bowtie_C R_2) \stackrel{\sim}{\Rightarrow} \Gamma_{p,}\mathcal{D}_{\delta}{}^{D}(R_1) \bowtie_C R_2, \text{ if } \mathcal{D} \subseteq C_1; \quad \text{Rule-}D_{3b}:$$

$$\Gamma_{p,}\mathcal{D}^{v}(R_1 \bowtie_C R_2) \stackrel{*}{\Rightarrow} \Gamma_{p,}\mathcal{D}^{v}(R_1) \bowtie_C \Gamma_{p,}\mathcal{D}^{v}(R_2), \text{ if } \mathcal{D} \subseteq C_1, C_2; \quad \text{Rule-}V_{3a}:$$

$$\Gamma_{p,}\mathcal{D}^{v}(R_1 \bowtie_C R_2) \stackrel{*}{\Rightarrow} \Gamma_{p,}\mathcal{D}^{v}(R_1) \bowtie_C R_2, \text{ if } \mathcal{D} \subseteq C_1; \quad \text{Rule-}V_{3b}:$$

Rule-$U_3$ includes the cases when uniform sampler is pushed to only one side, i.e., set $p_1=1$ or $p_2=1$. For rules $D_{3a}$, $D_{3b}$ and $V_{3b}$, wherein the sampler is only pushed to $R_1$, there are analogous rules that push the sampler only to $R_2$.

So far, only groups with SUM-like aggregates have been discussed. Here, the discussion is extended to other aggregation operations such as COUNT and to the case where a result has multiple aggregations such as SELECT x, SUM (y), COUNT(z).

Other aggregations: Analyzing COUNT directly follows from SUM by setting w(t)=1∀t. AVG translates to $$\frac{\text{SUM}}{\text{COUNT}}$$

but its variance may be more difficult to analyze due to the division. In implementation, an example system such as QUICKR may substitute AVG by SUM/COUNT and divide the corresponding estimators. Such an example system may also support DISTINCT, which translates to a group with no aggregations and COUNT(DISTINCT). Error for the former is akin to missing groups analysis. For the latter, the value estimator varies with the sampler—by default it is the value computed over samples. Only when universe sampling on the same columns used in count distinct, the value over samples is weighted up by the probability. Distinct sampler may offer unbiased error and zero variance. With uniform sampler, the variance is small but there is some negative bias since though unlikely due to QUICKR'S requirement for sufficient support, some values may not appear.

Multiple aggregation ops: Example techniques discussed herein may naturally extend to the case when multiple aggregations are computed over the same sampled input relation. An observation here is that the estimators of true values for each aggregation only involve the value in the sampled tuple, the corresponding weight which describes the probability with which the tuple was passed and in some cases the type of the sample (e.g., for COUNT DISTINCT). The first two are available as columns in the sampled relation. For example, the third may be implemented as a corrective rewriting after the query optimizer chooses the samplers (i.e., ASALQA algorithm).

For experimental evaluation, example techniques discussed herein were compared against two state-of-the-art systems. The production QO without samplers is referred to herein as Baseline. Thousands of man-years have gone into developing Baseline and it is hardened from several years of production use. In particular, Baseline supports almost the entirety of T-SQL, has extensive support for UDOs, generates parallel plans and has carefully tuned parallel implementations of many operators. The authors of BLINKDB shared their MILP algorithm to choose which samples to stratify on given the QCS of a query set and a storage budget. BLINKDB's logic to match a query to available input samples requires queries to recur in order to build the error-latency-profile. BLINKDB was afforded the benefit of doubt of perfect matching by running each query on all of the input samples and the best result was used.

Query sets: The queries and datasets from the TPC-DS BENCHMARK were used. The results discussed herein are from a 500 GB dataset (scale factor: 500). Results for the 2 TB dataset were similar. Table 5 shows some query characteristics.

TABLE 5

| | Percentile Value | | | | | |
|---|---|---|---|---|---|---|
| Metric | 10th | 25th | 50th | 75th | 90th | 95th |
| # of Passes | 1.12 | 1.18 | 1.3 | 1.53 | 1.92 | 2.61 |
| Total/First pass time | 1.26 | 1.33 | 1.67 | 2 | 2.63 | 3.42 |
| # Aggregation Ops. | 1 | 1 | 3 | 4 | 8 | 16 |

TABLE 5-continued

| | Percentile Value | | | | | |
|---|---|---|---|---|---|---|
| Metric | 10th | 25th | 50th | 75th | 90th | 95th |
| # Joins | 2 | 3 | 4 | 7 | 9 | 10 |
| depth of operators | 17 | 18 | 20 | 23 | 26 | 27 |
| # operators | 20 | 23 | 32 | 44 | 52 | 86 |
| Size of QCS + QVS | 2 | 4 | 5 | 7 | 12 | 17 |
| Size of QCS | 0 | 1 | 3 | 5 | 9 | 11 |
| # user-defined functions | 1 | 2 | 4 | 9 | 14 | 14 |

Comparing with Table 2, it can be seen that TPC-DS queries may be simpler than the queries in the experimental cluster—they have fewer passes over data, fewer joins, and smaller QCS.

To compare performance, query runtime was measured as well as the usages of various resources. For example, machine-hours represents the sum of the runtime of all tasks. This translates to cluster occupancy and is a measure of throughput. For example, Intermediate Data represents the sum of the output of all tasks less the job output, i.e., corresponds to the intermediate data written. For example, Shuffled Data represents the sum of data that moves along the network across racks. Together, the last two measure the excess I/O footprint of the query.

Example error metrics are discussed below.

Missed Groups refers to the fraction of groups in the answer that are missed. Aggregation Error denotes the average error between the estimated and true value of all aggregations in a query. These metrics may be computed by analyzing the query output.

Example techniques discussed herein were evaluated on the same cluster that ran the production queries analyzed in Table 2. The servers in this cluster were datacenter-standard. That is, each has about ten cores, roughly 100 GB of memory, a couple of high RPM disks, some SSDs and a couple of 10 Gbps NICs.

Example performance gains are discussed below.

Figure 9A:
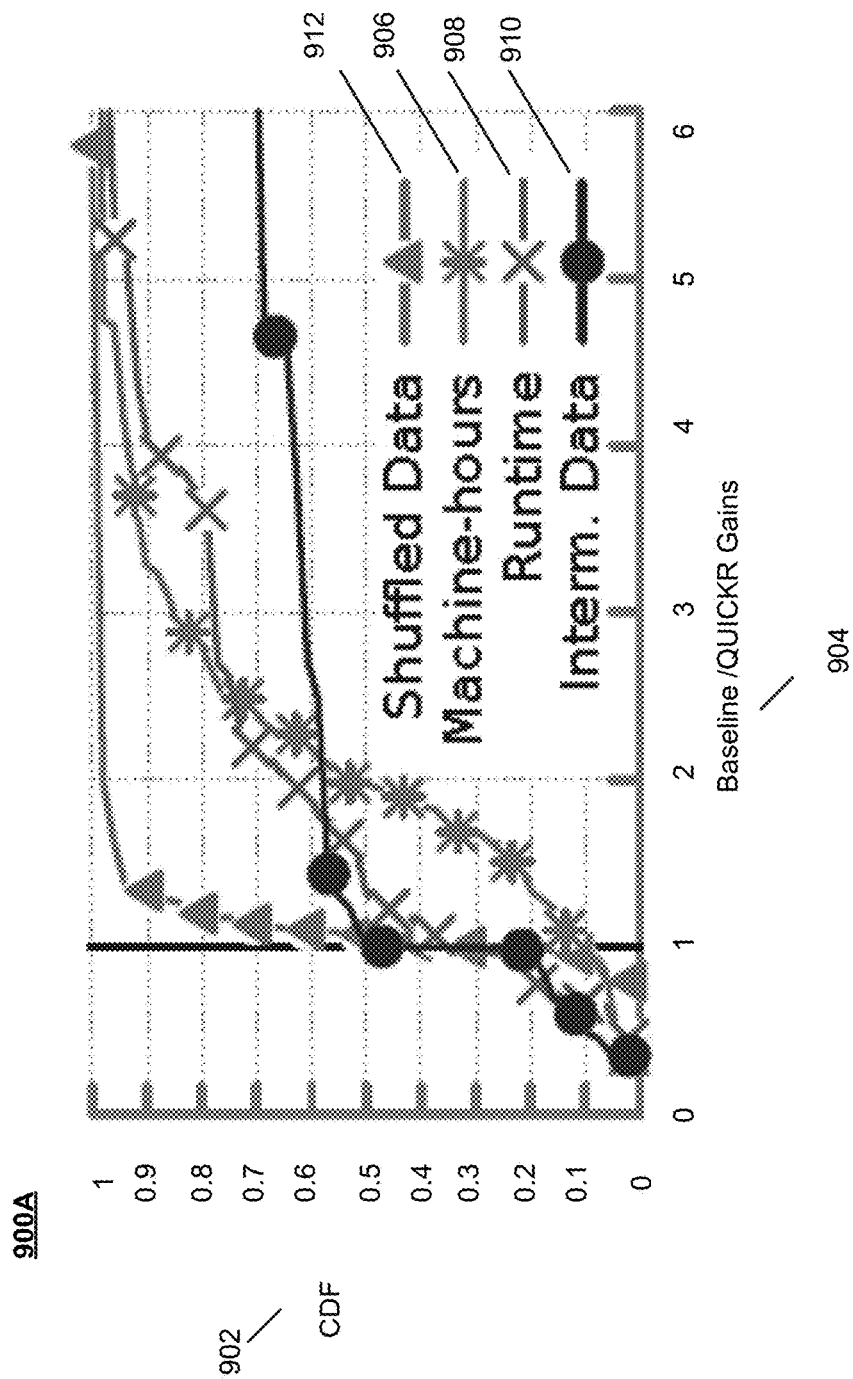
FIGS. 9A-9C are graphs summarizing example experimental findings.
Figure 9B:
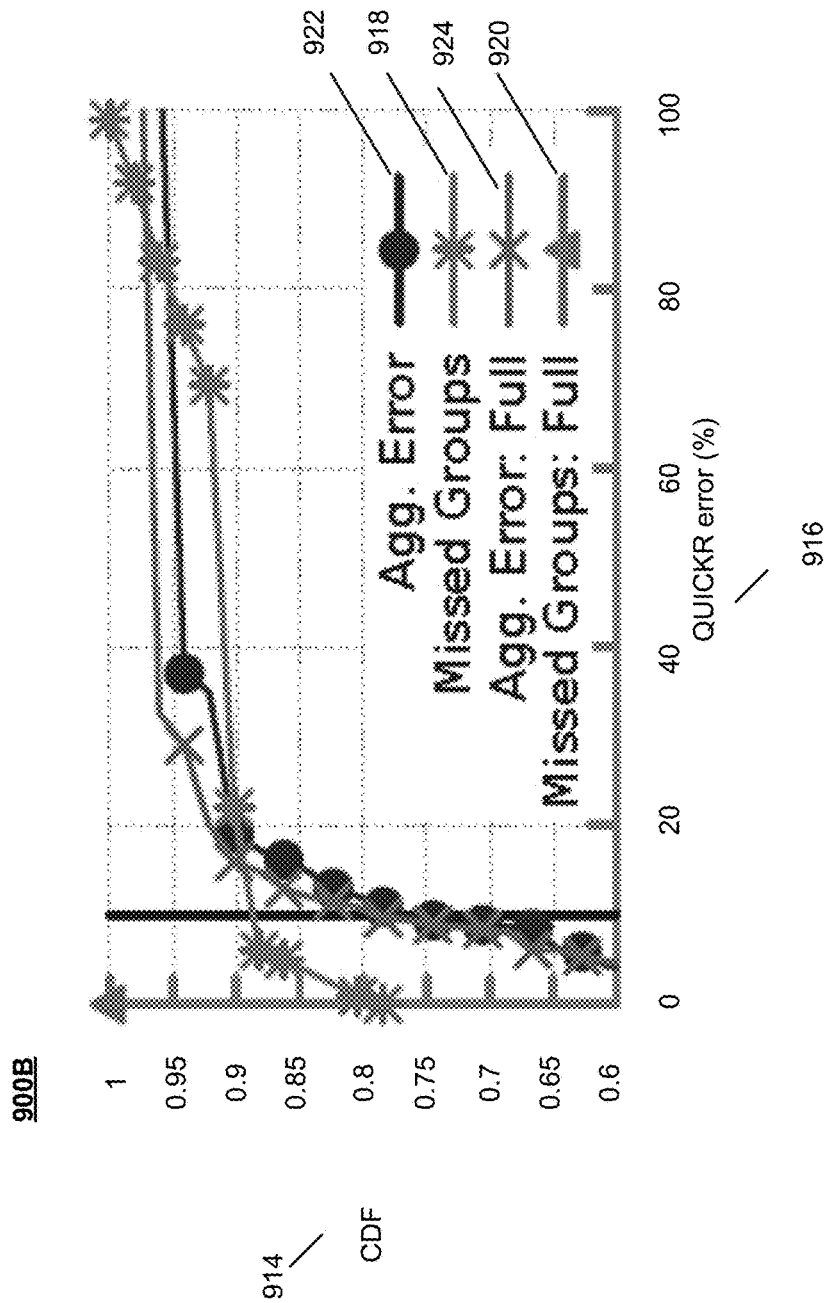
Figure 9C:
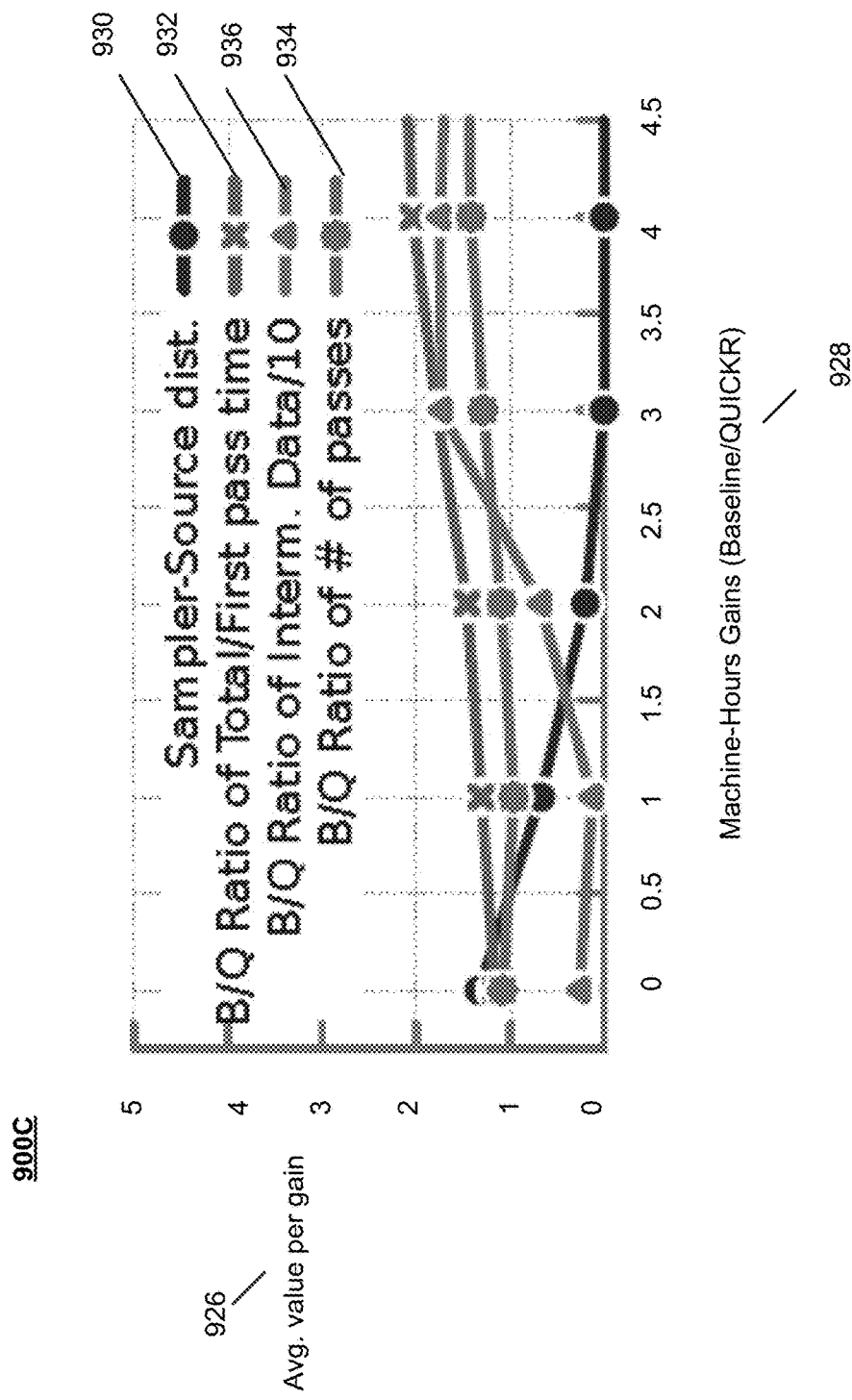

FIGS. 9A-9C are graphs summarizing example experimental findings. For example, FIG. 9A is a graph 900A comparing runtime and resources used. FIG. 9A plots a CDF 902 of the various performance metrics. As shown in FIG. 9A, the x axis is a ratio 904 between the values of Baseline and QUICKR. For example, an x-value of 2 represents 2× improvement whereas those below 1 represent a regression. As can be seen from the line with star points 906 ("machine-hours"), QUICKR lowers resource usage of the median query by over 2×. The improvements in runtime, the line 908 with x points, can be more or less than that of the resource usage due to two factors: (1) Queries that process a small amount of data such as TPC-DS $q_{22}$ are critical-path limited. That is, since the example cluster offers substantially more degree-of-parallelism than needed by some queries, their runtime equals the sum of duration of tasks on the critical path. (2) Other queries may gain in runtime by more than expected—because, when the work to be done reduces, as it does with sampled plans, schedulers may be able to marshall their tasks better. Overall, query runtime improved by a median amount of 1.6×. Roughly 20% of the queries sped up by over 3×. A handful sped up by over 6×. In general, runtime is found to be a noisy metric on the example cluster because it is influenced by task failures, outliers and scheduling artifacts such as fair-sharing. Instead, machine hours 906, which is akin to job makespan, may be a more stable metric to compare plan efficiency.

The line 910 with circular points ("interm.data") indicates that the total amount of intermediate data written by sampled plans is substantially smaller. Almost 40% of the queries have reductions larger than 4×. For about 50% of the queries, the intermediate data written is about the same and some plans write even more data. The line 912 with triangle points ("shuffled data") shows that the shuffled volume does not decrease as much as intermediate data. Two facts explain these findings: (1) QUICKR triggers parallel plan improvements that build upon the reduced cardinality due to samplers. That is, when the data in flight becomes small, QUICKR decreases degree-of-parallelism (DOP) so that pair joins are replaced with cheaper hash joins, etc. An example benefit may include faster completion time. An example cost, however, is that more data may be shuffled and written to adjust the DOP. (2) QUICKR outputs plans without samplers for roughly 25% of the queries. These queries may still receive a limited benefit (an average of 25%) because QUICKR triggers parallel plan improvements even when cardinality reduces due to other aspects such as filters. Such queries will shuffle more data.

To summarize, QUICKR may offer substantial performance gains to a large fraction of the complex queries in the TPC-DS BENCHMARK.

FIG. 9B is a graph 900B quantifying error. FIG. 9B plots a CDF 914 of the error 916 metrics over all the examined TPC-DS queries. The line 918 with star points ("Missed Groups") indicates that up to 20% of queries have missing groups. Upon examination, every one of these cases is due to applying LIMIT 100 on the answer after sorting over the aggregation column. Errors in aggregates change the rank of groups and hence the approximate answer picks a different top 100. In this example, one change is made to the queries: the answer is output before LIMIT 100 and that is called the full answer. The line 920 with triangle points ("Missed Groups: Full") shows that QUICKR misses no groups for any of the queries (line is a point on the top left).

The lines with circle 922 and x points 824 ("Agg. Error" and "Agg. Error: Full") depict the error for aggregates. As shown, 80% of the queries have error within ±10% and over 90% are within ±20%. Examination of the outliers reveals two prevalent causes, (a) Support is skewed across groups and since QUICKR assumes even distribution except for heavy hitters, some groups receive less rows than desired and may have high error, and (b) SUMs that are computed over values with high skew may have high error. As discussed above, a solution may involve stratifying on such columns. However, a potential complication is that columns may become more or less skewed after passing through predicates. For example, WHERE $X>10^6 \vee X<10^3$ increases skew and WHERE $X\epsilon[10, 11]$ decreases it.

FIG. 9C is a graph 900C that correlates the performance gains with query characteristics. It indicates the average metric value 926 for a range in the machine-hours gains 928. The line 930 with circle points ("Sampler-Source dist.") indicates that the gains increase when the samplers are closer to the sources. The discussion below compares some query aspects between the baseline plans and QUICKR. The line 932 with x points ("Total/First pass time") and the line 934 with star points ("# of passes") indicate that the gains due to QUICKR are larger for deeper queries. Finally, the line 936 with triangle points ("Interm. Data/10") indicates that queries that gain most by QUICKR may have substantial reductions in intermediate data (up to 19×, since the graph shows values divided by 10).

Table 6 shows the query optimization (QO) time for QUICKR and Baseline (in seconds).

TABLE 6

| | Percentile Value | | | | | |
|---|---|---|---|---|---|---|
| Metric | 10th | 25th | 50th | 75th | 90th | 95th |
| Baseline QO time | 0.38 | 0.49 | 0.51 | 0.54 | 0.56 | 0.57 |
| QUICKR QO time | 0.48 | 0.5 | 0.52 | 0.55 | 0.57 | 0.58 |

Longer QO times for QUICKR were expected since it considers samplers natively and hence explores more alternatives. Each query was run three times and the median QO time was picked. The table indicates that the increase in QO latency is <0.1 s.

Table 7 shows the number of query samplers per query and their locations. Table 7 indicates that 51% of the queries have exactly one sampler.

TABLE 7

| | Value | | | | | |
|---|---|---|---|---|---|---|
| Metric | 0 | 1 | 2 | 3 | 4 | 9 |
| Samplers per query | 25% | 51% | 9% | 11% | 2% | 2% |
| Sampler/source distance | 60% | 12% | 10% | 17% | 0% | 0% |

Many queries have multiple samplers. Further, 25% of the queries are unapproximatable. The table also shows where the samplers are in the query plan. "Sampler-Source distance" is the number of I/O passes between the extraction stage and the sampler. It may be seen that 60% of the samplers are on the first pass on data. As discussed above, sampling on the first pass may be likely to improve performance the most. It may be seen that QUICKR places samplers in the middle of the plan in many queries; moving such samplers past the next database operator may not yield a better performance vs error tradeoff.

Table 8 shows a frequency of use of various samplers.

TABLE 8

| | Sampler Type | | |
|---|---|---|---|
| Metric | Uniform | Distinct | Universe |
| Distribution across samplers | 54% | 26% | 20% |
| Queries that use at least one sampler of a certain type | 49% | 24% | 9% |

Overall, uniform sampler is used roughly twice as frequently as the distinct and universe samplers. The universe sampler is often optimized away because it is dominated by both the universe and distinct samplers. QUICKR may use the universe sampler only for queries that join two large relations. This happens more often in the example production queries than in TPC-DS. For many complex queries with multiple joins, an example system such as QUICKR may yield plans with only a small number of samplers. To do so, QUICKR translates stratification requirements on columns from the smaller relations to stratification over join keys in the larger relations (aka foreign keys) and accounts for the different numbers of distinct values using sfm. Without the example sampling+QO logic, a ninja data scientist may have to guess which among the many possible sampled plans would have high accuracy. Doing so is time-consuming and involves complex reasoning over data statistics.

A potential issue with apriori samples is the substantially low coverage for any feasible storage budget. That is, when queries are rich, tables may have many columns and a dataset may have many tables. Any choice of differently stratified samples of the inputs may have substantially low coverage for feasible storage budgets. To illustrate this aspect, BLINKDB was evaluated on the TPC-DS BENCHMARK. BLINKDB's MILP to decide which samples to obtain may work only for one table and extending to multiple tables is non-trivial. The MILP was used to generate samples for the store_sales table because (a) it is the largest table in TPC-DS BENCHMARK and (b) it has the highest potential to improve query performance; out of the 64 queries that were considered, 40 used store_sales table. Next, each query was run on all of the samples chosen by the MILP and the sample with the best possible performance that meets the error constraint (no groups missed and less than ±10% error for aggregates) was picked.

Experiments were also run using the same parameter values as in the BLINKDB paper. The queries were run in HIVE atop TEZ. The samples are not explicitly stored in memory but the file-system cache does help since no other queries ran on the cluster during the experiment. Experimental results indicated that substantially few queries benefit. That is, for most queries none of the constructed input samples yield an answer with zero missed rows and within ±10% error on aggregates. For sample-set sizes equal to or smaller than the input, the most advantageous experimental coverage was 13%. A parameter sweep on BLINKDB's internal parameters indicated that the best coverage overall was 22%, obtained at 10× the size of the input. Off the 14 queries that benefited, the median speed-up was 24%. It may be more feasible to store the entire input in memory than such large sample-sets.

Experimental results indicated that BLINKDB's MILP generates over 20 differently stratified samples on store_sales. Most are on one column but several are on column pairs. Many TPC-DS queries have a large QCS (see Table 5); large QCSets have a large sample size and even samples on column-pairs were picked by the MILP only at high storage budgets.

Apriori samples can be useful. Predictable aggregation queries that touch only one large dataset (e.g., joins with small dimension tables may be acceptable) may substantially benefit from apriori samples, for example, if the data distribution is sparse, i.e. the number of distinct values per group is much smaller than the row count. Then, each stratified sample may be small and many different stratified samples can be feasibly stored per popular dataset. This may not happen in TPC-DS or in these example experiment production clusters. Further issues may include: keeping such samples consistent when datasets churn continuously and dealing with ad-hoc queries that differ from those used in the sample construction since figuring out which among the available samples (if any) might help is non-trivial. Storing apriori samples for queries that join more than one large (fact) table may present issues because the same tables can be joined on multiple columns and the samples constructed for a particular join-of-tables may not help queries that join in a different manner (for example, nine queries join store_sales and store_returns in TPC-DS with four different options for join columns).

Many conventional big data systems support relational queries. Many also offer a (uniform) sampling operator. However, such conventional known big data systems may not automatically decide which queries can be sampled, place appropriate samplers at appropriate locations, or offer guarantees on answer quality.

Some recent research has involved sampling input datasets. Some update the samples as datasets evolve. Many assume knowledge of the queries and the datasets. For example, Congressional sampling (see, e.g., Acharya et al., "Congressional samples for approximate answering of group-by queries," In *Proceedings of the ACM SIGMOD International Conference on Management of Data*, 2000, pp. 487-498) may keep both uniform and stratified samples on the group-by columns used by queries. STRAT (Chaudhuri et al., supra) computes the optimal sample-set to store given a budget. For example, Chaudhuri et al. (see, e.g., Chaudhuri et al., "Overcoming limitations of sampling for aggregation queries," In *Proceedings of 17th International Conference on Data Engineering*, 2001, pp. 534-542) maintains an outlier index to better support skew. For example, Babcock et al. (see, e.g., Babcock et al., "Dynamic sample selection for approximate query processing," In *Proceedings of the ACM SIGMOD International Conference on Management of Data*, 2003, pp. 539-550) stores the more uncommon values explicitly. For example, SCIBORQ (see, e.g., Sidirourgos et al., supra) stores multiple layers of impressions where each layer can have a different focus and level of detail. Similar to STRAT, BLINKDB also optimally chooses stratified samples. It shows that storing samples in memory may offer substantial gains. Also, BLINKDB computes an error-latency-profile for repetitive queries and may meet error or performance targets.

Online aggregation (OLA) progressively processes more of the input and keeps updating the answer. The use-case may be advantageous since a user can run the query until the answer is satisfactory. An example system such as QUICKR may look at all tuples once (early in the plan) and retain a small subset for the remainder of the query. Hence, an example system such as QUICKR may offer advantageous error bounds without any assumptions on physical layout (e.g., input being randomly ordered) and with less computational overhead (e.g., does not need bootstrap). Further, OLA involves specialized join operators and in-memory data-structures in order to efficiently update the answers of a complex query.

An example accuracy analysis technique discussed herein may provide advantageous analysis in (at least) three ways. An example conventional technique (see, e.g., Nirkhiwale, et al., supra) may only apply for generalized uniform samplers (GUS). Neither the example universe nor the example distinct sampler discussed herein belong to the class of GUS. The example notion of sampler dominance discussed herein is a substantial generalization. Second, the likelihood of missing groups may be analyzed and aggregates beyond SUM may be considered. Further, while example conventional techniques may involve self-joins to compute the variance, an example system such as QUICKR may compute variance and other error metrics in one pass, as discussed herein.

Recently, there has been some research in using bootstrap over apriori samples. For example, Agarwal et al. (see, e.g., Agarwal, et al., supra) may use bootstrap to determine which apriori sample is suited for a query. As another example, Zeng et al. (see, e.g., Zeng, et al., supra) discuss an example technique to symbolically execute bootstrap (by using probability annotations and example relational operators that convolve random variables). This example technique may be helpful, as bootstrap can need thousands of trials each of which resample from a sample. However, neither of these examples may offset the shortcomings of apriori samples.

Since an example system such as QUICKR may build a sample inline while executing the query, example accuracy analyses as discussed herein may provide advantageous simplicity, speed (e.g., one pass) and may provide advantageous guarantees.

An example uniform sampler as discussed herein may include the Poisson sampler (see, e.g., Cormode, et al., supra). An example distinct sampler as discussed herein may advantageously be provided for execution in a streaming and partitioned manner, such that bias may advantageously be lowered and memory footprint may advantageously be reduced. Prior techniques involving sampling both inputs of a join may use detailed statistics or indices on one or more of the input relations of the join (e.g., Strategy Stream Sample (see, e.g., Chaudhuri, et al., supra)). Since the join inputs in big data queries are intermediate data that is generated on the fly, obtaining such statistics may incur substantial overhead. Such a technique may involve an additional pass over data and may affect parallelism since the sampler on one input waits for the stat collector on the other. Further, samplers may immediately precede the join—i.e., they may not be pushed down past other database operations since maintaining the needed statistics may become even more complex. An example uniform sampler as discussed herein may involve no data exchange between the join inputs at execution time (e.g., the hash function and the portion of hash space to be picked are parameters from the query plan). Further, example techniques discussed herein may advantageously reason about samplers natively in the context of a query optimizer.

Example techniques discussed herein may provide a way to approximate complex ad-hoc queries, including leveraging the numerous passes over data that such queries may perform to sample lazily on the first pass. The ability to sample both join inputs precisely and reasoning about samplers natively in a query optimizer allows such example techniques to offer a turn-key solution where the user need only submit his/her query and the system automatically determines if and how best that query can be approximated. In regimes where conventional techniques deliver few to no gains, an example system such as QUICKR may provide substantial speed-up. The speed-up may translate to lower cost (e.g., when using public clouds), faster results or the ability to support many more queries without increasing cluster size by up to 2×. Such example techniques may also extend the state-of-art in analyzing the error of sampled expressions.

In this context, "stratification" refers to a technique used to analyze/divide a universe of data into homogeneous groups (strata) (e.g., data collected about a problem or event that represents multiple sources that need to be treated separately). For example, stratification may divide members of a population into homogeneous subgroups before sampling. For example, the strata may be mutually exclusive: every element in the population is assigned to only one stratum. The strata are collectively exhaustive: no population element is excluded.

A relational data model is a data model, which may be used for data storage and processing. For example, in a relational data model, "relations" may be saved in the format of tables. Such a format stores the relation among entities. For example, a table has rows and columns, where rows may represent records and columns may represent the attributes (or vice-versa). For example, a single row (or column) of a table may be referred to as a tuple (which may effectively include a single record for the relation).

In this context, "relational algebra" refers to a procedural query language, which takes instances of relations as input and yields instances of relations as output. A relational algebra uses operators to perform queries. An operator can be unary or binary. They accept relations as their input and yield relations as their output. Relational algebra is performed recursively on a relation and intermediate results are also considered relations. Example operations of relational algebra include Select, Project, Union, Set difference, Cartesian product, and Rename.

For example, a select operation ($\alpha$) may select tuple(s) that satisfy a given predicate from a relation. For example, a project operation ($\pi$) may project column(s) that satisfy a given predicate. For example, a union operation ($\cup$) may perform a binary union between two given relations (e.g., $r \cup s = \{t | t \varepsilon r \text{ or } t \varepsilon s\}$).

For example, a set difference operation (−) may provide a set of tuples that are present in a first relation but are not present in a second relation (e.g., $r-s=\{t | t \varepsilon r \text{ and } t \notin s\}$). For example, a Cartesian product operation (×) may combine information of two different relations into one relation (e.g., $r \times s = \{q t | q \varepsilon r \text{ and } t \varepsilon s\}$). For example, a Rename operation ($\rho$) provide a name to a relation, which may be without a name otherwise (e.g., results of relational algebra are also relations but may be without any name, so the Rename operation may be used to provide such a name).

Additional operations may include set intersection, assignment, and natural join.

For example, a Join operation may be a combination of a Cartesian product followed by a selection process. For example, a Join operation may pair two tuples from different relations, if and only if a given join condition is satisfied.

For example, a theta ($\theta$) join may combine tuples from different relations provided they satisfy a "theta" condition (for this example, the join condition is denoted by the symbol $\theta$), denoted as $R_1 \bowtie_\theta R_2$. For example, when Theta join uses only an equality comparison operator, it may be referred to as equijoin (or equi-join).

For example, a Natural Join ($\bowtie$) operator may not use any comparison operator. It does not concatenate the way a Cartesian product does. A Natural Join can be performed only if there is at least one common attribute that exists between two relations. In addition, the attributes must have the same name and domain. Natural join acts on those matching attributes where the values of attributes in both the relations are same.

For example, a "foreign key" may refer to a key used to link two tables together (sometimes called a referencing key). For example, a foreign key may be a column or a combination of columns whose values match a primary key in a different table. For example, the relationship between two tables may match the primary key in one of the tables with a foreign key in the second table.

One skilled in the art of computing will understand that other instructions or operations may also be used to achieve this (or similar) functionality, without departing from the discussion herein.

II. Example Operating Environment

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

FIG. 10 illustrates an example of a suitable computing system environment 1000 on which aspects of the subject matter discussed herein may be implemented. The computing system environment 1000 is only one example of a suitable computing environment and is not intended to suggest any limitation as to the scope of use or functionality of aspects of the subject matter discussed herein. Neither should the computing environment 900 be interpreted as having any dependency or requirement relating to any one or combination of components illustrated in the example operating environment 1000.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 10, an example system for implementing aspects of the subject matter discussed herein includes a general-purpose computing device in the form of a computer 1010. A computer may include any electronic device that is capable of executing an instruction. Components of the computer 1010 may include a processing unit 1020, a system memory 1030, and one or more system buses (represented by system bus 1021) that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 1020 may be connected to a hardware security device 1022. The security device 1022 may store and be able to generate cryptographic keys that may be used to secure various aspects of the computer 1010. In one embodiment, the security device 1022 may comprise a Trusted Platform Module (TPM) chip, TPM Security Device, or the like.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media.

Computer storage media (or "computer-readable storage media") includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs), Blu-ray Disc (BD) or other optical disk storage (e.g., Universal Serial Bus (USB) drive, hard disk drive), magnetic cassettes, magnetic tape, magnetic disk storage or other magnetic storage devices, or any other medium which can be used to store the desired information and which can be accessed by the computer 1010. "Computer storage media" is not "communication media." Thus, as used herein, the term "computer-readable storage medium" is not a signal per se, nor any type of propagating signal per se.

"Communication media" typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1030 may include computer storage media in the form of volatile and/or nonvolatile memory such as read only memory (ROM) 1031 and random access memory (RAM) 1032. Nonvolatile memory may be substituted for some or all of the ROM 1031 and/or the RAM 1032. For example, memristor memory, phase-change memory (PCM), or some other type of nonvolatile memory may be used instead of, or in addition to, the ROM 1031 and/or the RAM 1032.

A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disc drive 1055 that reads from or writes to a removable, nonvolatile optical disc 1056 such as a CD ROM, DVD, BD, or other optical media.

In one implementation, memristor memory, phase-change memory, or some other type of nonvolatile memory may be used instead of, or in addition to, the hard drive 1041.

Other removable/non-removable, volatile/nonvolatile computer storage media (or "computer-readable storage media") that can be used in the exemplary operating environment include magnetic tape cassettes, flash memory cards and other solid state storage devices, digital versatile discs, other optical discs, digital video tape, solid state RAM, solid state ROM, and the like. The hard disk drive 1041 may be connected to the system bus 1021 through the interface 140, and magnetic disk drive 1051 and optical disc drive 1055 may be connected to the system bus 1021 by an interface for removable nonvolatile memory such as the interface 1050.

The drives and their associated computer storage media, discussed above and illustrated in FIG. 10, provide storage of computer-readable instructions, data structures, program modules, and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that they may be different copies.

A user may enter commands and information into the computer 1010 through input devices such as a keyboard 1062 and pointing device 1061, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 1020 through a user input interface 1060 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include phone networks, near field networks, and other networks. Such networking environments are commonplace in offices, enterprise-wide computer networks, intranets, and the Internet.

When used in a LAN networking environment, the computer 1010 is connected to the LAN 1071 through a network interface or adapter 1070. When used in a WAN networking environment, the computer 1010 may include a modem 1072 or other means for establishing communications over the WAN 1073, such as the Internet. The modem 1072, which may be internal or external, may be connected to the system bus 1021 via the user input interface 1060 or other appropriate mechanism. In a networked environment, program modules depicted relative to the computer 1010, or portions thereof, may be stored in the remote memory storage device. By way of example, and not limitation, FIG. 10 illustrates remote application programs (RAP) 1085 as residing on memory device 1081. It will be appreciated that the network connections shown are exemplary and other means of establishing a communications link between the computers may be used.

In this context, a "processor" may include a single processor or multiple processors configured to process instructions associated with a computing system. A processor may thus include one or more processors executing instructions in parallel and/or in a distributed manner. For example, the system shown in FIG. 10 may include one or more processors (e.g., hardware processors).

For example, a system may include at least one hardware device processor, and a computer-readable storage medium storing executable instructions for execution by the device processor, for implementing an EDBMS as discussed herein.

For example, the trusted module 114 and the untrusted module 116 may include one or more of the modules discussed above with regard to FIG. 10.

One skilled in the art of computing will appreciate that many different techniques may be used for implementing features discussed herein.

III. Flowchart Description

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

Figure 11A:
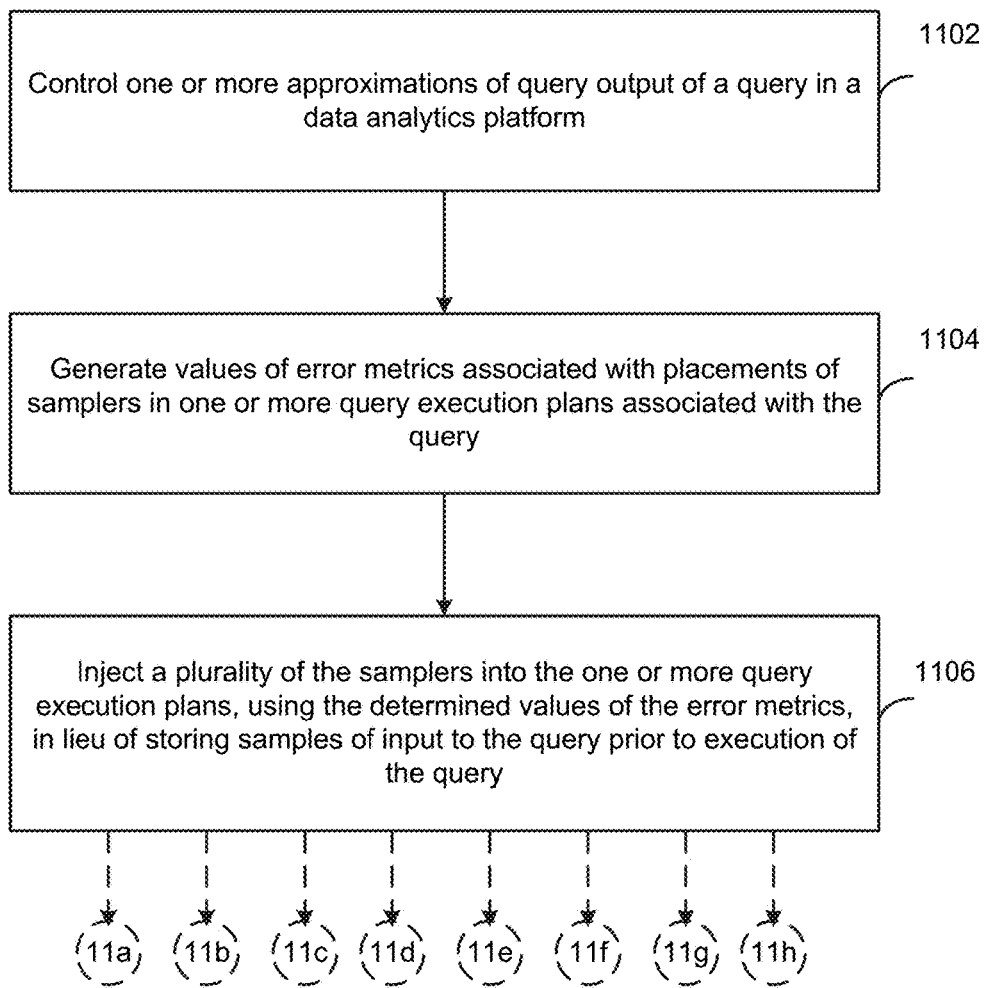
Figure 11C:
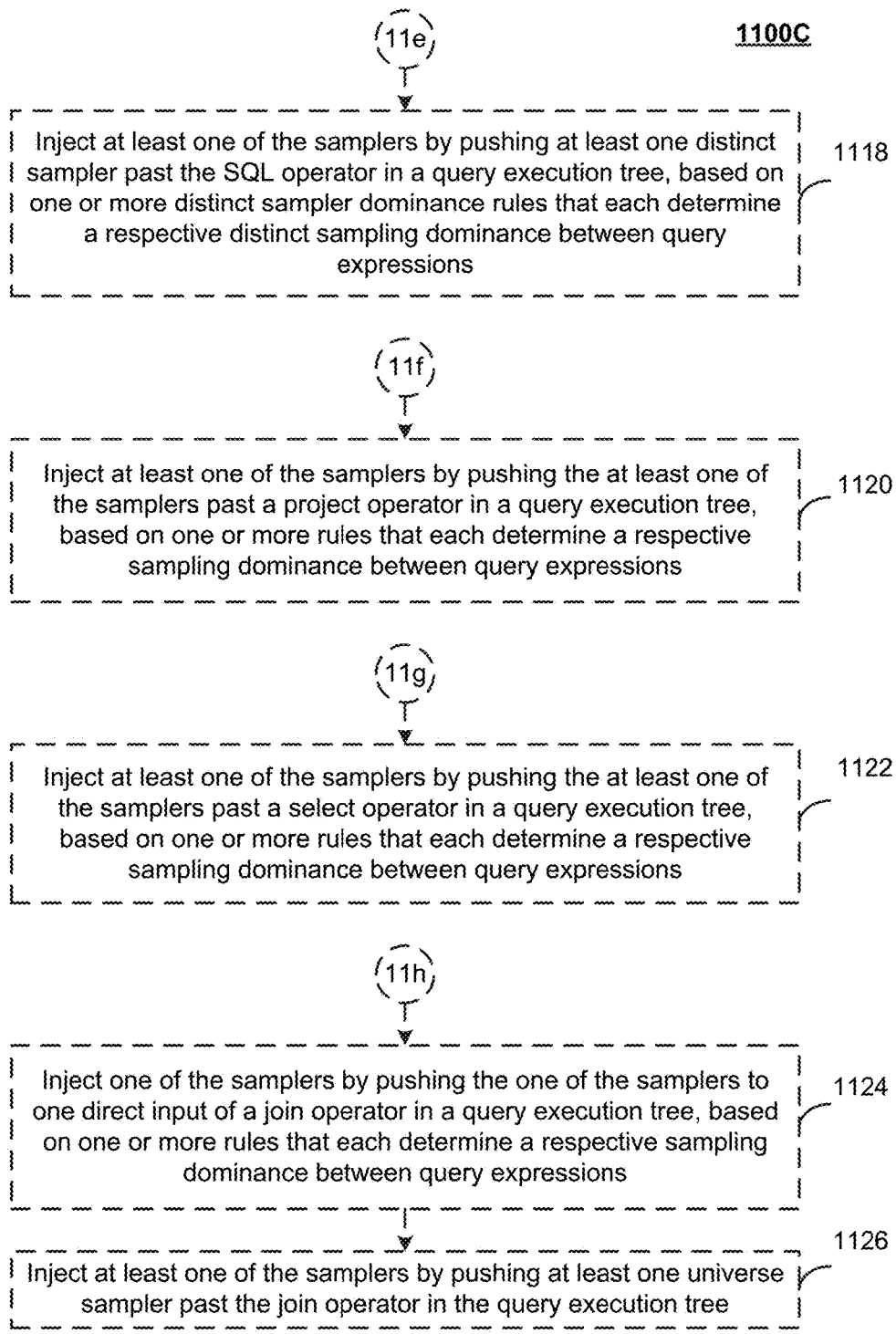

FIGS. 11A-11C are a flowchart illustrating example operations of the system of FIG. 10, according to example embodiments. As shown in the example of FIG. 11A, one or more approximations of query output of a query in a data analytics platform are controlled (1102). The approximations are controlled by generating values of error metrics associated with placements of samplers in one or more query execution plans associated with the query (1104), and injecting a plurality of the samplers into the one or more query execution plans, using the determined values of the error metrics, in lieu of storing samples of input to the query prior to execution of the query (1106).

For example, controlling the one or more approximations of query output of the query may include determining whether the query is approximatable, and injecting the samplers based on one or more results of the determining whether the query is approximatable (1108), in FIG. 11B.

For example, controlling the one or more approximations of query output of the query may include injecting at least one of the samplers by pushing the at least one of the samplers past a Structured Query Language (SQL) operator in a query execution tree, based on one or more transformation rules that are each respectively based on a respective dominance relationship between query expressions (1110).

For example, controlling the one or more approximations of query output of the query may include injecting at least one of the samplers by pushing the at least one of the samplers past a SQL operator in a query execution tree (1112), wherein the at least one of the samplers has characteristics that may include using no more than a predetermined, sub-linear amount of memory for execution, performs no more than a single pass over data during execution, and uses parallel processing of input data for execution (1114).

For example, controlling the one or more approximations of query output of the query may include injecting at least one of the samplers by pushing the at least one of the samplers past a Structured Query Language (SQL) operator in a query execution tree, to a plurality of direct inputs to the SQL operator (1116).

For example, controlling the one or more approximations of query output of the query may include injecting at least one of the samplers by pushing at least one distinct sampler past the SQL operator in a query execution tree, based on one or more distinct sampler dominance rules that each determine a respective distinct sampling dominance between query expressions (1118), in FIG. 11C.

For example, controlling the one or more approximations of query output of the query may include injecting at least one of the samplers by pushing the at least one of the samplers past a project operator in a query execution tree, based on one or more rules that each determine a respective sampling dominance between query expressions (1120).

For example, controlling the one or more approximations of query output of the query may include injecting at least one of the samplers by pushing the at least one of the samplers past a select operator in a query execution tree, based on one or more rules that each determine a respective sampling dominance between query expressions (1122).

For example, controlling the one or more approximations of query output of the query may include injecting one of the samplers by pushing the one of the samplers to one direct input of a join operator in a query execution tree, based on one or more rules that each determine a respective sampling dominance between query expressions (1124).

For example, controlling the one or more approximations of query output of the query may include injecting at least one of the samplers by pushing at least one universe sampler past the join operator in the query execution tree (1126).

Figure 12A:
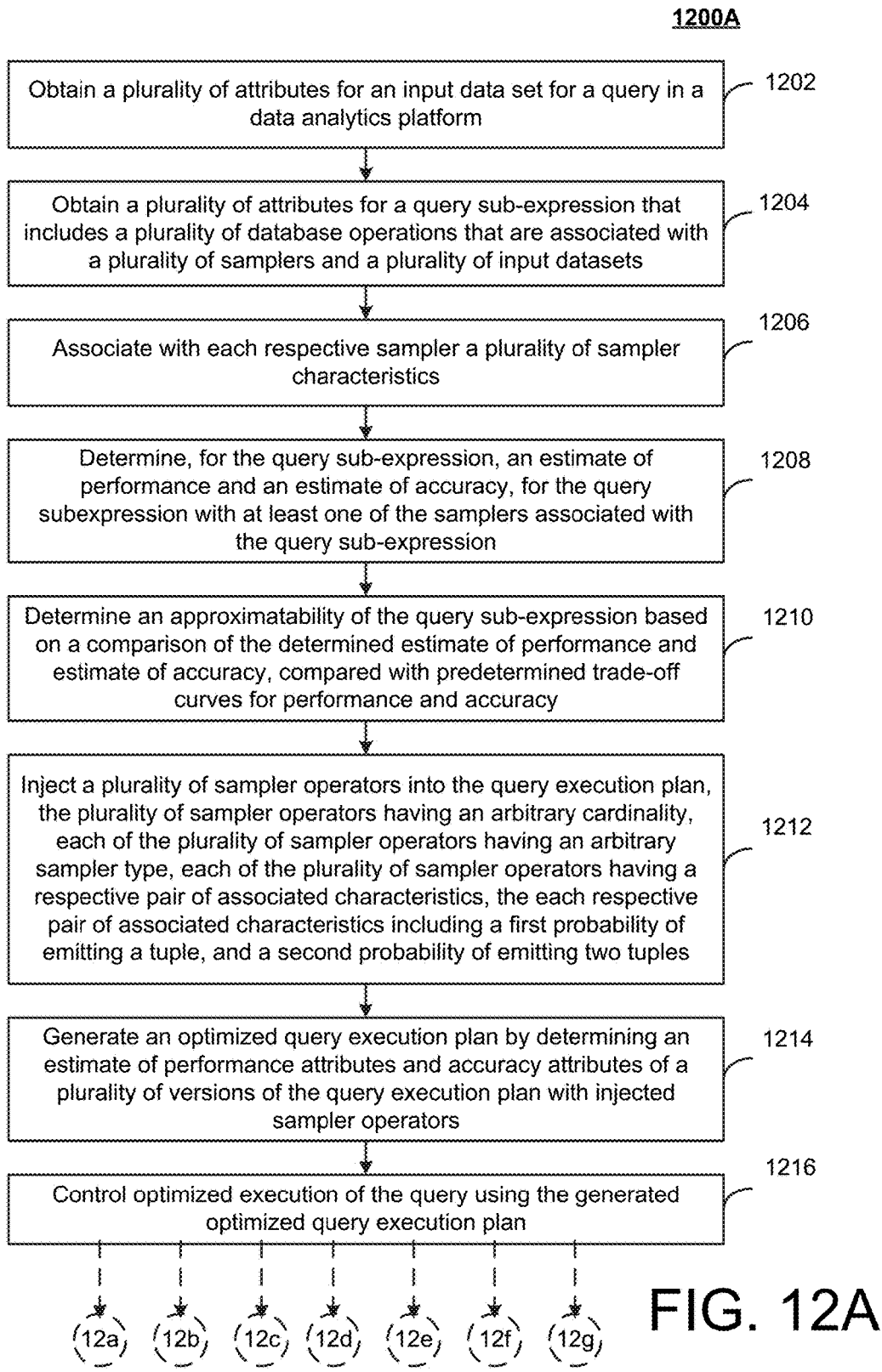
FIGS. 12A-12C are a flowchart illustrating example operations of the system of FIG. 10.
Figure 12B:
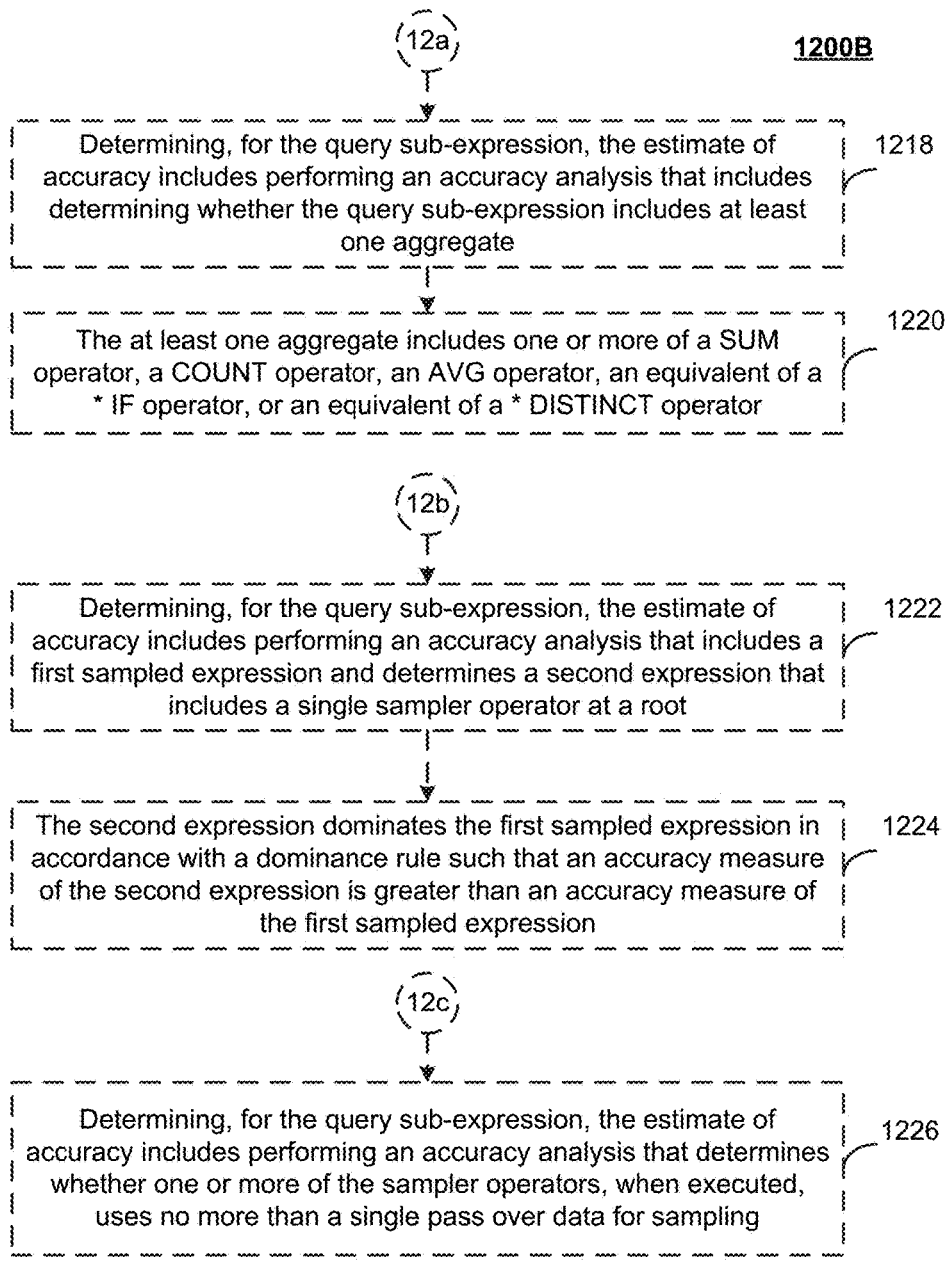
Figure 12C:
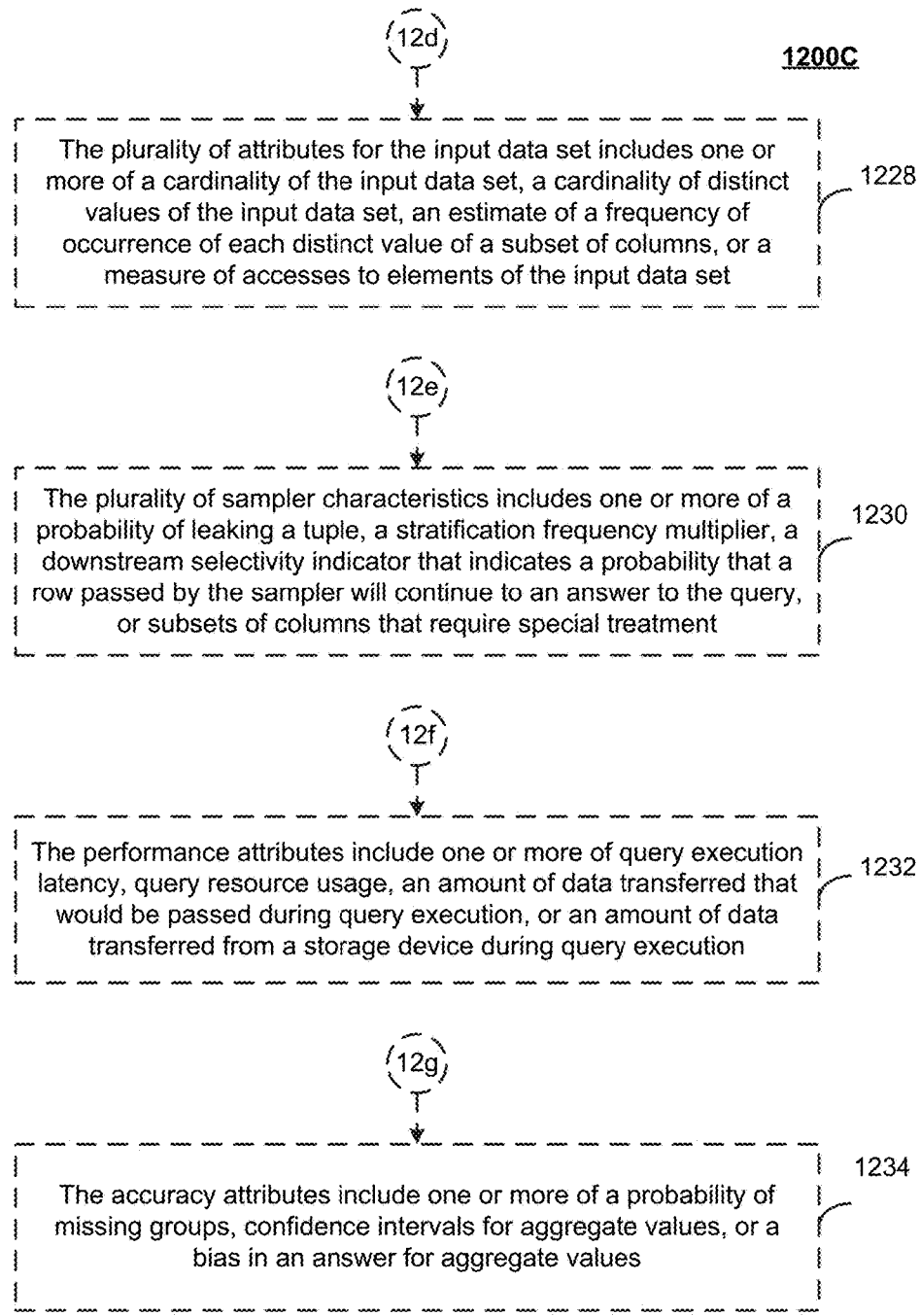

FIGS. 12A-12C are a flowchart illustrating example operations of the system of FIG. 10, according to example embodiments. As shown in the example of FIG. 12A, a plurality of attributes for an input data set for a query in a data analytics platform is obtained (1202).

A plurality of attributes for a query sub-expression that includes a plurality of database operations that are associated with a plurality of samplers and a plurality of input datasets is obtained (1204). Each respective sampler is associated with a plurality of sampler characteristics (1206).

For the query sub-expression, an estimate of performance and an estimate of accuracy is determined, for the query subexpression with at least one of the samplers associated with the query sub-expression (1208).

An approximatability of the query sub-expression is determined based on a comparison of the determined estimate of performance and estimate of accuracy, compared with predetermined trade-off curves for performance and accuracy (1210).

A plurality of sampler operators is injected into the query execution plan, the plurality of sampler operators having an arbitrary cardinality, each of the plurality of sampler operators having an arbitrary sampler type, each of the plurality of sampler operators having a respective pair of associated characteristics, the each respective pair of associated characteristics including a first probability of emitting a tuple, and a second probability of emitting two tuples (1212).

An optimized query execution plan is generated by determining an estimate of performance attributes and accuracy attributes of a plurality of versions of the query execution plan with injected sampler operators (1214). Optimized execution of the query is controlled using the generated optimized query execution plan (1216).

For example, determining, for the query sub-expression, the estimate of accuracy may include performing an accuracy analysis that includes determining whether the query sub-expression includes at least one aggregate (1218), in FIG. 12B. The at least one aggregate may include one or more of a SUM operator, a COUNT operator, an AVG operator, an equivalent of a *IF operator, or an equivalent of a *DISTINCT operator (1220).

For example, determining, for the query sub-expression, the estimate of accuracy may include performing an accuracy analysis that includes a first sampled expression and determines a second expression that includes a single sampler operator at a root (1222). The second expression dominates the first sampled expression in accordance with a dominance rule such that an accuracy measure of the second expression is greater than an accuracy measure of the first sampled expression (1224).

For example, determining, for the query sub-expression, the estimate of accuracy may include performing an accuracy analysis that determines whether one or more of the sampler operators, when executed, uses no more than a single pass over data for sampling (1226).

For example, the plurality of attributes for the input data set may include one or more of a cardinality of the input data set, a cardinality of distinct values of the input data set, an estimate of a frequency of occurrence of each distinct value of a subset of columns, or a measure of accesses to elements of the input data set (1228), in FIG. 12C.

For example, the plurality of sampler characteristics may include one or more of a probability of leaking a tuple, a stratification frequency multiplier, a downstream selectivity indicator that indicates a probability that a row passed by the sampler will continue to an answer to the query, or subsets of columns that require special treatment (1230).

For example, the performance attributes may include one or more of query execution latency, query resource usage, an amount of data transferred that would be passed during query execution, or an amount of data transferred from a storage device during query execution (1232).

For example, the accuracy attributes may include one or more of a probability of missing groups, confidence intervals for aggregate values, or a bias in an answer for aggregate values (1234).

Figure 13:
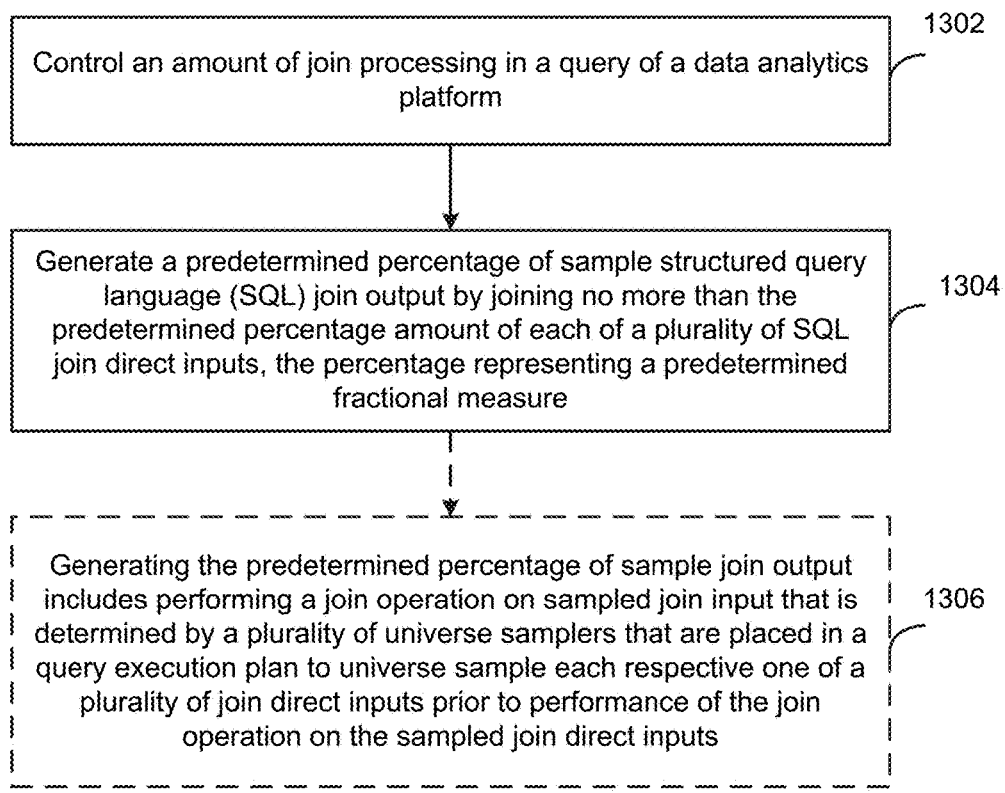
FIG. 13 is a flowchart illustrating example operations of the system of FIG. 10.

FIG. 13 is a flowchart illustrating example operations of the system of FIG. 10, according to example embodiments. As shown in the example of FIG. 13, an amount of join processing in a query of a data analytics platform is controlled (1302) by generating a predetermined percentage of sample structured query language (SQL) join output by joining no more than the predetermined percentage amount of each of a plurality of SQL join direct inputs, the percentage representing a predetermined fractional measure (1304).

For example, generating the predetermined percentage of sample join output may include performing a join operation on sampled join input that is determined by a plurality of universe samplers that are placed in a query execution plan to universe sample each respective one of a plurality of join direct inputs prior to performance of the join operation on the sampled join direct inputs (1306).

In an example implementation, a query execution plan associated with a query in a data analytics platform may be obtained, and a plurality of cost attributes of an input data set for the query may be obtained.

A plurality of sampler operators may be injected into the query execution plan, the plurality of sampler operators having an arbitrary cardinality, each of the plurality of sampler operators having an arbitrary sampler type, each of the plurality of sampler operators having a respective pair of associated characteristics, the each respective pair of associated characteristics including a probability of emitting a tuple, and a probability of emitting two tuples. An optimized sampled query execution plan may be determined based on determining an estimate of performance attributes of a version of the query execution plan with injected sampler operators.

For example, obtaining the plurality of cost attributes of the input data set for the query may include obtaining the plurality of cost attributes determined from a single pass of the input data set.

For example, the probability of emitting a tuple may include a downstream selectivity indicator that indicates a probability that a row passed by the sampler will continue to an answer to the query.

For example, the probability of emitting two tuples may include a stratification frequency multiplier for correction of an effect of replacing stratification columns with join keys.

For example, determining an optimized sampled query execution plan may include switching pairs of the sampler operators based on a sampler switching rule.

For example, determining an optimized sampled query execution plan may include pushing a first one of the sampler operators past a SQL operator based on a sampler pushing rule.

One skilled in the art of computing will appreciate that many other types of techniques may be used for sampling in data analytics platforms (e.g., DBMS), without departing from the discussion herein.

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

In this context, a "processor" may include a single processor or multiple processors configured to process instructions associated with a computing system. A processor may thus include one or more processors executing instructions in parallel and/or in a distributed manner.

For example, the system 1000 may include one or more processors. For example, the system 1000 may include at least one tangible computer-readable storage medium storing instructions executable by the one or more processors, the executable instructions configured to cause at least one processor to perform operations associated with various example components included in the system 1000, as discussed herein. For example, the one or more processors may be included in at least one processing apparatus. One skilled in the art of computing will understand that there are many configurations of processors and processing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

Customer privacy and confidentiality have been ongoing considerations in computing environments for many years. Thus, example techniques for maintaining/using a database may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes media and devices that are signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one hardware device processor; and
   a computer-readable storage medium storing executable instructions that, when executed, cause the at least one hardware device processor to:
   receive a query;
   generate error values associated with potential locations of samplers in one or more query execution plans associated with the query, the error values reflecting estimated error in accuracy of approximations produced by executing the one or more query execution plans with the samplers in the potential locations;
   based at least on the error values, inject selected samplers into selected locations of a selected query execution plan;
   execute the selected query execution plan having the selected samplers in the selected locations to obtain an approximate result; and
   output the approximate result in response to the query.

2. The system of claim 1, wherein the executable instructions, when executed, cause the at least one hardware device processor to:
   determine whether the query is approximatable, and inject the selected samplers into the selected locations based at least on one or more results of the determining whether the query is approximatable.

3. The system of claim 1, wherein the executable instructions, when executed, cause the at least one hardware device processor to:
   inject a particular sampler into a particular location by pushing the particular sampler past a Structured Query Language (SQL) operator in a query execution tree for the query, based at least on one or more transformation rules that are each respectively based on a respective dominance relationship between query expressions.

4. The system of claim 1, wherein the executable instructions, when executed, cause the at least one hardware device processor to:
   inject a particular sampler into a particular location by pushing the particular sampler past a SQL operator in a query execution tree for the query,
   wherein the particular sampler has characteristics that include:
     using no more than a predetermined, sub-linear amount of memory for execution,
     performs no more than a single pass over data during execution, and
     uses parallel processing of input data for execution.

5. The system of claim 1, wherein the executable instructions, when executed, cause the at least one hardware device processor to:
   inject a particular sampler into a particular location by pushing the particular sampler past a Structured Query Language (SQL) operator in a query execution tree for the query to sample a plurality of direct inputs to the SQL operator.

6. The system of claim 1, wherein the executable instructions, when executed, cause the at least one hardware device processor to:
inject a distinct sampler into a particular location by pushing the distinct sampler past a SQL operator in a query execution tree for the query, based at least on one or more distinct sampler dominance rules that each determine a respective distinct sampling dominance between query expressions.

7. The system of claim 1, wherein the executable instructions, when executed, cause the at least one hardware device processor to:
inject a particular sampler into a particular location by pushing the particular sampler past a project operator in a query execution tree for the query, based at least on one or more rules that each determine a respective sampling dominance between query expressions.

8. The system of claim 1, wherein the executable instructions, when executed, cause the at least one hardware device processor to:
inject a particular sampler into a particular location by pushing the particular sampler past a select operator in a query execution tree for the query, based at least on one or more rules that each determine a respective sampling dominance between query expressions.

9. The system of claim 1, wherein the executable instructions, when executed, cause the at least one hardware device processor to:
inject a particular sampler into a particular location by pushing the particular sampler to one direct input of a join operator in a query execution tree for the query, based at least on one or more rules that each determine a respective sampling dominance between query expressions.

10. The system of claim 1, wherein the executable instructions, when executed, cause the at least one hardware device processor to:
inject a universe sampler into a particular location by pushing the universe sampler past a join operator in a query execution tree for the query.

11. A method comprising:
receiving a query;
generating error values associated with potential locations of samplers in one or more query execution plans for the query, the error values reflecting estimated error in accuracy of approximations produced by executing the one or more query execution plans with the samplers in the potential locations;
based at least on the error values, injecting selected samplers into selected locations of a selected query execution plan;
executing the selected query execution plan having the selected samplers in the selected locations to obtain an approximate result; and
outputting the approximate result in response to the query.

12. The method of claim 11, wherein the injecting ensures, with a specified probability, that the approximate result comes within a specified bound of a true answer to the query.

13. The method of claim 11, further comprising:
evaluating the potential locations according to a cost metric that considers the error values and performance improvements; and
selecting the selected samplers to inject into the selected locations based at least on the cost metric.

14. The method of claim 11, further comprising:
using a distinct sampler as at least one selected sampler based at least on data skew associated with an individual aggregate in the selected query execution plan.

15. A computer-readable storage medium storing executable instructions that, when executed by one or more processors, cause the one or more processors to perform acts comprising:
receiving a query;
generating error values associated with potential locations of samplers in one or more query execution plans for the query, the error values reflecting estimated error in accuracy of approximations produced by executing the one or more query execution plans with the samplers in the potential locations;
based at least on the error values, injecting selected samplers into selected locations of a selected query execution plan;
executing the selected query execution plan having the selected samplers in the selected locations to obtain an approximate result; and
outputting the approximate result in response to the query.

16. The computer-readable storage medium of claim 15, the acts further comprising:
evaluating the potential locations according to a cost metric that considers the error values and performance improvements; and
selecting the selected samplers to inject into the selected locations based at least on the cost metric.

17. The computer-readable storage medium of claim 15, the selected samplers comprising a distinct sampler configured to cause a specified number of rows to pass through the distinct sampler for each distinct value in a column accessed by the selected query execution plan.

18. The computer-readable storage medium of claim 15, the selected samplers comprising a uniform sampler configured to sample rows uniformly at random.

19. The computer-readable storage medium of claim 15, the selected samplers comprising a universe sampler configured to project values of join keys into a high dimensional universe and to select a random portion of rows from the high dimensional universe.

20. The computer-readable storage medium of claim 15, the selected samplers comprising a universe sampler configured to project values of join keys into a space using a hash function and to select a random portion of rows from the space.

* * * * *